(12) United States Patent
Hearn et al.

(10) Patent No.: US 7,735,003 B1
(45) Date of Patent: Jun. 8, 2010

(54) COMPUTER SYSTEM INTEGRATING DIFFERENT DATA TYPES INTO SINGLE ENVIRONMENT

(75) Inventors: Robert Aubrey Hearn, Vancouver, WA (US); Scott D. Holdaway, Vancouver, WA (US)

(73) Assignee: Apple Inc., Cupertino, CA (US)

( * ) Notice: Subject to any disclaimer, the term of this patent is extended or adjusted under 35 U.S.C. 154(b) by 1614 days.

(21) Appl. No.: 10/423,396

(22) Filed: Apr. 25, 2003

Related U.S. Application Data

(63) Continuation of application No. 09/721,545, filed on Nov. 22, 2000, now Pat. No. 6,605,122, which is a continuation of application No. 08/673,965, filed on Jul. 1, 1996, now Pat. No. 6,154,756, which is a continuation of application No. 08/408,114, filed on Mar. 21, 1995, now abandoned, which is a continuation of application No. 07/914,193, filed on Jul. 15, 1992, now abandoned.

(51) Int. Cl.
*G06F 17/00* (2006.01)
(52) U.S. Cl. .......... 715/240; 715/243
(58) Field of Classification Search ........... 715/500.1, 715/501.1, 503, 504, 515, 526, 530, 531, 715/201, 203, 204, 205, 207, 212, 217, 209, 715/273, 255, 256, 240, 243
See application file for complete search history.

(56) References Cited

U.S. PATENT DOCUMENTS

| | | | | |
|---|---|---|---|---|
| 4,815,029 A | * | 3/1989 | Barker et al. | 715/516 |
| 4,962,475 A | | 10/1990 | Hernandez et al. | |
| 5,033,009 A | | 7/1991 | Dubnoff | |
| 5,051,930 A | * | 9/1991 | Kuwabara et al. | 715/516 |
| 5,061,930 A | | 9/1991 | Kuwabara et al. | |
| 5,181,162 A | | 1/1993 | Smith et al. | |
| 5,297,249 A | | 3/1994 | Bernstein et al. | |
| 5,630,126 A | * | 5/1997 | Redpath | 707/103 R |

OTHER PUBLICATIONS

Simpson, "Mastering WordPerfect 5.1 & 2 for Windows", SYBEC Corporation, 1993, pp. 972-975.

(Continued)

*Primary Examiner*—Laurie Ries
(74) *Attorney, Agent, or Firm*—Blakely, Sokoloff, Taylor & Zafman LLP

(57) ABSTRACT

A system for viewing and manipulating information of various data types within a single document in an integrated computer system environment is disclosed. Each data type is maintained within a dataset. Datasets comprise logical information of a common data type along with the functions or processing logic to view and manipulate that data type. The logical types of information managed by datasets in the preferred embodiment include graphical objects, blocks of text, spreadsheet cells, and database records. Datasets also manage frames. Frames provide a means by which datasets are viewed and manipulated. Each dataset is responsible for managing the display of information inside one of its frames. Significantly, the present invention provides a logical independence between the information contained in a dataset and the manner in which the information is viewed and manipulated (i.e. frames). This independence provides a significant improvement in the ability to manipulate various types of information. Any type and number of datasets can be combined together into a single document and saved in a file system as a document file.

66 Claims, 44 Drawing Sheets

OTHER PUBLICATIONS

"Wow! Gee Whiz! WordPerfect Goes Windows! A First Look", Computer Counsel, v.3, n 6, Jun. 1991, p. 12(1).

Microsoft Project for Windows Feature Guide, Version 1.0, Microsoft Corporation, 1990, pp. 138-143.

RagTime 2, Bruning & Everth Softwarepartener GmbH, 1987, pp. 2-20, 2-33, 3-6, 3-7, 3-10, 4-5, 4-16, 5-5, 5-24, 6-5, 7-5, 7-7.

Gore, "Claris and Beagle Bros., Shoot for the Works", MacWEEK, v. 5, n. 25, p. 1(2), Jul. 16, 1991.

Gore, "Claris 'Suite' on Integration", MacWEEK, v. 5, n.5, p. 1(2), Feb. 5, 1991.

Danuloff, "The System 7 Book", Apr. 1991, pp. 201-233.

Norr, "Books on System 7 Hit the Shelves", MacWEEK, v. 5, n. 17, p. 6 Apr. 30, 1991.

Ezra Shapiro, "Planning and Publishing" Byte Magazine, Jun. 1998, pp. 197-200.

ClarisWorks™ Getting Started, Clairs Corp., 1991, p. 2-6.

ClarisWorks™ Handbook, Claris Corp., 1991, pp. 1-3 to 1-12, 2-5, 2-6, 2-47, 3-5, 4-5, 4-6, 5-5, 6-6 tp 6-8, 7-3 to 7-13.

S. Roth, "FrameMaker 2.1", MacWorld, Jan. 1991, pp. 182-184.

D. Barker, "FrameMaker Becomes an Expert Table Maker", Byte, Sep. 1991, p. 54.

T. Negrino, "ClarisWorks 1.0", Mac World, Mar. 1992, pp. 174-175.

* cited by examiner

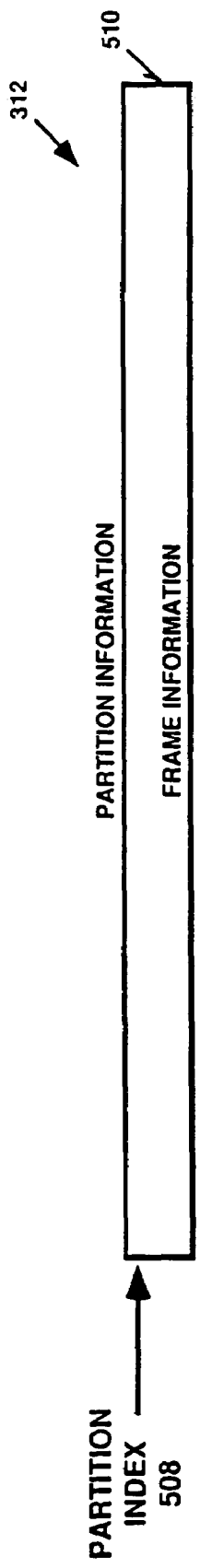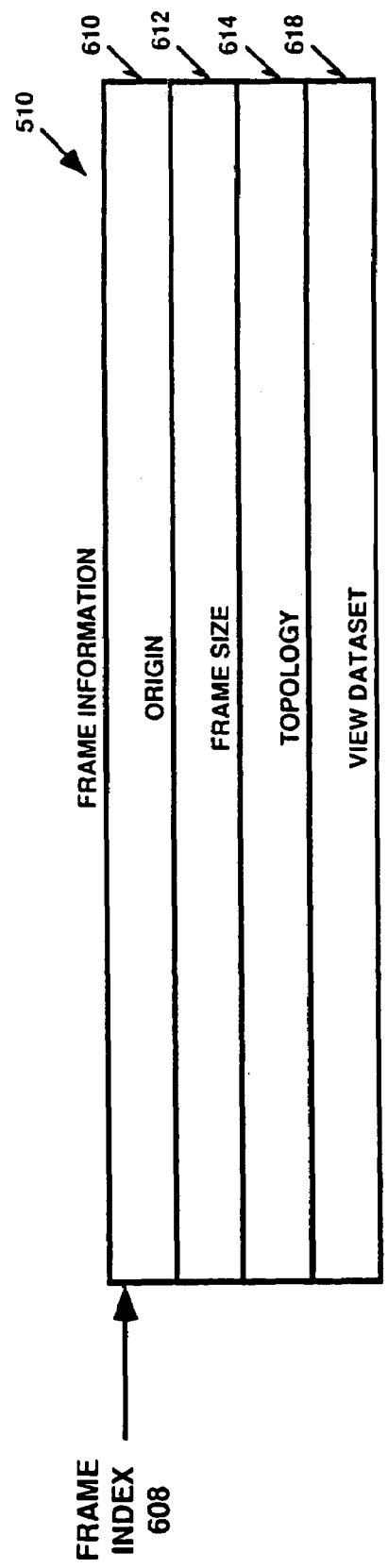
FIGURE 5
FIGURE 6

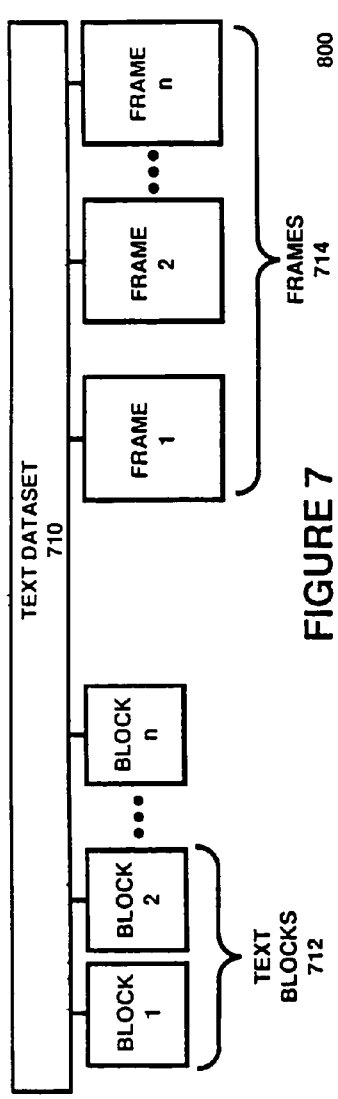
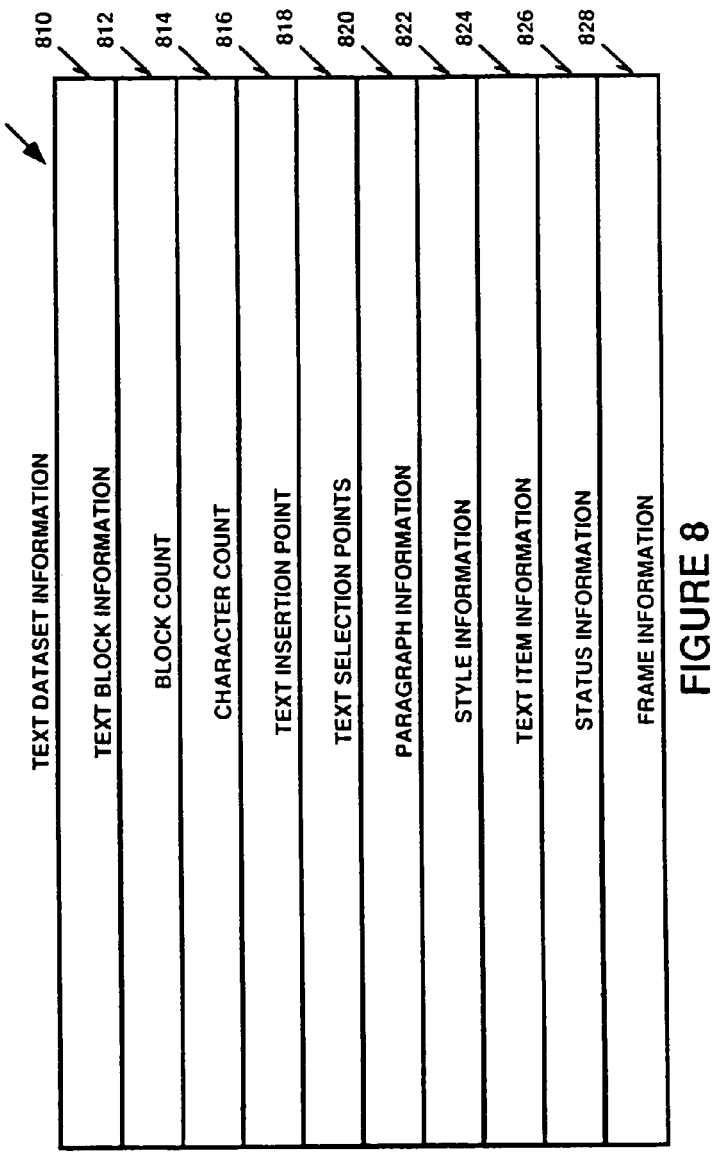

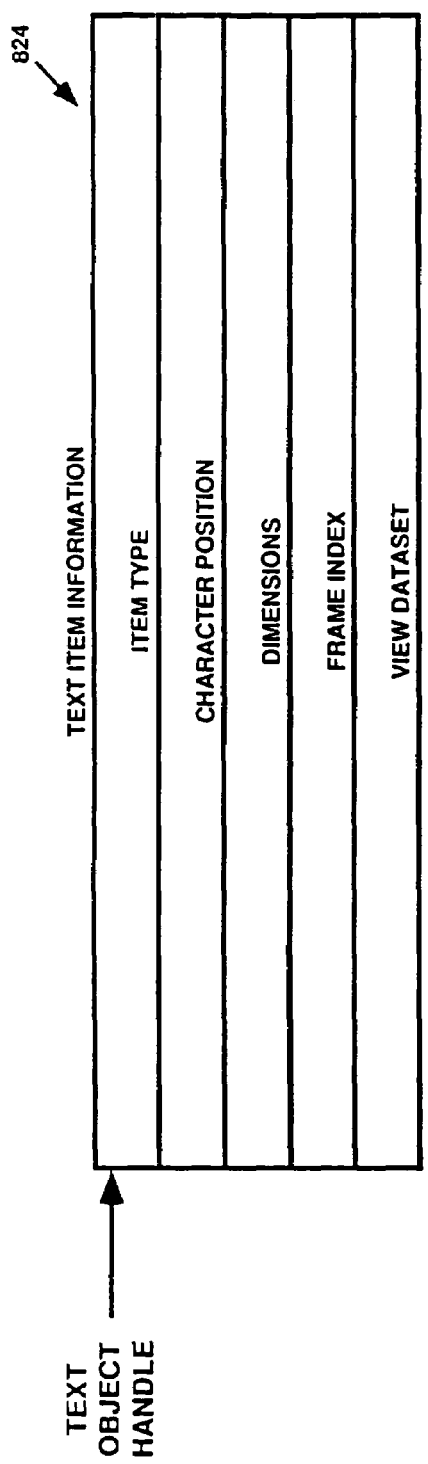
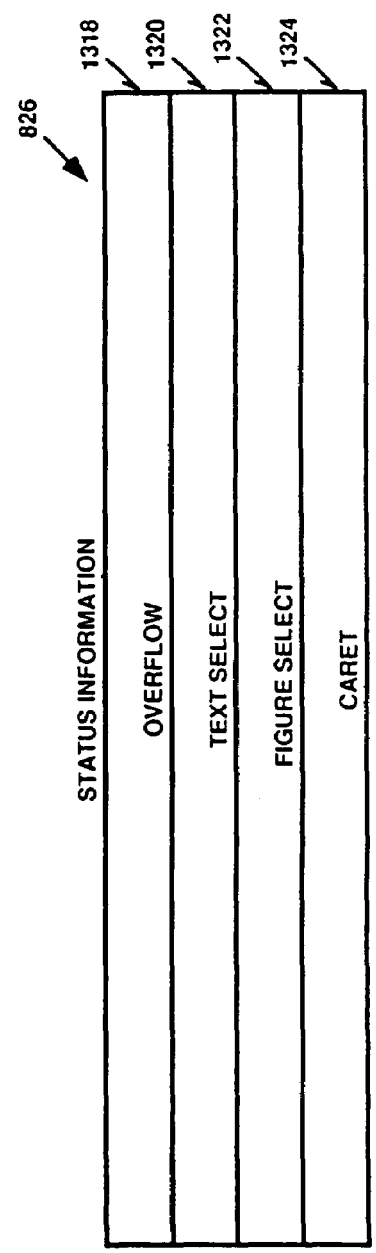
FIGURE 12
FIGURE 13

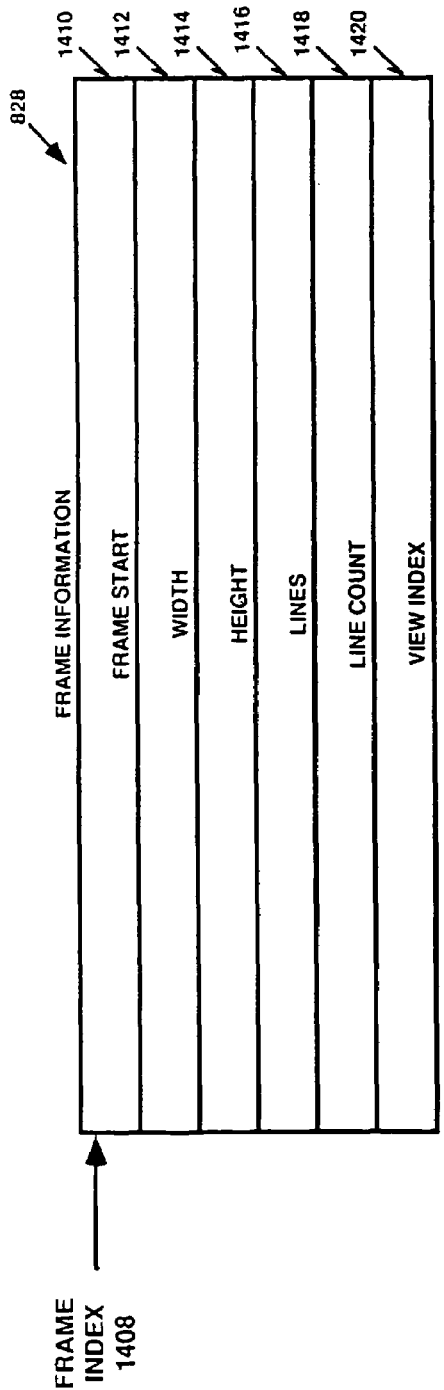
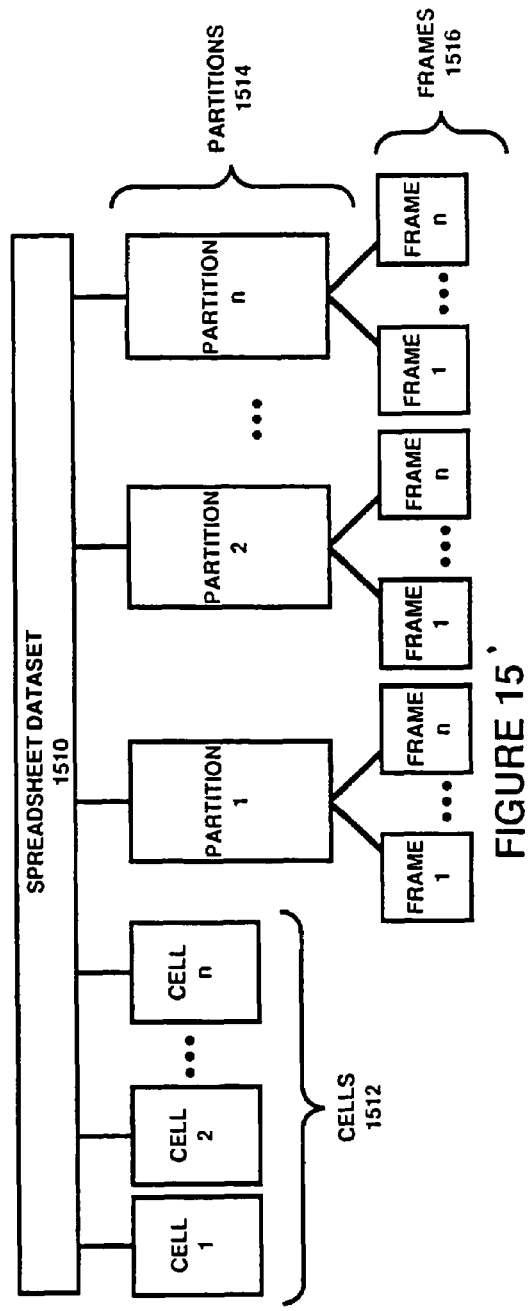

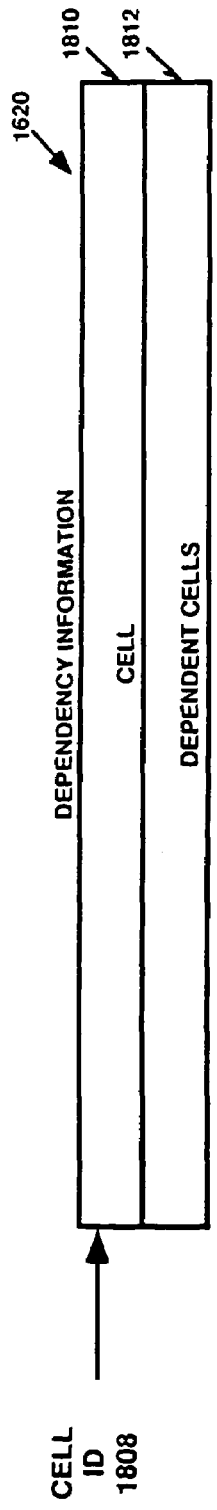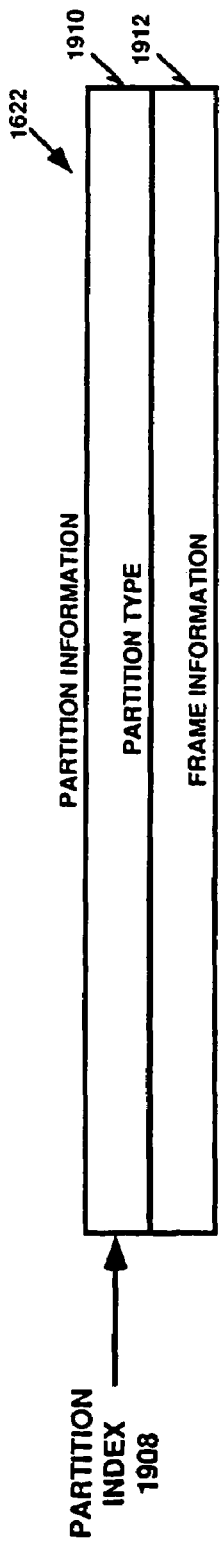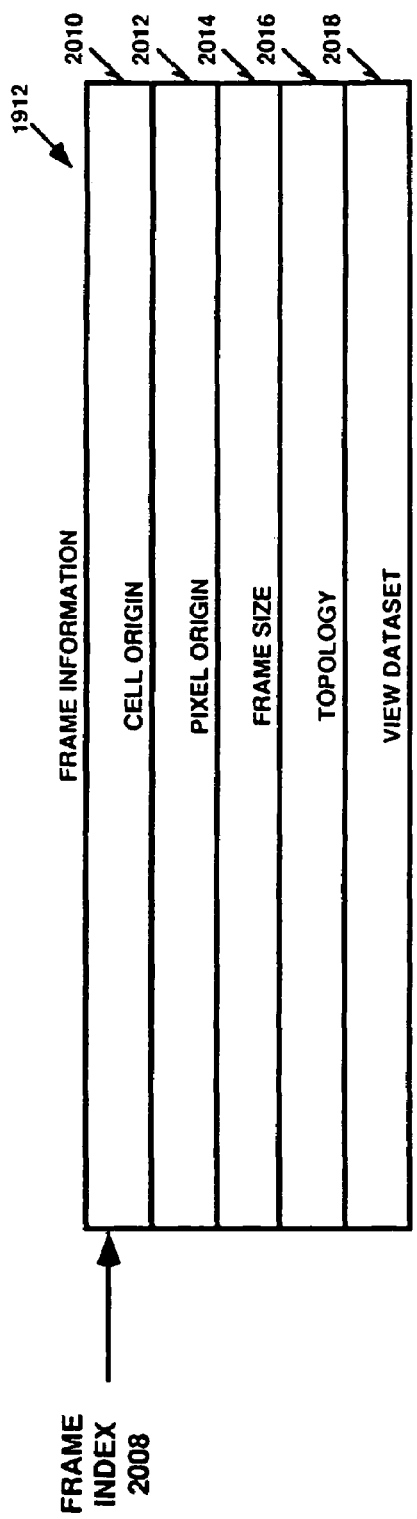

VIEW INFORMATION – 3114

| View Kind<br>3312 |
|---|
| Frame View Information<br>3314 |
| Page View Information<br>3316 |

FIG. 33

FRAME VIEW INFORMATION – 3116

| Pane Count<br>3412 |
|---|
| Pane Information<br>3414 |

DOCUMENT INFORMATION – 4110

| |
|---|
| Window List<br>4112 |
| Principal Dataset<br>4114 |
| Graphic Object Information<br>4116 |
| Text Information<br>4118 |
| Spreadsheet Information<br>4120 |
| Database Information<br>4122 |
| Formatting Information<br>4124 |
| Printing Information<br>4126 |
| Default Information<br>4128 |
| File System Information<br>4130 |

COMPUTER SYSTEM INTEGRATING DIFFERENT DATA TYPES INTO SINGLE ENVIRONMENT

RELATED APPLICATIONS

This application is a continuation of U.S. patent application Ser. No. 09/721,545, filed Nov. 22, 2000, now U.S. Pat. No. 6,605,122 which is a continuation of U.S. patent application Ser. No. 08/673,965, now U.S. Pat. No. 6,154,756, filed Jul. 1, 1996, which is a file-wrapper continuation of U.S. patent application Ser. No. 08/408,114 filed Mar. 21, 1995, now abandoned, which is a file-wrapper continuation of U.S. patent application Ser. No. 07/914,193, filed Jul. 15, 1992, now abandoned.

BACKGROUND OF THE INVENTION

1. Field of the Invention

The present invention relates to the field of manipulating information in a computer system. Specifically, the present invention relates to the manipulation of different types of data such as alphanumeric text, graphics, or other forms of information visibly displayed within a single document on an output device of a computer system.

2. Prior Art

Computer systems are commonly used for viewing and manipulating different types of information. A few of the more well-known types of information include alphanumeric text, graphics, and other forms of information. In order to manipulate these different types of information, various computer programs called application programs have been developed and made available in the prior art. Such application programs include word processing programs, spreadsheet programs, data base programs, input/output or communications programs, drawing or graphics generation programs, and other application programs for viewing and manipulating a particular defined data type.

Documents created and manipulated using these application programs typically have a data type associated with them. For example, a text document may have a text or word processing data type associated with it. In addition, the information associated with a typical text document is stored in a particular format compatible with a corresponding word processing application program. Similarly, different data types and data formats corresponding to other application programs are associated with documents created or manipulated by those application programs.

The prior art method of associating data types with documents gives rise to many problems. Documents of one data type are typically incompatible with application programs designed to manipulate documents of a different data type. For example, a word processing document typically cannot be manipulated by a graphics application program. Similarly, spreadsheet documents are incompatible with database application programs. Thus, documents in the prior art tend to be compartmentalized within the framework of their associated data type. This limitation severely restricts the opportunity for the transfer of information between documents of different types.

Some application programs provide mechanisms for importing and exporting information from one application to another. Similarly, a well-known technique of cutting and pasting information from one application program into a temporary storage area and subsequently into a second application program is well-known in the art. These mechanisms provide a limited means for transferring information between two application programs; however, some level of manipulation or formatting capability is lost in the transferred information. For example, some word processing programs allow graphics images to be inserted into the text of a word processing document using a cut/paste or import function mechanism. Although the graphics image coexists with the text in the word processing document, some word processors do not allow the graphics image itself to be manipulated in the manner provided by the graphics application program in which the graphics image may have been created. Specifically, lines, polygons, or other graphics shapes can no longer be repositioned or resized once transferred to the word processing document. Similarly, in some word processors, a block of text transferred from a word processing document into a spreadsheet or database application program for example, loses its text formatting capabilities provided by the word processing application program in which the block of text was originally created. Thus, prior art systems have only a limited capability of integrating various types of information into a single environment.

Some prior art programs display information in rectangular portions of a display screen called panes. Other programs support multiple views of various information in pre-defined locations of the display screen. These programs, however, explicitly manage different display screen locations in which information is displayed. No support is provided for displaying different data types nested in the same display location. These prior art systems cannot display any arbitrary data type in any arbitrary display screen location. Furthermore, other programs do not allow multiple views with different view scales in each view.

Other prior art systems include a software product called Ragtime™ developed by RagTime.de Development GmbH of Garbsen, Germany. Ragtime is a frame-based program in which users draw out frames and work within them. However, Ragtime users must explicitly create all the frames they use. Frames generally map to a specific screen location. Further, Ragtime provides no document structure incorporating various data types. Finally, Ragtime has no database capabilities, and very primitive graphics capabilities. It primarily manipulates text and spreadsheets.

Microsoft Works™, developed by Microsoft™, Inc. of Redmond, Wash., is a form of an integrated application program. It provides word processing, spreadsheet, database, graphics, and communications capabilities. Microsoft Works typifies what is commonly called a modular structure of integrated software. This structure comprises four or more separate programs in one; the user may create documents of a given type, but there is little or no interaction between the program modules. In both the word processing and spreadsheet modules, graphics objects can be drawn, but there is no separate graphics document type. Drawing in word processing or spreadsheet documents in the prior art is 'flat.' There are no frame objects, so there is only one level of structure. The text objects use built-in text editing facilities and do not provide the full word processing capabilities as would be provided by a true text frame. The graphics functionality is limited; it is really a tacked on feature and not a true environment.

What is needed is a totally integrated functional environment. There still may be documents of specific types, but frames may be added to any of them as graphic objects to create an arbitrarily-structured compound document. These frame objects may be manipulated like any graphics object; they may also be activated in order to work within a nested environment.

Thus, a better means for viewing and manipulating information of different data types is needed.

SUMMARY OF THE INVENTION

The present invention provides a means for viewing and manipulating different data types within a single document in an integrated computer system environment. Each data type is maintained within a dataset. Datasets comprise logical information of a common data type along with the functions or processing logic to view and manipulate that data type. The logical types of information managed by datasets in the preferred embodiment include graphical objects, blocks of text, spreadsheet cells, and database records. Datasets also manage frames. Frames provide a means by which datasets are viewed and manipulated. Each dataset is responsible for managing the display of information inside one of its frames. Of particular significance in the present invention is the logical independence between the information contained in a dataset and the manner in which the information is viewed and manipulated (i.e. frames). This independence provides a significant improvement in the ability to manipulate various types of information. Any type and number of datasets can be combined together into a single document and saved in a file system as a document file.

The present invention builds upon the dataset and frame structure by allowing frames to be nested within datasets. In this manner, datasets can reference other (nested) frames onto other datasets. These nested frames provide a hierarchical layering of information within a single document. Thus, for example, a graphics document may contain a nested frame onto a text dataset or spreadsheet dataset. Similarly, a text document may contain a nested frame onto a graphics dataset, a spreadsheet dataset, or any arbitrary type of dataset, including another text dataset. Any type of dataset can include a nested frame onto any other type (or same type) of dataset.

The present invention includes a window structure for displaying frames of one or more datasets. Views within a window are of two types: frame views and page views. In a frame view, a window is divided into sub-regions called panes. A set of frames (denoted a partition) of a dataset is displayable in each pane. In a page view, a document is divided into pages. Frames are drawn into each page through a page dataset that can be used to combine other information into a page. Word processing (text) documents only have page views in the preferred embodiment. Graphics documents have both frame views and page views. Database documents have four different kinds of views: browse paged (page view), browse non-paged (frame view), find (frame view), and layout edit (page view).

The present invention, also provides a context structure for improving the performance in the display of frames. This context structure includes a context list that retains the display screen location and scale of each frame of a particular dataset in a given window. The context list is used to update the display screen when a user action or other system event causes the display image to change.

BRIEF DESCRIPTION OF THE DRAWINGS

FIG. 5 illustrates the contents of the partition data in a graphics dataset.

FIG. 6 illustrates the contents of the frame data in a graphics dataset.

FIG. 7 is a block diagram of a text dataset.

FIG. 8 is a block diagram of the content of a text dataset.

FIG. 12 illustrates the content of the text item information in a text dataset.

FIG. 13 illustrates the content of the status information in a text dataset.

FIG. 14 illustrates the content of the frame information in a text dataset.

FIG. 15 is a block diagram of a spreadsheet dataset.

FIG. 18 illustrates the content of the dependency information in a spreadsheet dataset.

FIG. 19 illustrates the content of the partition information in a spreadsheet dataset.

FIG. 20 illustrates the content of the frame information in a spreadsheet dataset.

FIG. 33 illustrates the content of the view information in a window.

FIG. 34 illustrates the content of the frame view information in a window.

FIG. 41 illustrates the content of the document information in a document.

DETAILED DESCRIPTION OF THE PREFERRED EMBODIMENT

The present invention provides a means and a method for viewing and manipulating information of various data types within a single computer system environment. In the following description, numerous specific details are set forth in order to provide a thorough understanding of the invention. However, it will be apparent to one of ordinary skill in the art that these specific details need not be used to practice the present invention. In other instances, well-known structures, circuits, and interfaces have not been shown in detail in order not to unnecessarily obscure the present invention.

Figure 1:
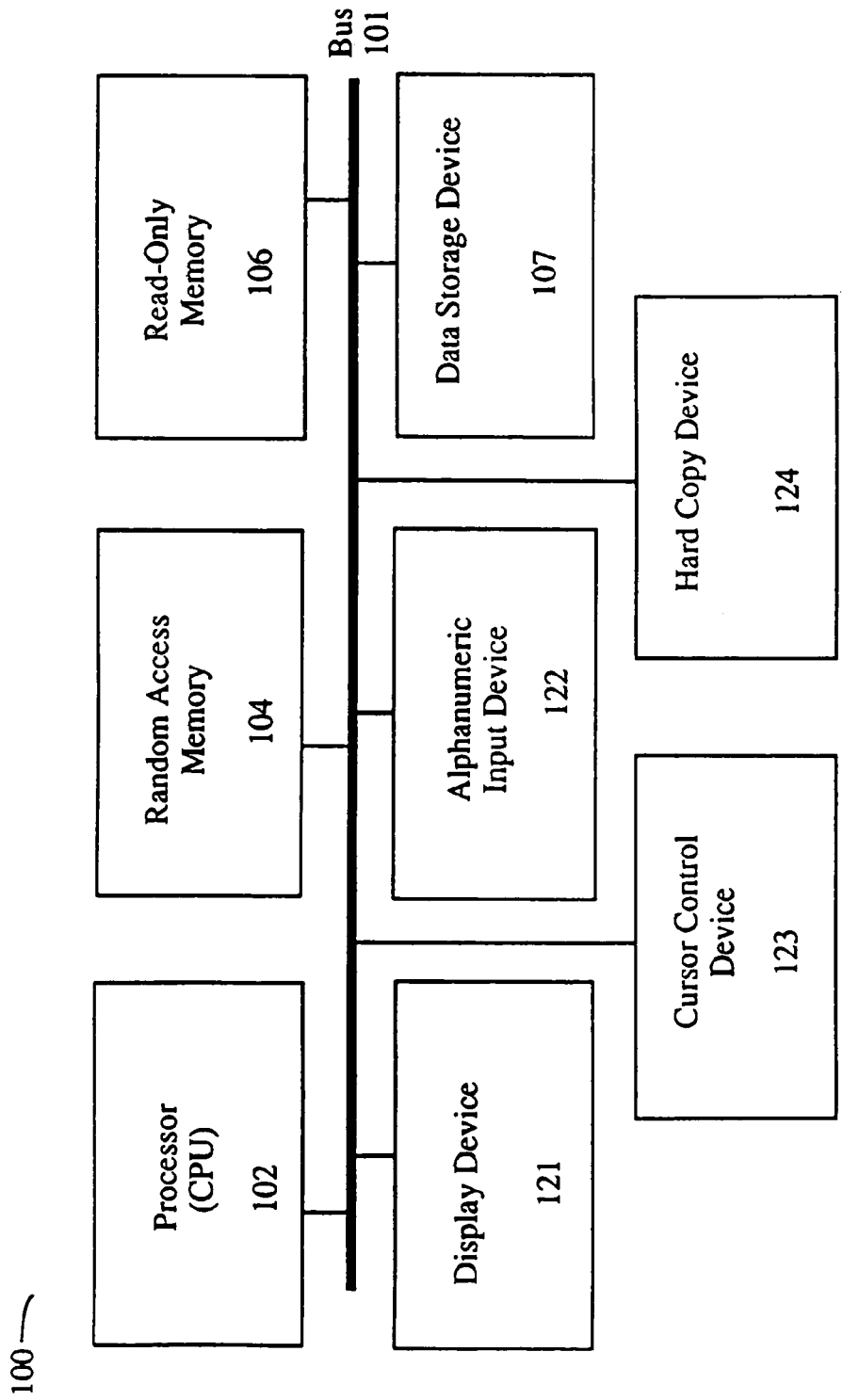
FIG. 1 is a block diagram of a computer system used in the preferred embodiment.

Referring to FIG. 1, the computer system 100 upon which the preferred embodiment of the present invention is implemented is illustrated. Computer system 100 comprises a bus or other communication means for communicating information, and a processing means (CPU) 102 coupled with the bus 101 for processing information. Computer system 100 further comprises a random access memory (RAM) or other dynamic storage device 104 (referred to as main memory) coupled to the bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control device 123, which may comprise a mouse, a track ball, or cursor direction keys on the input device 122. Cursor control device 123 is coupled to bus 101 for communicating direction information and command selections to processor 102, and for controlling cursor movement on display device 121. Another device which may be coupled to bus 101 is a hard copy device 124 which may be used for printing instructions, data, or other information on a medium such as a paper, film, or similar types of hardcopy media. It will be apparent to those skilled in the art that a particular computer system may be configured with more or less of the devices specified above.

In the preferred embodiment, computer system 100 is one of the Macintosh® family of personal computers manufactured by Apple® Computer, Inc. of Cupertino, Calif. (Apple and Macintosh are registered trademarks of Apple Computer, Inc.). Processor 102 is one of the 68000 families of microprocessors, such as the 68000, 68020, or 68030 manufactured by Motorola, Inc. of Schaumburg, Ill. Computer system 100 operates with the processing logic of the present invention as described below.

The most fundamental concept in the present invention is a dataset, or dset for short. Datasets are software-implemented control mechanisms that manage logical sets of information, such as items of text, graphical objects, database records, etc. A dataset is roughly analogous to the content of a document from a conventional application program; however, documents in the present invention can contain many different datasets. In fact, datasets are the basic building blocks of documents in the present invention.

There are four kinds of datasets in the preferred embodiment: 1) Graphics (or object) datasets manage collections of graphical objects. These objects can be ovals, rectangles, polygons, etc.; they can also be frame objects, which are essentially views onto other datasets. Frames and frame objects will be discussed more fully below. 2) Text datasets manage collections of alphanumeric text with styles, paragraphs, rulers, etc. Styles, paragraphs, and rulers are well-known word, processing concepts. A text dataset corresponds to all the text in a word processing document, or a story in a document with multiple items of text. 3) Spreadsheet datasets manage cells containing numbers, text, and formulas; they also maintain dependencies between these cells, cell styles, column widths, etc. 4) Database datasets primarily manage lists of records. They also contain information on field types and layout configurations.

Figure 2:
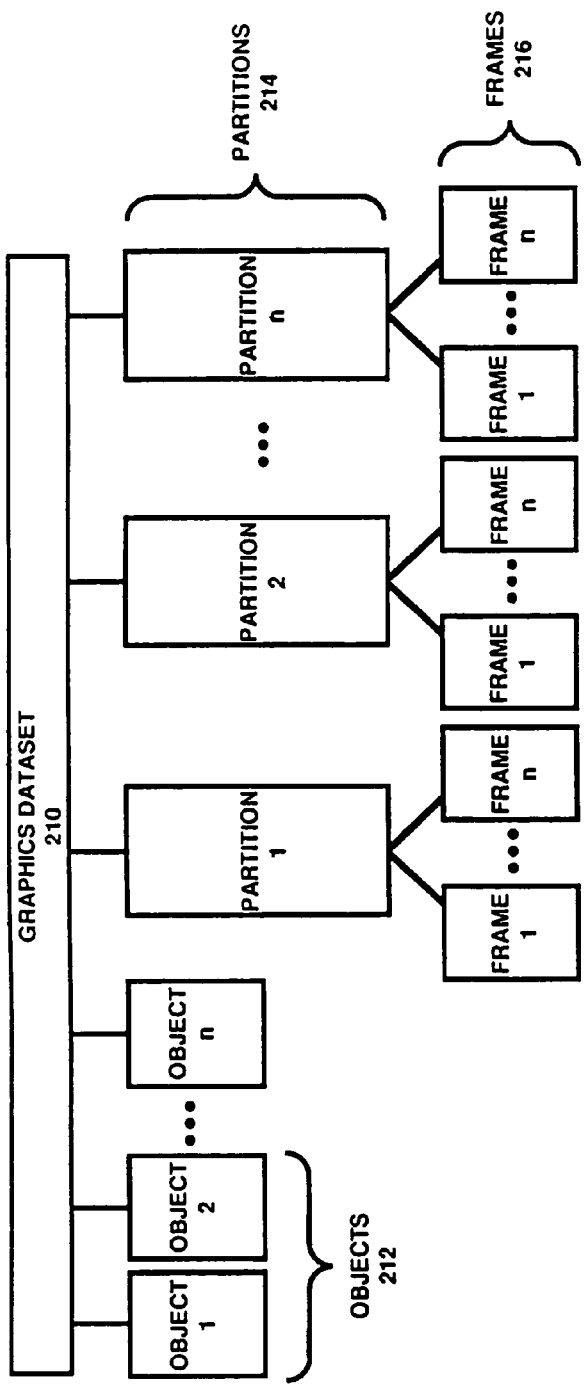
FIG. 2 is a block diagram of a graphics dataset.

Referring now to FIG. 2, a block diagram illustrates the data structure of a graphics dataset 210 in the present invention. A graphics dataset comprises a set of graphics objects 212, a set of partitions 214, and a set of frames 216. Graphics objects 212 include displayable shapes such as lines, polygons, conics, arcs, and other graphics objects such as text objects or bitmap objects. Objects 212 may also be frame objects used to view other datasets. Text objects are a special case of frame objects. The object data structures are described in detail in connection with FIG. 4.

Partitions 214 are groupings of frames 216. Frames are the mechanism by which datasets are viewed and manipulated. Each dataset is responsible for managing its own frames. A dataset can reference the information in a different dataset using a frame. For example, the result of a user action can cause the present invention to draw a frame in a graphics dataset. In response, the graphics dataset draws all objects of the graphics dataset that are visible in the specified frame. The most important aspect of frames is that they insulate dataset-specific behavior from the particular environments in which the datasets must operate. In particular, datasets are not responsible for managing functions such as window scrolling, window sub-regions (panes), paging or other environment-specific functions. These functions are handled uniformly, independent of document or dataset type, at a higher functional level. The use of windows and panes in general is known in the art.

As will become apparent in the following detailed description, the main functions performed by a dataset using frames include drawing frames and building contexts. Frames are employed by each of the four types of datasets. In each case, frames provide a means for viewing and manipulating dataset information. Because some of the specific characteristics of frames differ for the various types of datasets, frames will be described in connection with each type of dataset.

One common characteristic of frames, however is that frames can be linked. Thus, frames can be organized into a sequential set of views onto a dataset. In a linked configuration, frames view adjacent portions of a dataset.

Figure 3:
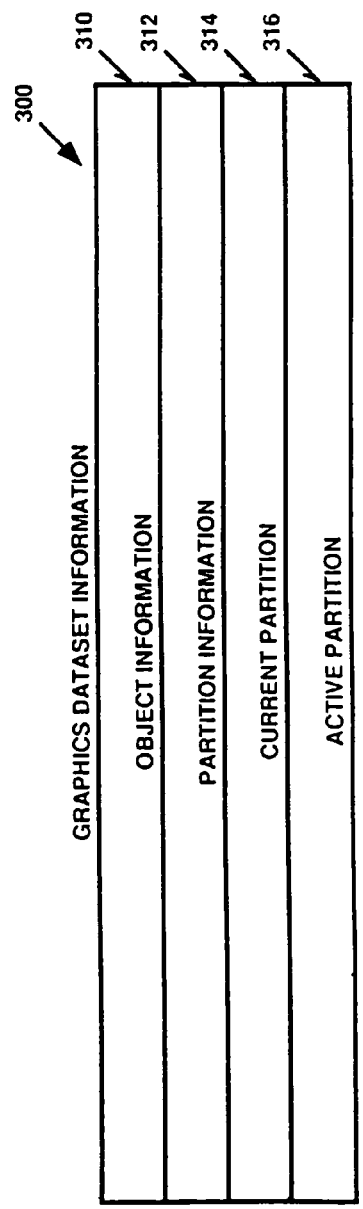
FIG. 3 is a block diagram of the content of the graphics dataset.

Referring now to FIG. 3, the information maintained by a graphic dataset 300 is illustrated. Graphic dataset 300 comprises object information 310, partition information 312, an identity of the current partition 314, and an identity of the active partition 316. Object information 310 comprises information for representing objects 212 of graphics dataset 210.

Figure 4:
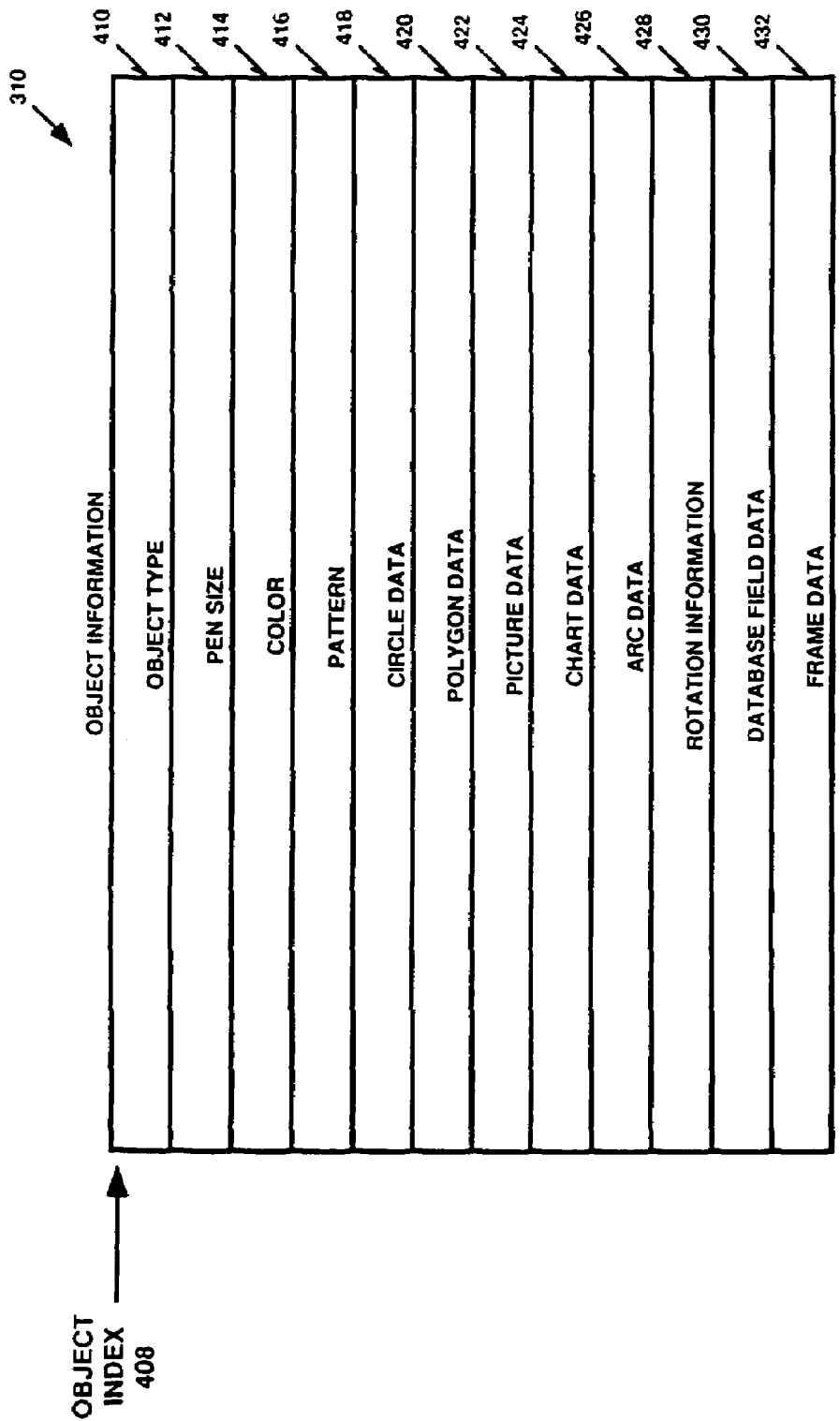
FIG. 4 illustrates the content of the object data in a graphics dataset.

Referring to FIG. 4, the information comprising object information 310 is illustrated. Graphic objects of a graphics dataset in the present invention are represented using object information 310 illustrated in FIG. 4. Object information includes an object type 410. Object types in the preferred embodiment include line objects, rectangle objects, rounded rectangle objects, ovals, arcs, polygons, pictures, charts, database field objects, and frame objects. With the exception of frame objects, the representation of the other graphic object types is generally well-known to those of ordinary skill in the art. The representation of frame objects will be described below.

Pen size 412 defines the width of the lines used to draw the specified object. Color 414 defines the color in which the specified graphic object is displayed. Pattern 416 defines the shading pattern used to fill the interior regions of the specified graphic object. Color 414 and pattern 416 describe the interior of objects. Pen size 412 and pattern 416 describe the borders of objects. Circle data 418 provides a means for representing circular objects of a specified radius or the circular portions of objects such as the rounded corners of rounded rectangles. Polygon data 420 is used for representing polygon objects using a specification of the location of vertices of the polygon. Picture data 422 is used for representing an object as a bitmap picture or other image description protocol such as QuickDraw. A bitmap is a two-dimensional digital representation of a visual image or picture displayable on a display screen. Picture data 422 is used to represent the size and content of a picture bitmap. Chart data 428 is used to represent a chart object. Chart objects represent graphically data contained in a spreadsheet dataset.

Arc data 426 is used to represent arc objects as defined by a starting point and an arc angle. Rotation information 428 contains a rotated bitmap image for pictures and frames. Database field data 430 is used to link a graphic object to a specified database field. Field objects are only used in database layouts. They indicate the positions fields will be displayed in when editing the database.

Frame data 432 is used to represent a frame object. Frame objects provide a means by which a specified graphic object may be used to view or manipulate information contained in a different dataset. The different dataset may be another graphic dataset, a text dataset, a spreadsheet dataset, or a database dataset. Frame objects are similar to rectangle graphic objects in that frame objects have rectangular bounds, a screen position, and pen and fill attributes. However, the interior of frame objects are views into a different dataset. Thus, if a frame of a graphic dataset is drawn in which a frame object is present, the graphic dataset draws a background and border of the frame object and then makes a call to the dataset referenced by the frame object in order to draw the contents of the frame object. In order to perform this dataset nesting operation using frame objects, frame data 432 of object information 310 is used. Frame data 432 comprises the identity of the nested dataset which the frame object is viewing, the partition number of that dataset, and the frame number of the specified partition of the nested dataset. In this manner, datasets can reference frames onto other datasets in a nested and hierarchical fashion. Frame objects which are members of the set of objects 212 of graphics dataset 210 should not be confused with frames 216 which are defined for graphics dataset 210. Frames 216 provide a means for viewing and manipulating information within graphics dataset 210. However, frame objects of objects 212 provide a means for viewing and manipulating information contained within other datasets.

Referring now to FIG. 5, the partition information 312 of graphics dataset 210 is illustrated. Graphics dataset 210 includes a plurality of partitions 214. Information for each partition is maintained within partition information 312. Information for a particular partition is accessed using a partition identification or partition index 508. Partitions in the preferred embodiment are groups or sets of frames. Partitions are used to cluster groups of frames that access a given dataset in different ways. For example, a database dataset may have various layouts for viewing different subsets of the information contained within a database. Partitions may be used to represent each of the various layouts provided by a database dataset. In another example of partitioning, a graphics dataset having two partitions may be used to view graphic objects in two different scales. Each partition of a graphic dataset may be set up to view a specified area of the graphics space. Partitions of a dataset provide this flexibility by including frame information 510 within the partition information structure 312. Frame information 510 includes information for specifying a plurality of frames within a particular partition. Frame information 510 is described in detail in connection with FIG. 6.

Referring now to FIG. 6, frame information 510 within a partition is described. Frame information 510 is duplicated for each of the frames of a specified partition. A particular frame within a partition is accessed using frame index 608. Frame information 510 comprises a frame origin 610 which defines a point in the graphic dataset coordinate system corresponding to the upper left corner of the frame. Frame information 510 also includes frame size 612 which defines the width and height of the frame. In a normalized scale, topology 614 provides a means for defining the spatial relationship of this frame with reference to other frames in the partition. In this manner, frames of a partition may be arranged in a particular order. In the preferred embodiment, frames of a partition are arranged in a two-dimensional tiled arrangement referenced from the upper left hand corner of the dataset and extending first from left to right across the dataset and then from top to bottom down the dataset. View dataset information 618 is used to identify other datasets viewing the dataset of which this frame is a member. In this manner, frames of a given dataset are conveniently cross-linked with other datasets viewing or manipulating a given dataset.

Referring again to FIG. 3, object information 310 and partition information 312 have been described for graphics dataset 210. Current partition 314 defines the partition being operated upon by the dataset. Active partition 316 defines the partition that last received a user mouse button activation.

Referring now to FIG. 7, a block diagram of the content of a text dataset 710 is illustrated. Text dataset 710 comprises a group of text blocks 712 and a set of frames 714 for viewing and manipulating text information within text blocks 712. Text datasets manage collections of text with styles, paragraphs, rulers, and other well known word processing concepts. The actual text within a given text dataset 710 resides within blocks of text 712 which are maintained by text dataset 710. In addition, text dataset 710 provides a plurality of frames 714 which are used for viewing and manipulating text within text dataset 710. Unlike other types of datasets in the preferred embodiment, text datasets do not include partitions. Instead, text datasets manage frames independently.

Referring now to FIG. 8, the information 800 within a text dataset is illustrated. Text dataset information 800 comprises text block information 810 which is used for managing the plurality of text blocks 712.

Figure 9:
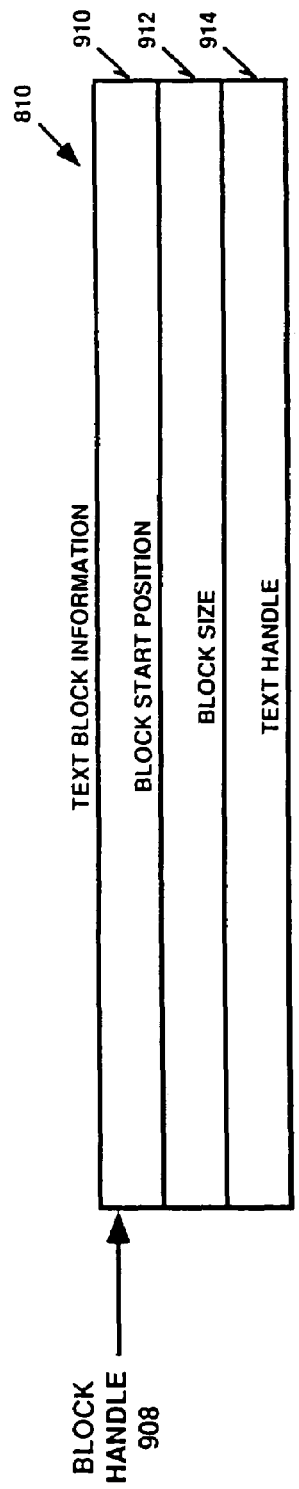
FIG. 9 illustrates the content of the text block information in a text dataset.

Referring now to FIG. 9, the content of text block information 810 is illustrated. Text block information 810 comprises information related to a plurality of text blocks within text dataset 710. A text block is a block of memory, usually a fixed length block memory, in which strings of alpha numeric and control characters are stored. Using information within text block information 810, the text blocks are chained together to form a contiguous and coherent block of text. Chaining text blocks is well known in the art. Each individual text block is referenced using a text block handle 908. The text block handle 908 is assigned when a particular text block is allocated using techniques well-known in the art. For each text block, a block start position 910 is maintained. Block start position 910 defines the position of a text block in relation to other text blocks of the text dataset. Block size 912 defines the number of characters within the text block. Text handle 914 is a pointer to the actual text data contents of the text block.

Referring again to FIG. 8, text dataset information 800 includes block count 812. Block count 812 defines the number of text data blocks within text dataset 710. Character count 814 defines the total number of characters cumulative of all text blocks 712 within text dataset 710. Text insertion point 816 is used by text dataset 710 to manage a position within the text dataset at which insertion of new textual information will occur when initiated by a user of text dataset 710. Text selection points 818 are used to define two points within the text dataset between which a selected region of text is defined. Using techniques well-known in the art, a selected text region may be used for cut, copy, or paste operations.

Figure 10:
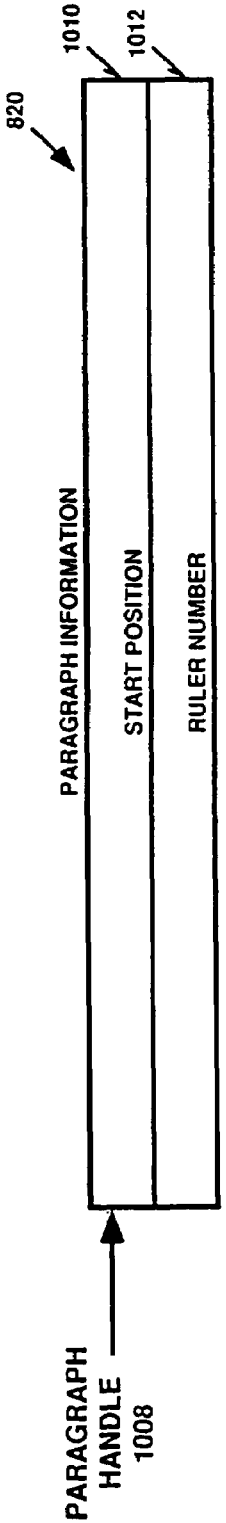
FIG. 10 illustrates the content of the paragraph information in a text dataset.

Referring now to FIG. 10, the content of paragraph information 820 is illustrated in detail. Because the text within a text dataset may be grouped into paragraphs, paragraph information 820 is used to define the location and format of paragraphs. Paragraph information 20 includes start position 1010. Start position 1010 defines the location of each paragraph within text dataset 710. Ruler number 1012 is used to define a format specification for each paragraph. Individual paragraphs may be referenced within a text dataset using a paragraph handle 1008. There is one paragraph handle per text dataset. Each paragraph has an entry in this handle.

Figure 11:
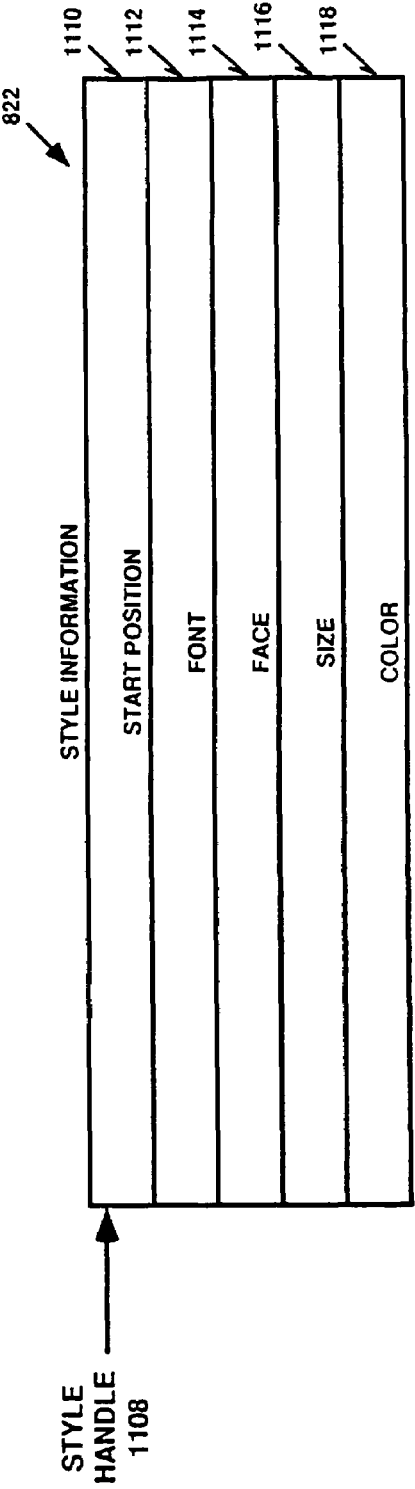
FIG. 11 illustrates the content of the style information in a text dataset.

Referring again to FIG. 8, text dataset information 800 includes style information 822. Referring now to FIG. 11, the content of style information 822 is defined in detail. Regions within text dataset 710 and a corresponding style may be defined using style information 822. Style information provides a means for formatting a region of data within a text dataset in a particular way. Style information 822 comprises a start position 1110 which defines a character position within text dataset 710 at which the specified style is applied. Font 1112 defines the font corresponding to the specified style. Size 1116 defines the character size corresponding to a style. Color 1118 defines the color in which the corresponding text is displayed. A particular style within a text dataset is referenced using style handle 1118. Style handle 1118 is assigned when a particular style is created using techniques well-known in the art.

Referring again to FIG. 8, text dataset information 800 includes text item information 824. Various items can be inserted into the text. These items are managed using text item information 824. These items include footnotes and graphic datasets. A footnote is a text dataset. A graphic dataset may contain a picture.

Referring again to FIG. 8, text dataset information 800 also includes status information 826. Referring now to FIG. 13, the content of status information 826 is illustrated. Status information 826 comprises overflow field 1318 which is true if text in a text frame may overflow a frame border. Text select field 1320 is true if there is an active selection range. A selection range is active if text selection points 818 have been defined. Picture select 1322 is true if there is a picture selected.

Caret field 1324 defines whether or not a caret character is drawn on the display screen. It will be apparent to those skilled in the art that other status information for a text dataset may be maintained within status information 826.

Referring again to FIG. 8, text dataset information 800 also comprises frame information 828. Referring now to FIG. 14, frame information 828 is illustrated. Frame information 828 provides a means for maintaining information for managing a plurality of frames 714 within text dataset 710. Each individual frame is referenced using a frame index 1408. Text frames provide a means for viewing and manipulating text information within a text dataset. For example, a text frame may be used to view or manipulate a page of text, a column of text, a header, a footer, a footnote, a database field, or other text object. In each case, users of a text dataset may access a text frame in a uniform and consistent manner regardless of the specific characteristics of the text that the frame is viewing. In order to implement this flexibility, frame information 828 comprises a frame start field 1410. Frame start field 1410 defines a character position within a text dataset 710 at which a particular frame begins. From this specified start position, a width 1412 and height 1414 define a two-dimensional region for the frame within text dataset 710. Lines field 1416 and line count field 1418 are used to define the text lines that are contained within the specified frame.

Referring again to FIG. 8, the content of text dataset information 800 is defined as described above. In addition, text datasets provide a means for referencing other datasets using special characters or footnotes embedded within text blocks 712. These special characters are actually frames onto object datasets or text datasets (footnotes). In a manner similar to frame objects in a graphics datasets, embedded frame characters in a text block of a text dataset provide a means by which information from another dataset may be embedded within a text block.

Referring now to FIG. 15, a block diagram of the data structures associated with a spreadsheet dataset 1510 is illustrated. Spreadsheet datasets manage cells containing numbers, text and formulas. Spreadsheet datasets also manage the dependencies between cells. Spreadsheet dataset 1510 therefore includes a plurality of cells 1512 each having a location within a two dimensional spreadsheet array. This spreadsheet array is typically stored in memory of the computer system in which the present invention operates. Spreadsheet dataset 1510 also includes a plurality of partitions 1514. In a manner similar to graphics datasets, the partitions 1514 of spreadsheet dataset 1510 each comprise a set of frames 1516. Each of the frames 1516 provide a means for viewing and manipulating information within cells 1512 of spreadsheet dataset 1510.

Figure 16:
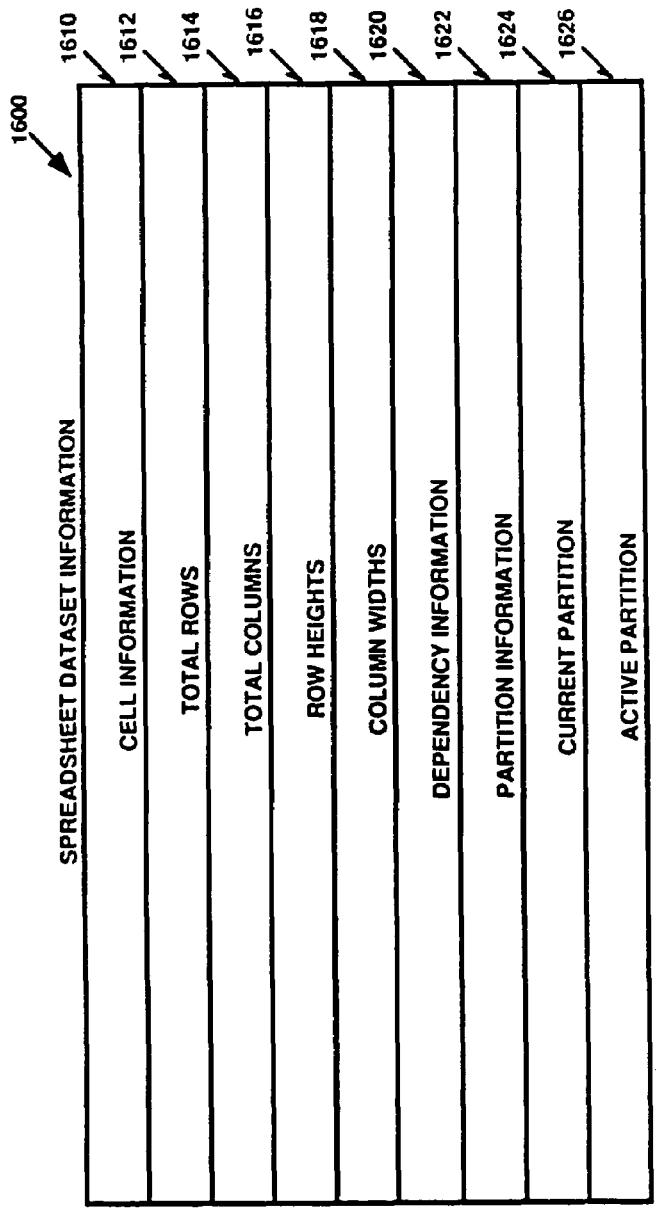
FIG. 16 is a block diagram of the content of a spreadsheet dataset.
Figure 17:
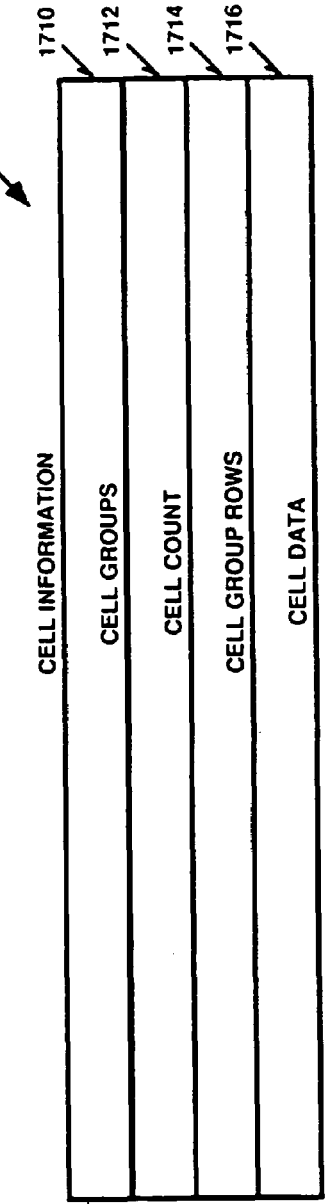
FIG. 17 illustrates the content of the cell information in a spreadsheet dataset.

Referring now to FIG. 16, the information 1600 contained within a spreadsheet dataset is illustrated. Spreadsheet dataset information 1600 includes cell information 1610. Cell information 1610 comprises information necessary for representing and managing each of spreadsheet cells 1512. Referring now to FIG. 17, the information contained within cell information 1610 is illustrated. For the sake of storage efficiency, cells are stored within a spreadsheet dataset in cell groups, because each cell may contain a simple number, a string of text, or a complicated formula. The storage requirements necessary for each cell may be quite diverse. Some cells may require only a single memory location, while others may require a large block of memory. For this reason, the number of cells stored in each group is dependent upon the storage requirements for each of the individual cell members of the group. An association between individual cells and the groups of which they are members are stored in cell groups data item 1710 of cell information 1610. A count of the number of cells in each group is maintained in cell counts 1712. The spreadsheet rows represented by particular cell groups are maintained in cell group rows data item 1714. Cell group rows data item 1714 forms an association between each of the cell groups and the rows of a spreadsheet that they represent. Cell data 1716 is a portion of spreadsheet dataset 1510 used for the storage of the numeric, textual, or formula contents of each of the individual cells of a spreadsheet. Each of the individual cell groups of a spreadsheet may be accessed using a cell group index 1708 into cell information 1610. In this manner, each of the cells of a spreadsheet may be managed on a cell group basis.

Referring again to FIG. 16, spreadsheet dataset information 1600 includes a total row count 1612, a total column count 1614, row height parameters 1616 and column width parameters 1618. These parameters are used to define the dimensions of the spreadsheet represented by spreadsheet dataset 1510. Dependency information 1620 defines the relationship between cells. For example, the value contained within a particular cell may be dependent upon or derived from the value contained in a different cell.

Referring now to FIG. 18, the content of the dependency information 1620 maintained within spreadsheet dataset 1510 is described. For each cell 1810, the corresponding dependent cells 1812 are retained. A cell ID 1808 is used to access the dependency information for a particular cell. The means for retaining dependency information for cells in a spreadsheet is well-known in the art.

Referring again to FIG. 16, spreadsheet data information 1600 also includes partition information 1622. Partition information 1622 is used to manage a plurality of partitions 1514, each containing a plurality of frames 1516. Referring now to FIG. 19, the content of partition information 1622 is illustrated. For each partition within spreadsheet dataset 1510 a partition type 1910 and associated frame information 1912 is retained. For each partition, a partition index 1908 is used to access the partition data within partition information 1622. Unlike graphics datasets, partitions within spreadsheet datasets may be of different types. Thus, a partition type parameter 1910 is necessary for each spreadsheet partition. The various types of spreadsheet partitions correspond to the manner in which the frames of a partition are used. In the preferred embodiment, three different spreadsheet partition types are provided: (1) object frame partitions, (2) frame view partitions, and (3) page view partitions. There is not much behavioral difference in the three partition types. How a partition is used affects, for example, whether partial rows or columns are allowed to fit within frames.

In addition to a partition type 1910, partition information 1622 includes frame information 1912 comprising data defining the frames in each of the partitions of spreadsheet dataset 1510. Frame information 1912 includes a cell origin 2010 which defines the cell of the spreadsheet dataset 1510 that is positioned at a reference position within the frame. Typically, the reference position of a frame is the upper left-hand corner of the frame. The same origin position is defined in pixel coordinates with pixel origin 2012. As referenced from the frame origin defined by cell origin 2010 and pixel origin 2012, the size of the frame in terms of spreadsheet rows and columns is stored in frame size 2014. Frame topology information 2016 is used to define a relationship between a set of frames. View dataset 2018 provides a link between the frame and another dataset using the frame to view or manipulate spreadsheet dataset information. View dataset 2018 is a parameter representing the identity of the viewing dataset. The view dataset 2018 may be a reference to a graphics dataset, a text dataset, a database dataset, or another spreadsheet dataset. In this manner, independent datasets may be linked or nested in any arbitrary hierarchy. In the preferred embodiment, the view dataset is a graphics dataset.

Referring again to FIG. 16, spreadsheet dataset information 1600 also includes a current partition 1624 and an active partition parameter 1626.

Figure 21:
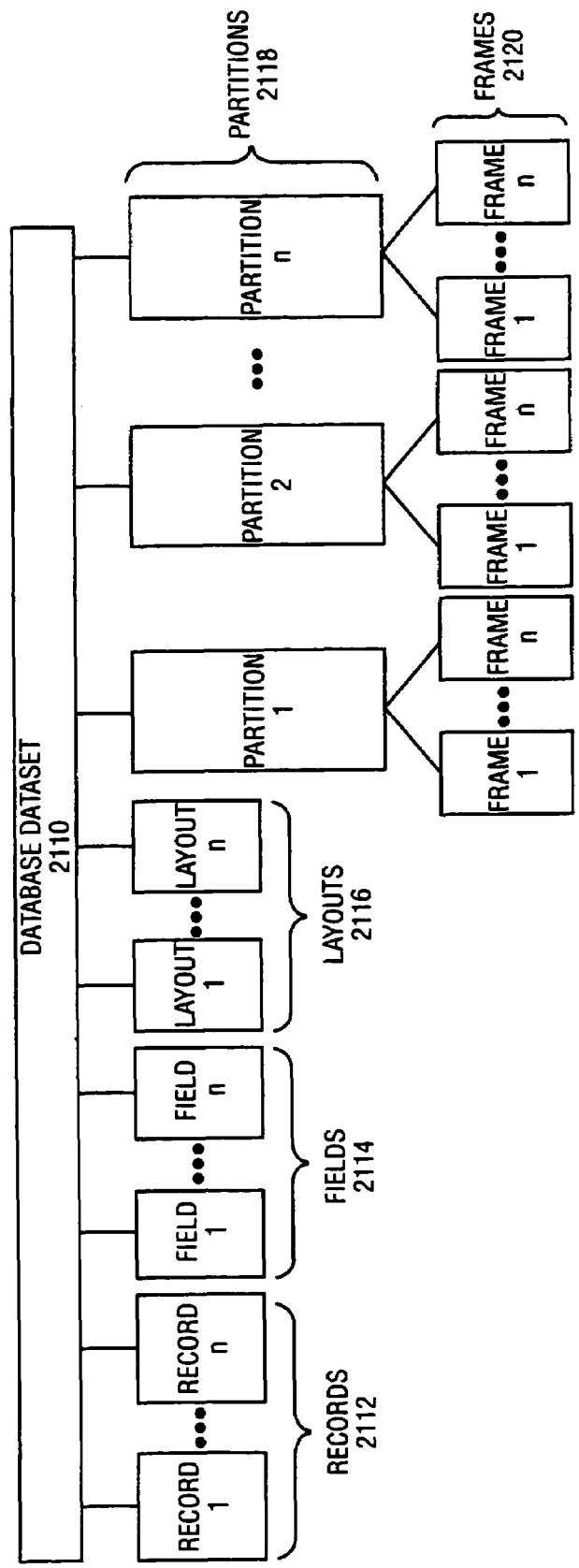
FIG. 21 is a block diagram of a database dataset.

Referring now FIG. 21, a block diagram of a database dataset 2110 of the present invention is illustrated. Database dataset 2110 comprises a plurality of records 2112, a plurality of fields 2114, a plurality of database layouts 2116, a plurality of partitions 2118, each containing a plurality of frames 2120. Database datasets are primarily used to manage lists of records. Fields and layouts are structures for arranging record data in various configurations.

Database datasets are somewhat more complicated than other types of datasets for two main reasons. The first reason for this is that the database datasets are managed using constructs provided by other dataset types. For example, database datasets use graphics datasets for displaying layouts. Further, database datasets use text datasets for editing information in fields. In addition, database datasets use cell group storage facilities and formula evaluation facilities of spreadsheet datasets. Thus, database datasets are hierarchical composites generated from other dataset primitives.

Another aspect that makes database datasets somewhat more complex is the various partition types provided for database datasets. For example, in order to simply view the record information in a database dataset, a browse partition is provided in the preferred embodiment. Frames in a browse partition are used to display record information in a predefined configuration. Using a second partition, users are allowed to edit a layout instead of the information contained within a record. In order to support layout editing, a layout partition is provided for the purpose of displaying a layout instead of displaying records and record data. Using a third partition type, users of a database dataset can enter record information that is used as search criteria for searching through the database for records matching the search criteria. This well known database search technique is typically called a database "find" interface. In support of the "find" operation, a "find" partition is provided. In a "find" partition, a record template is displayed within the record frames and search criteria is input by a user into the fields of the frame instead of record data. In addition, database datasets provide frame view partitions and page view partitions. The use of partitions in a database dataset will be described in more detail below.

Figure 22:
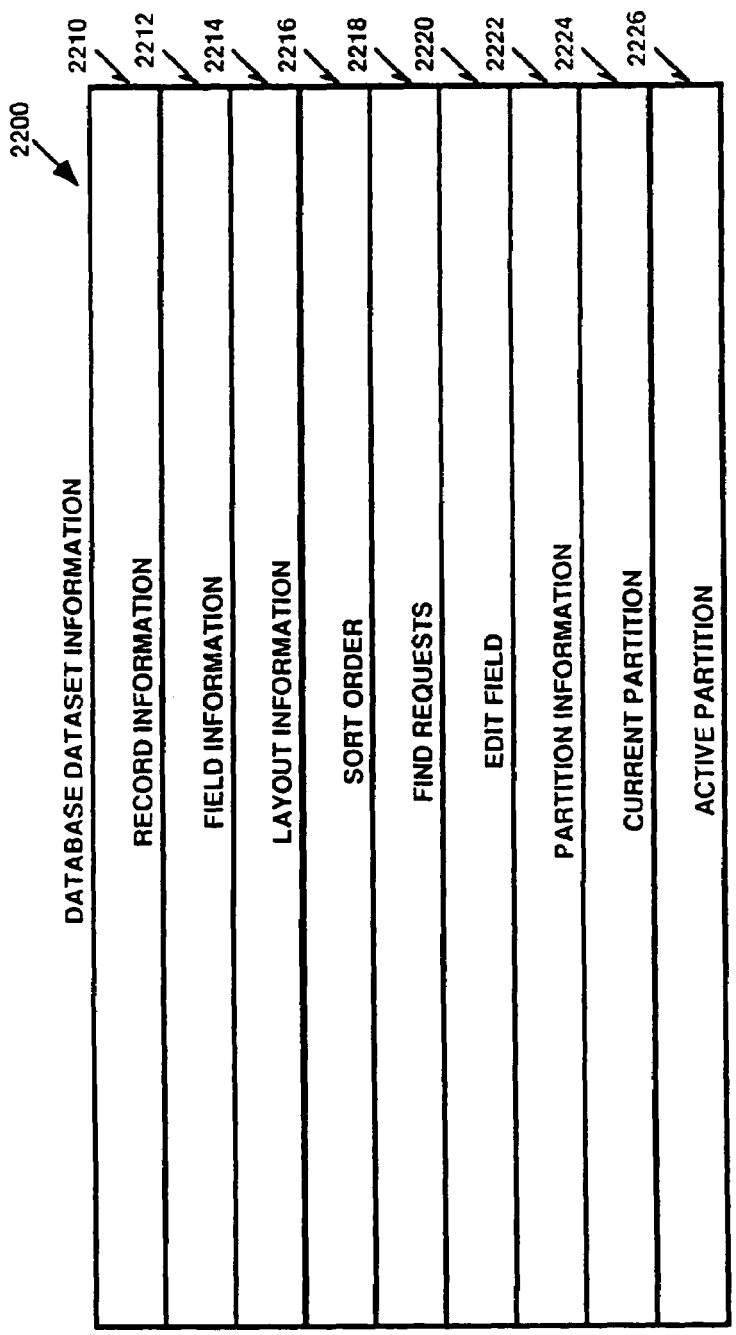
FIG. 22 is a block diagram of the content of a database dataset.
Figure 23:
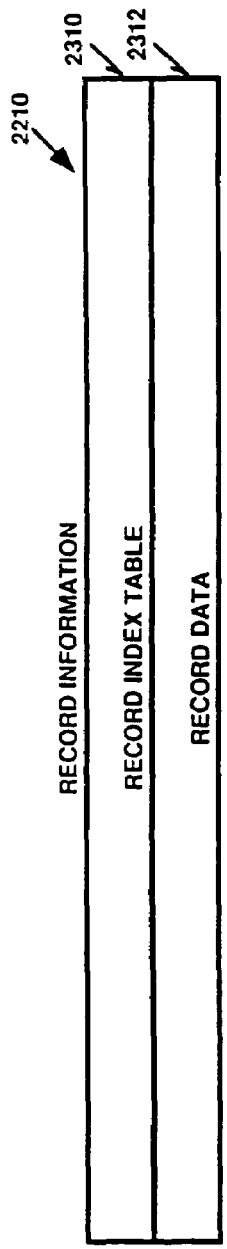
FIG. 23 illustrates the content of the record information in a database dataset.

Referring now to FIG. 22, the database dataset information 2200 of a database dataset 2110 is illustrated. As shown, database dataset information 2200 comprises record information 2210. Referring now to FIG. 23, record information 2210 is illustrated in detail. Record information 2210 comprises record index table 2310 and record data 2312. Record data 2312 comprises the actual database record contents, each record of which is indexed using record index table 2310.

Figure 24:
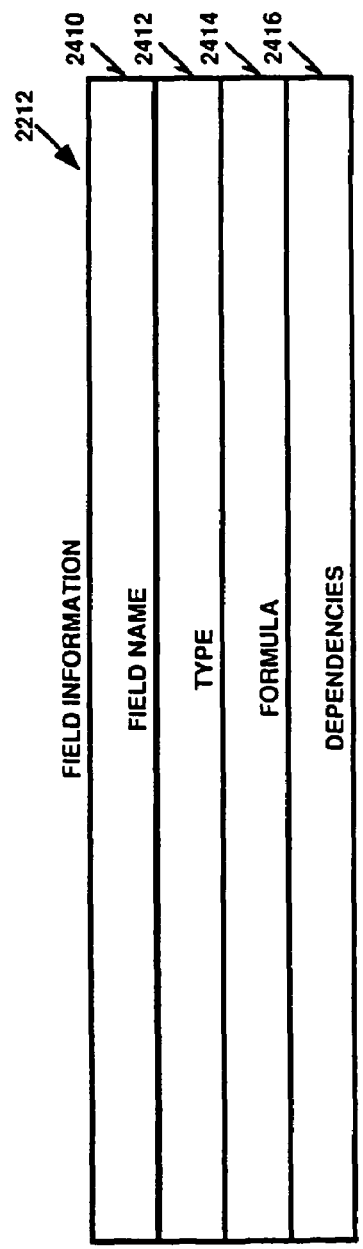
FIG. 24 illustrates the content of the field information in a database dataset.

Referring again to FIG. 22, database dataset information 2200 includes field information 2212. Referring to FIG. 24, field information 2212 is shown in detail. Field name 2410 represents the identity of a particular database field. Each field includes a type specification 2412 which identifies the type of information that may be contained within the field. For example, a particular field may be a numeric field, an alpha-numeric field, a date field, or a variety of other types of well-known database field types. Formula 2414 provides a means for storage of a formula or computational process that may be applied to a particular field. Dependencies 2416 provides a means for linking the content of one field to another field. In a manner similar to spreadsheet cells, fields of a database may be interlinked in a dependency table such as dependencies 2416.

Figure 25:
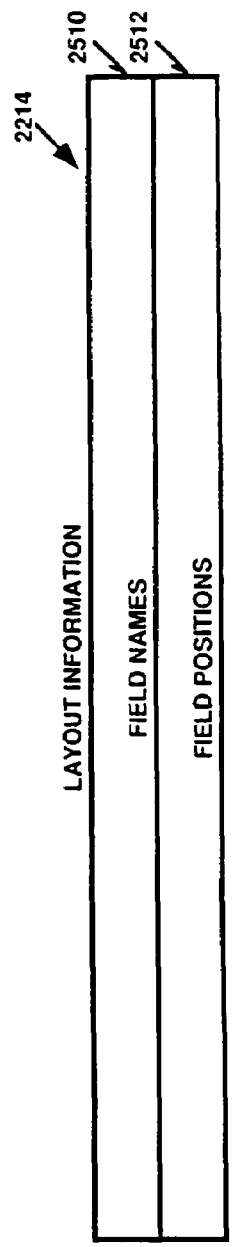
FIG. 25 illustrates the content of the layout information in a database dataset.

Referring again to FIG. 22, database dataset information 2200 includes layout information 2214. Referring now to FIG. 25, layout information 2414 comprises field names 2510 and field positions 2512. For a particular database layout in a database dataset, a layout includes the combination of a set of fields that are identified using field names 2510. Each of the fields may be arranged in a particular configuration as specified by field positions 2512. Layout is defined primarily by a graphics dataset storing field and label positions.

Referring again to FIG. 22, database dataset information 2200 includes sort order 2216 which identifies a particular sorting of the records in the database dataset. The find requests field 2218 is used for storage of search criteria that is used for searching the contents of a database dataset. The use of search criteria and the specification of same in a database is well-known in the art. Edit field 2220 identifies a field of a database dataset that is currently being edited. Partition information 2222 specifies a plurality of partitions associated with a database dataset and a plurality of frames associated with each partition.

Figure 26:
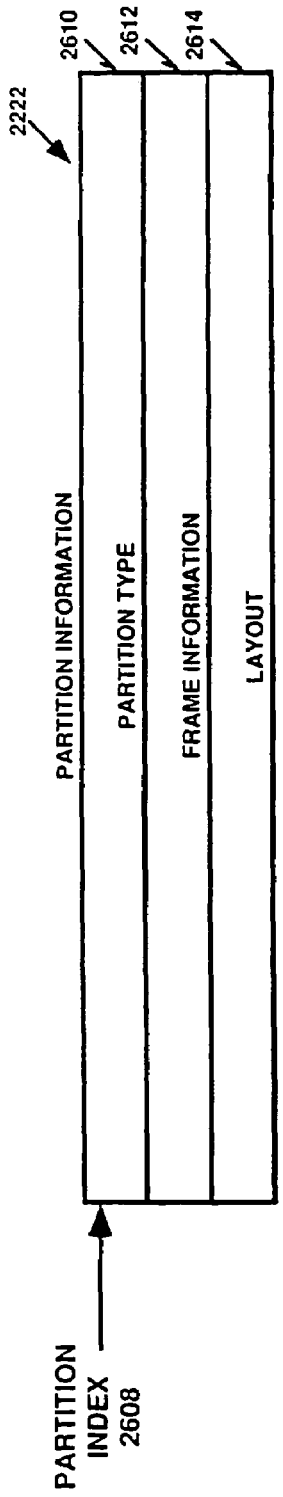
FIG. 26 illustrates the content of the partition information in a database dataset.

Referring now to FIG. 26, the contents of partition information 2222 is illustrated. In a manner similar to a spreadsheet dataset, partition information 2222 includes a partition type 2610. As described above, partition type 2610 specifies one of several types of available database dataset partitions including a layout partition, a find partition, a frame view partition, and a page view partition. A layout partition is used for editing a database layout. A layout may be edited by specifying which fields of a database dataset are included in a particular layout and by specifying the positions of the selected fields within the layout. A find partition is used for entering search criteria that is used for searching records of a database. A frame view partition and page view partition are used in a browse mode for displaying the contents of database records. Frame view partitions and page view partitions are described in more detail in connection with FIG. 27.

Figure 27:
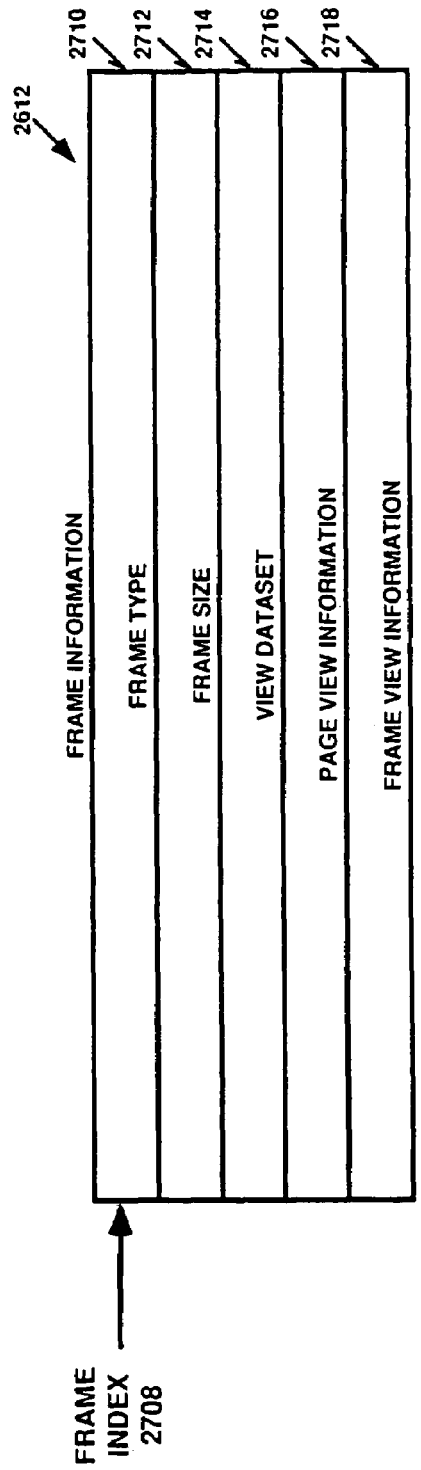
FIG. 27 illustrates the content of the frame information in a database dataset.
Figure 28:
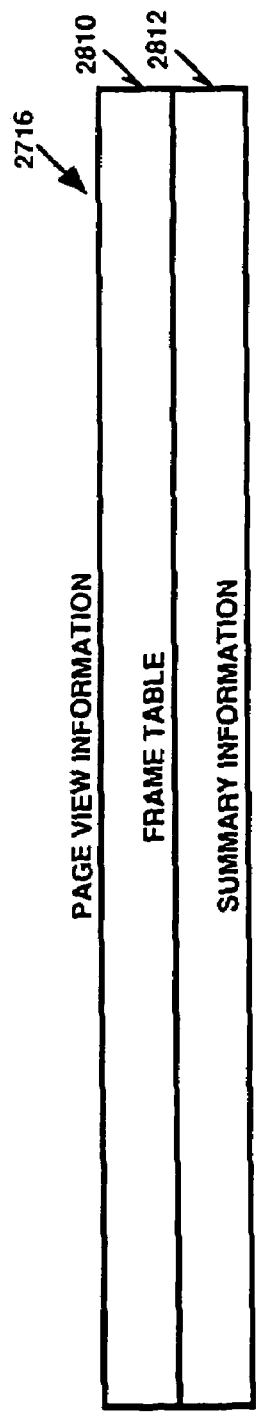
FIG. 28 illustrates the content of the page view information in a database dataset.

Frame information 2612 of partition information 2222 contains information related to the frames of each of the partitions of the database dataset. Referring to FIG. 27, frame information 2612 is illustrated in detail. Frame information 2612 contains a frame type 2710, which identifies the frame as a browse frame, a layout frame, or a find frame. Browse frames, layout frames, and find frames correspond to the partition types described above. Frame information 2612 also includes a frame size 2712 which defines the dimensions of the frame within the database dataset. Frame information 2612 also includes a view dataset 2714. View dataset 2714 identifies the dataset that is using a particular frame to view or manipulate the information within a database dataset. The dataset referenced by view dataset 2714 may be a graphics dataset, a text dataset, a spreadsheet dataset, or another database dataset, Page view information 2716 is used for maintaining information related to page view frames. The information retained for page views is illustrated in FIG. 28. Similarly, frame information 2612 includes frame view information 2718 which describes frame view frames. The data contained within frame view information 2718 is illustrated in detail in FIG. 29.

Figure 29:
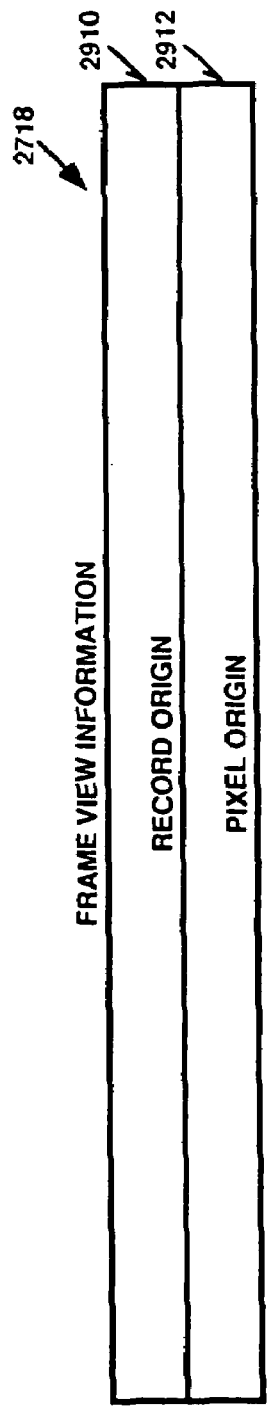
FIG. 29 illustrates the content of the frame view information in a database dataset.

Referring now to FIG. 29, frame view information 2718 is illustrated. Frame view frames are used to view the information within a database dataset as referenced from a specified record origin 2910 and pixel origin 2912 for a specified frame size as defined in frame size 2712. Frame views provide a means for splitting a window into predefined sub-regions or window panes and thereafter assigning a frame view partition to each window pane. Because one partition is assigned per one window pane, each pane can be scrolled independently. Each partition is responsible for managing the portion of the database dataset which the view partition is displaying. Graphics, spreadsheet, and database datasets can use frame views.

Referring now to FIG. 28, page view information 2716 is illustrated. Page view information 2716 comprises a frame table 2810 and summary information 2812.

Figure 30:
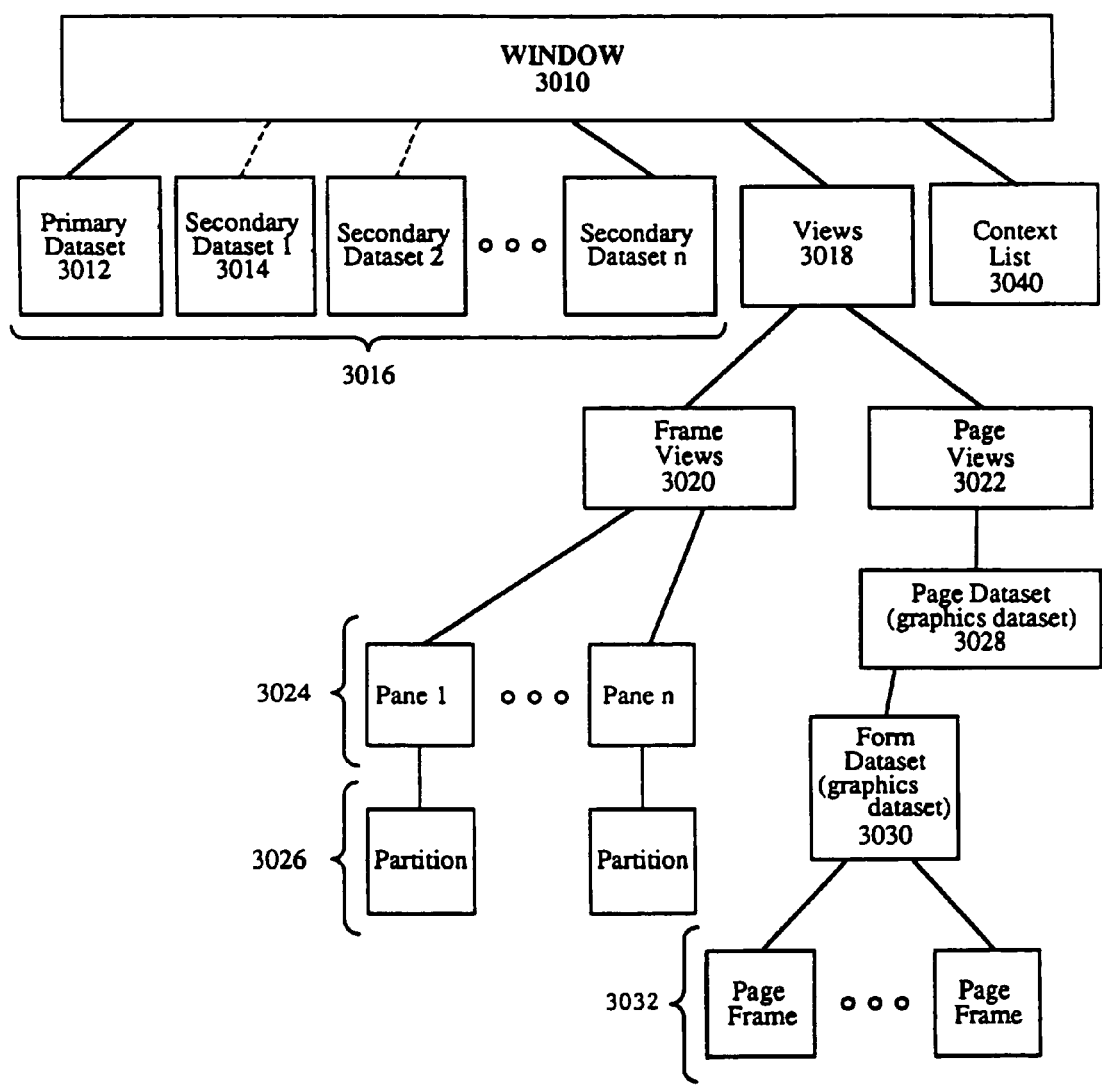
FIG. 30 illustrates the window structure of the present invention.

The present invention provides a window structure for viewing information contained in one of the datasets described above. Referring now to FIG. 30, window structure 3010 is illustrated. Window structure 3010 of the present invention comprises a group of datasets 3016 which includes a primary dataset 3012 and a plurality of secondary datasets 3014. The secondary datasets 3014 are not explicitly stored in the window; however, there is a logical connection between the secondary datasets 3014 and the window 3010 as indicated by the dashed connecting lines in FIG. 30. These datasets 3016 are used to retain the information viewed by window 3010. Datasets 3016 may be graphics datasets, text datasets, spreadsheet datasets, or database datasets as described above. Thus, each of the datasets 3016 comprise a plurality of frames within each of the datasets.

Each window in the present invention is responsible for managing scroll bars, zoom boxes, rulers, and tool palates associated with a particular window. These windowing mechanisms are generally well known in the art. Windows in the preferred embodiment use structures called views 3018 to manage interaction with the contents of the window. Views 3018 provide a means by which a window 3010 may be used to view a particular subset of information in datasets 3016. Views 3018 are divided into two classes: frame views 3020 and page views 3022. A window in which information is viewed using frame views 3020 is comprised of a plurality of panes 3024. Panes 3024 each are subsets of the available viewing area of a window in which a particular subset of information from a dataset can be viewed. This information is provided by a partition of a dataset as described above. Each of panes 3024 have a corresponding partition 3026 onto a dataset. This dataset is referred to as the view dataset or viewdset. The viewdset is the dataset of which window 3010 provides a view. For example, in a graphics window, the viewset is a main graphics dataset. There is one partition per pane, because the panes can be scrolled independently. Each partition retains information defining the portion of the dataset being viewed in the partition. For a window 3010, using a frame view 3020, the contents of the window 3010 are drawn by drawing one frame of partitions 3026 onto the viewdset for each window pane 3024. Graphics, spreadsheet, and database windows can use frame views 3020.

Figure 31:
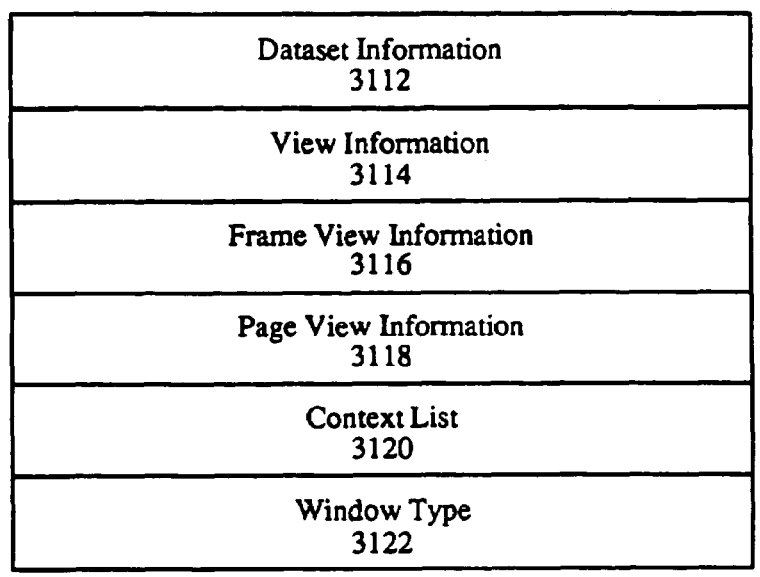
FIG. 31 illustrates the content of the window information.
Figure 32:
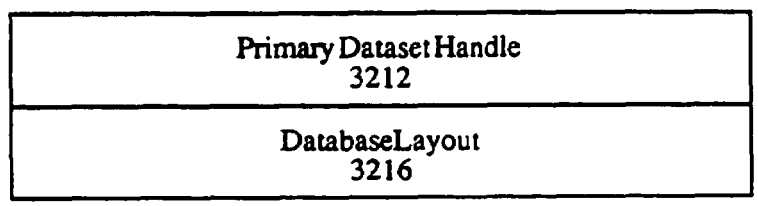
FIG. 32 illustrates the content of the dataset information in a window.

Referring now to FIG. 31, the content 3110 of the information retained for a window 3010 is illustrated. Window information 3110 comprises dataset information 3112. Dataset information 3112 comprises handles or points to a plurality of datasets associated with a window in the present invention. Referring now to FIG. 32, the contents of dataset information 3210 are illustrated. Dataset information 3210 comprises a primary dataset handle 3212. Primary dataset handle 3212 references the primary dataset or viewdset of a window. The primary dataset is the main source of information the window is responsible for displaying. The primary dataset handle 3212 references one of the datasets described above. Secondary datasets can be referenced through the primary dataset. By providing a primary dataset and a plurality of secondary datasets associated with a single window, information of a variety of different types may be displayed simultaneously within a single window. For a database window, dataset information 3210 also includes a database layout specification 3216. Database layout 3216 provides a means for defining one of a plurality of database layouts for display in a particular window. Using dataset information 3210, the source of information for display in a window is specified. Referring again to FIG. 31, window information 3110 includes view information 3114.

Referring now to FIG. 33, the content of the view information 3310 included within window information 3110 is illustrated. View information 3310 includes a view kind field 3312. View kind field 3312 defines the type of view currently active within a window. The kinds of views include a graphics dataset frame view, a graphics dataset paged view, a word processor or text view, a spreadsheet page view, a spreadsheet frame view, a database browse view, a database paged view, a database find view, and a database layout view. Depending upon the view kind field 3312, either frame view information 3314 or page view information 3316 of view information 3310 is used for displaying information in a window. Frame view information 3314 includes information defining frame views 3020. Page view information 3316 comprises information defining page views 3022.

Figure 35:
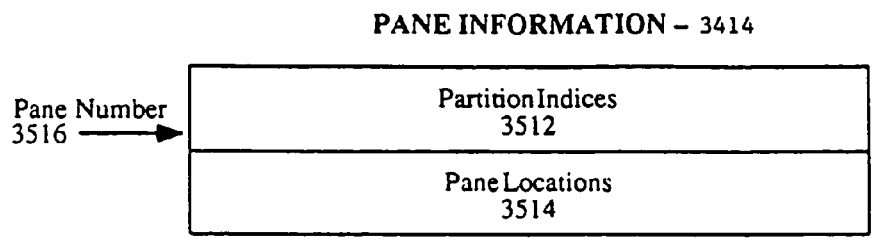
FIG. 35 illustrates the content of the pane information in a window.

Referring now to FIGS. 34 and 35, the content of frame view information 3410 is illustrated. As illustrated in FIG. 34, frame view information 3410 comprises a pane count 3412 and pane information 3414. Because a frame view method of displaying information in a window in the present invention comprises the display of information in a plurality of panes, a count 3412 of the number of panes in the frame view is provided. As illustrated in FIG. 35, pane information 3510 comprises information corresponding to each of the plurality of panes of the frame view. A pane number 3516 is used to index into a pane information 3510 for the purpose of locating information for a particular pane. For each pane, a partition index 3512 is retained along with the definition of the location of the pane 3514 in the window of which the pane is a member. Thus, pane information is used to define a plurality of panes each with a corresponding dataset partition index used for obtaining the information for display within the pane. A plurality of panes 3024 may thereby be displayed using a frame view 3020.

Referring again to FIG. 30, views 3018 also include page views 3022. Page views 3022 provide a means by which a document may be constructed in a paged representation such as a representation in a word processing document. Page views 3022 are also used for printing a document. As with frame views 3022, a window using a page view 3022 has a viewdset. The viewdset comprises the primary dataset being viewed by the window. In addition, page views 3022 also have a page dataset 3028. Page dataset 3028, which is typically a graphics dataset type, provides a means for combining frames into a page. Each page is drawn as a corresponding frame through the page dataset 3028 (i.e. page frames). These page frames 3032 provide a means for segmenting a document into pages, each corresponding to a frame of the page dataset. In addition, a form dataset 3030 may be used to combine information from another dataset onto each page of the page view. In this way, headers and footers of a word processing document may be applied. In this configuration, the page dataset 3028 references form dataset 3030. The form dataset 3030 may then reference frames from the viewdset in combination with frames from secondary datasets. Headers and footer information may be stored in these secondary datasets. It will be apparent to those skilled in the art that information other than header and footer information may be applied to a page in a page view format. Typically, the page dataset 3028 contains a frame object which is marked as relative. A relative frame object means that the object occurs at the same location in each frame. Relative objects also inherit their frame numbers from their parents. The relative frame object views form dataset 3030. The form dataset 3030 comprises everything that repeats on a page level. For example, column formats, headers, and footers. Columns in a page view, such as those implemented in columns of text in a word processing document, may be implemented as column objects. Column objects are also relative objects in that they can inherit frame indices from their parent objects. With multiple columns, a form size attribute of graphics datasets is used to make the frame indices inherit correctly. For example, with a three column page, the first column of page 2 should be frame index three and not frame index 1.

Figure 36:
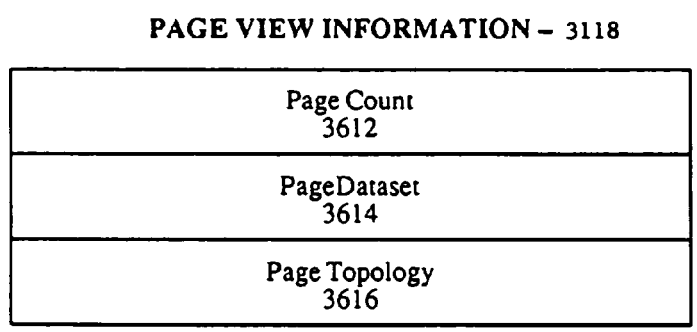
FIG. 36 illustrates the content of the page view information in a window.
Figure 37:
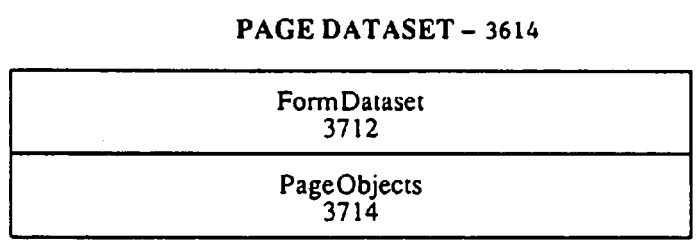
FIG. 37 illustrates the content of the page dataset information in a window.
Figure 38:
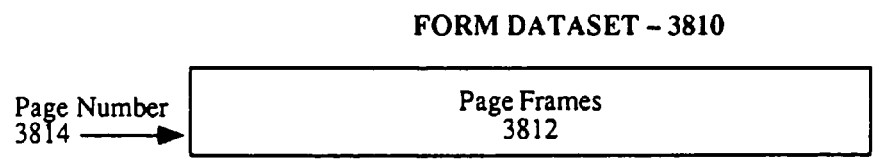
FIG. 38 illustrates the content of the form dataset information in a window.

Referring now to FIG. 31, window information 3110 includes page view information 3118. Page view information 3118 comprises information for implementing the page view functionality 3022 provided by the present invention. Referring now to FIG. 36, the content of page view information 3610 is illustrated. Page view information 3610 comprises a page count 3612 which defines the number of pages represented in the view dataset. Page view information 3610 also includes page dataset information 3614. Referring now to FIG. 37, the contents of page dataset information 3710 is illustrated. This information includes form dataset 3712 which is a handle or pointer to a form dataset 3030 which references page frames from the primary dataset and other secondary datasets. Referring to FIG. 38, form dataset information 3810 is shown to include references to a plurality of page frames 3812 indexed using a page number 3814. Each page in a page view has associated with it a single frame from a dataset. Dataset frames are described in earlier sections of this detailed description of the invention.

Referring again to FIG. 36, page view information 3610 includes a page topology 3616. Page topology 3616 is used to define the page organization for a particular document. Thus, the sequencing of pages is defined using paged topology 3616. Thus, page view information 3610 is used to define page views 3022 of window 3010.

Referring again to FIG. 30, window 3010 includes a context list 3040. Context list 3040, maintained on a window basis is used to define the screen locations of frames displayed within a window 3010. A context is a description of a location and scale in which a frame is represented on the display screen. In the present invention, information within a window can be viewed in multiple panes, in different pages, in different partitions, in different frames, and in different scales. In order to increase the performance of the display of information within this structure, context lists are built to describe the location of the frames for a specific dataset within a given window. The context list 3040 is built by traversing the view structure for a given window in search of frames for a dataset of that window. When frames are found, information corresponding to that frame is determined and stored in context list 3040. This information includes the origin of the frame (i.e. a QuickDraw origin in the preferred embodiment), a clipping region corresponding to the frame, and information defining whether the frame is covered by other objects of the window. This cover information defines which parts of the frame are obscured. For transparent frames, objects behind the frame can obscure part of the frame also.

Context lists apply to a single dataset in the preferred embodiment, however, documents in the preferred embodiment may contain multiple datasets and more than one dataset may be manipulated. Only one context list per window is retained at a time. When a context list is traversed, a test is performed to determine if the dataset corresponding to the current context list is the same as the dataset requesting the context list traversal. If this is not the case, the context list for the requesting dataset is entirely rebuilt. Referring now to FIG. 31, context list information 3120 is retained within window information 3110. The content of context list information 3120 is illustrated in FIG. 39.

Figure 39:
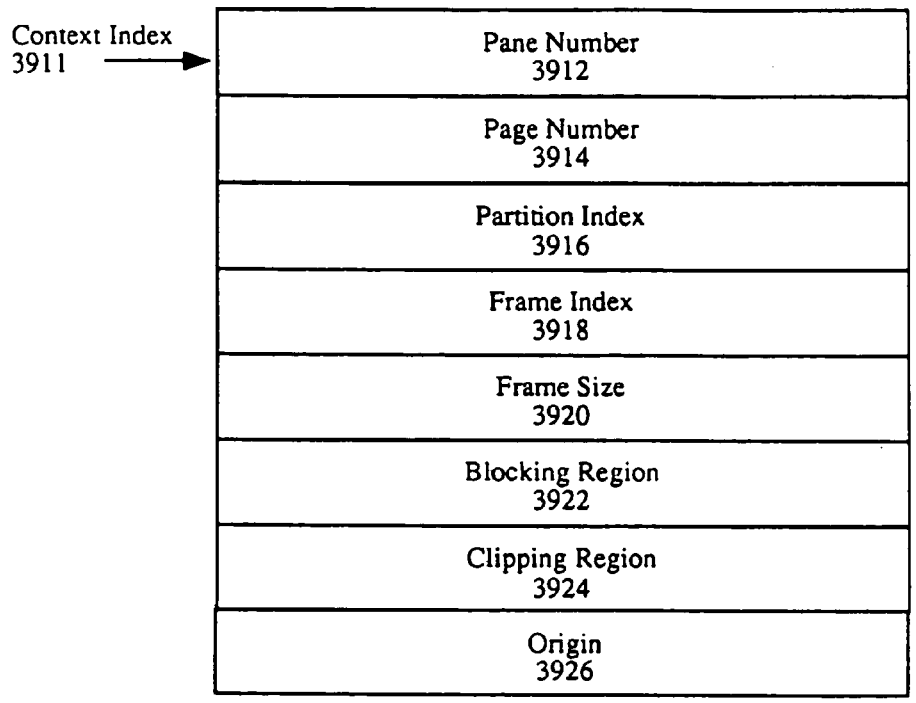
FIG. 39 illustrates the content of the context information in a window.

Referring now to FIG. 39, the content of context list information 3910 is illustrated. For each window, a plurality of contexts are retained within context list 3910. Each individual context within context list 3910 is referenced using a context index 3911. Information retained for each context is illustrated in FIG. 39. Each context is defined by the frame index 3918 and partition index 3916 to which it corresponds. In addition, the pane number 3912 and/or page number 3914 in which the context occurs is also retained within context list 3910. The frame size 3920 of the frame referenced by frame index 3918 is also retained within the context list. Blocking region 3922 defines the bounds of objects blocking the current context including objects located behind the context for a transparent frame. Clipping region 3924 provides a means for defining an interior and exterior region of the context. The exterior region may be clipped using well known techniques. Origin 3926 is used to define the location of the context within the window coordinate space. In the preferred embodiment, the origin is defined using a QuickDraw protocol developed by Apple Computer®, Inc.

Referring now to FIG. 31, window information 3110 includes window type 3122. In the preferred embodiment, the types of windows supported include object windows, text windows, spreadsheet windows, and database windows. The window types correspond to the dataset types described above. Thus, the data structures for representing windows in the preferred embodiment are described.

Figure 40:
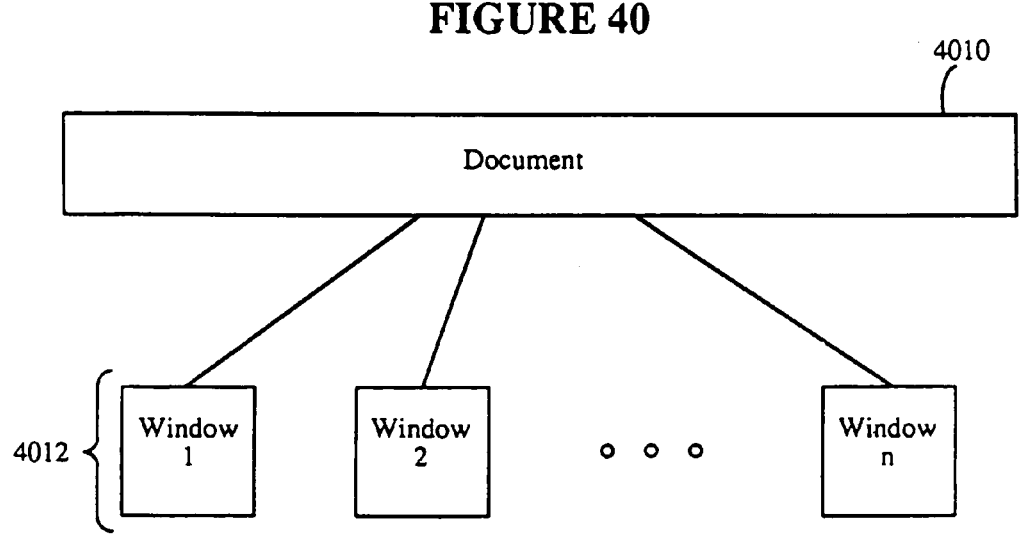
FIG. 40 illustrates the content of the document structure of the present invention.

Referring now to FIG. 40, the document structure 4010 used in the preferred embodiment is illustrated. Documents 4010 in the present invention comprise a plurality of windows 4012 for viewing and manipulating information of the document. Each of the windows 4012 comprise a window structure equivalent to a window 3010 illustrated in FIG. 30 and described above.

Referring now to FIG. 41, the information retained on a document basis 4110 is illustrated. Document information 4110 comprises a window list 4112 which includes a pointer or handle for each window defined within a document. Each of the windows referenced within window list 4112 corresponds to a window 3010 as illustrated in FIG. 30 and described above. Window list 4112 provides a means for defining a plurality of windows for viewing information within a particular document. Principal dataset 4114 defines the view dataset of the first window created for the document. Graphic object information 4116, text information 4118, spreadsheet information 4120, and database information 4122 are used to define information relative to a document layer and corresponding to each type of dataset existing within the document. For example, the identity of the chosen tool or function within each of the four dataset types is retained within information areas 4116-4122. Document formatting information, such as margins, is retained within formatting information 4124. It will be apparent to those skilled in the art that many other document formatting parameters may be retained within formatting information 4124. Printing information 4126 is used for storing parameters related to printing a document such as the orientation of the document on the printed page (i.e. portrait or landscape). Again, it will be apparent to those skilled in the art that many printing parameters retained for a particular document may be provided within printing information 4126. Default information 4128 provides a means for storing default parameters or preferences for a particular document. In this manner, the specification of each and every parameter for a particular document is not necessary. The use of default information for documents is well known in the art. File system information 4130 is also retained for a particular document. For example, the file name and access path to the document is provided within file system information 4130. It will be apparent to those skilled in the art that other document level information parameters may be provided in addition to those illustrated in FIG. 41.

Figure 42:
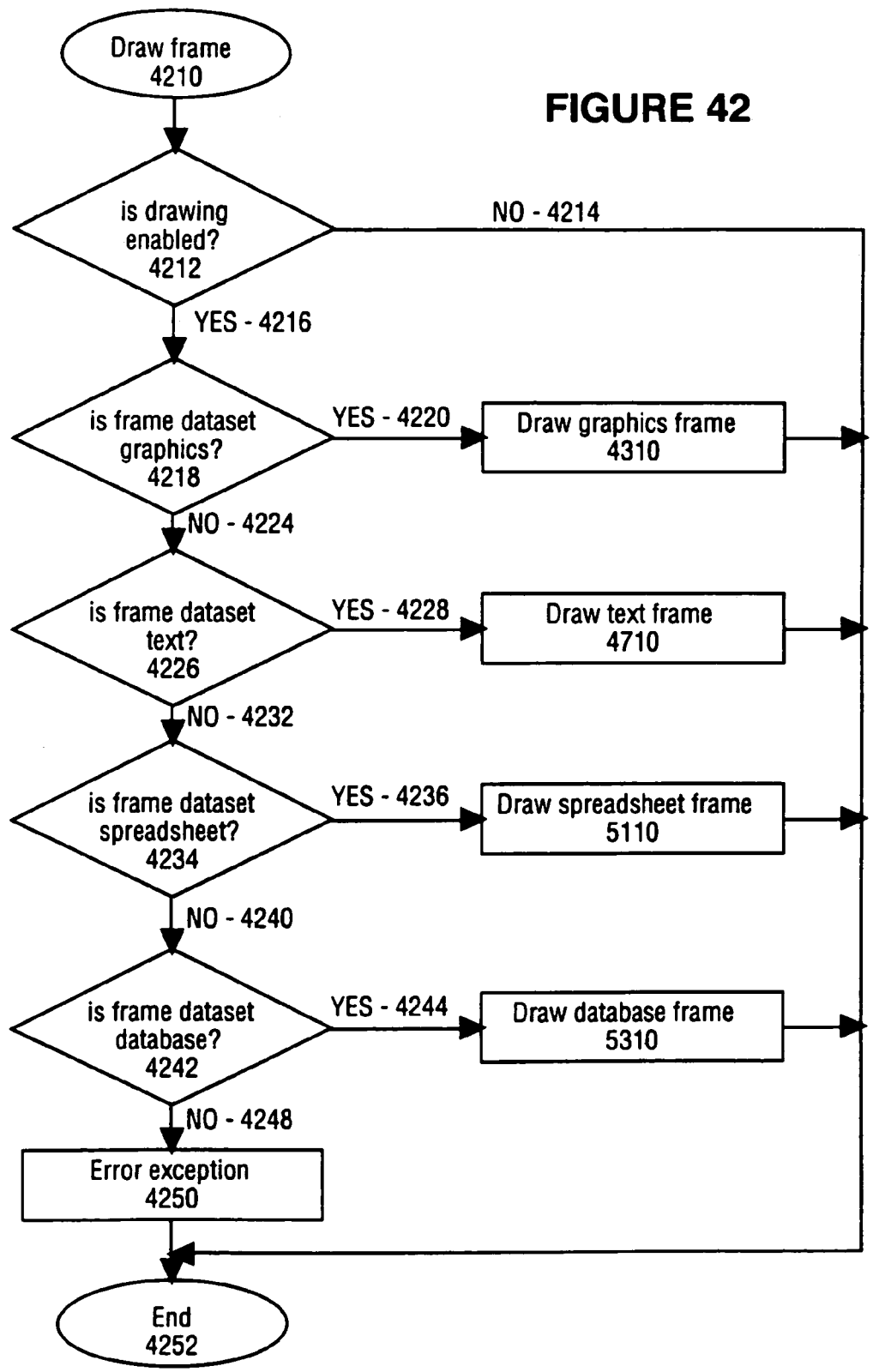
FIGS. 42-57 are flowcharts illustrating the processing logic of the present invention.

Having described the data structures included in the present invention, the following sections describe the processing logic that uses these data structures for drawing frames on a display screen. Referring to FIG. 42, a flow chart of the processing logic for drawing a frame using the present invention is illustrated. This processing logic is activated by an operating system program or application program when a portion of information in a frame of a dataset needs to be drawn or updated. Once this processing logic is activated, the processing flow beginning at bubble 4210 as illustrated in FIG. 42 is executed.

Referring now to FIG. 42, the draw frame processing logic is illustrated. Upon activation, a drawing flag is checked to determine if drawing frames to the display screen is enabled (decision block 4212). If drawing is disabled, processing path 4214 is taken to termination bubble 4252 where processing for the draw frame operation terminates. If, however, drawing is enabled, processing path 4216 is taken to decision blocks 4218, 4226, 4234, and 4242. In each of these decision blocks, a test is performed to determine the type of frame that is to be drawn. Because a frame identifier or frame index is provided as input to the draw frame processing logic, the frame identifier may be used to locate a corresponding dataset of which the input frame is a member. Thus, if the frame is a member of a graphics dataset, processing path 4220 is taken to processing block 4222 where a draw graphics frame operation is performed. The draw graphics frame operation is described in flow chart form in FIG. 43. If the input frame is a frame of a text dataset, processing path 4228 is taken to processing block 4230 where a draw text frame operation is performed. The draw text frame operation is described in flow chart form starting in FIG. 47. If the input frame identifier is the member of a spreadsheet dataset, processing path 4236 is taken to processing block 4238 where a draw spreadsheet frame operation is performed. The draw spreadsheet frame operation is described in flow chart form starting in FIG. 51. If, however, the input frame is a member of a database dataset, processing path 4244 is taken to processing block 4246 where a draw database frame operation is performed. The draw database frame operation is described in flow chart form starting in FIG. 53. If the frame identifier input to the draw frame processing logic is not a member of a known dataset, an error exception (processing block 4250) occurs and processing terminates at termination bubble 4252.

Figure 43:
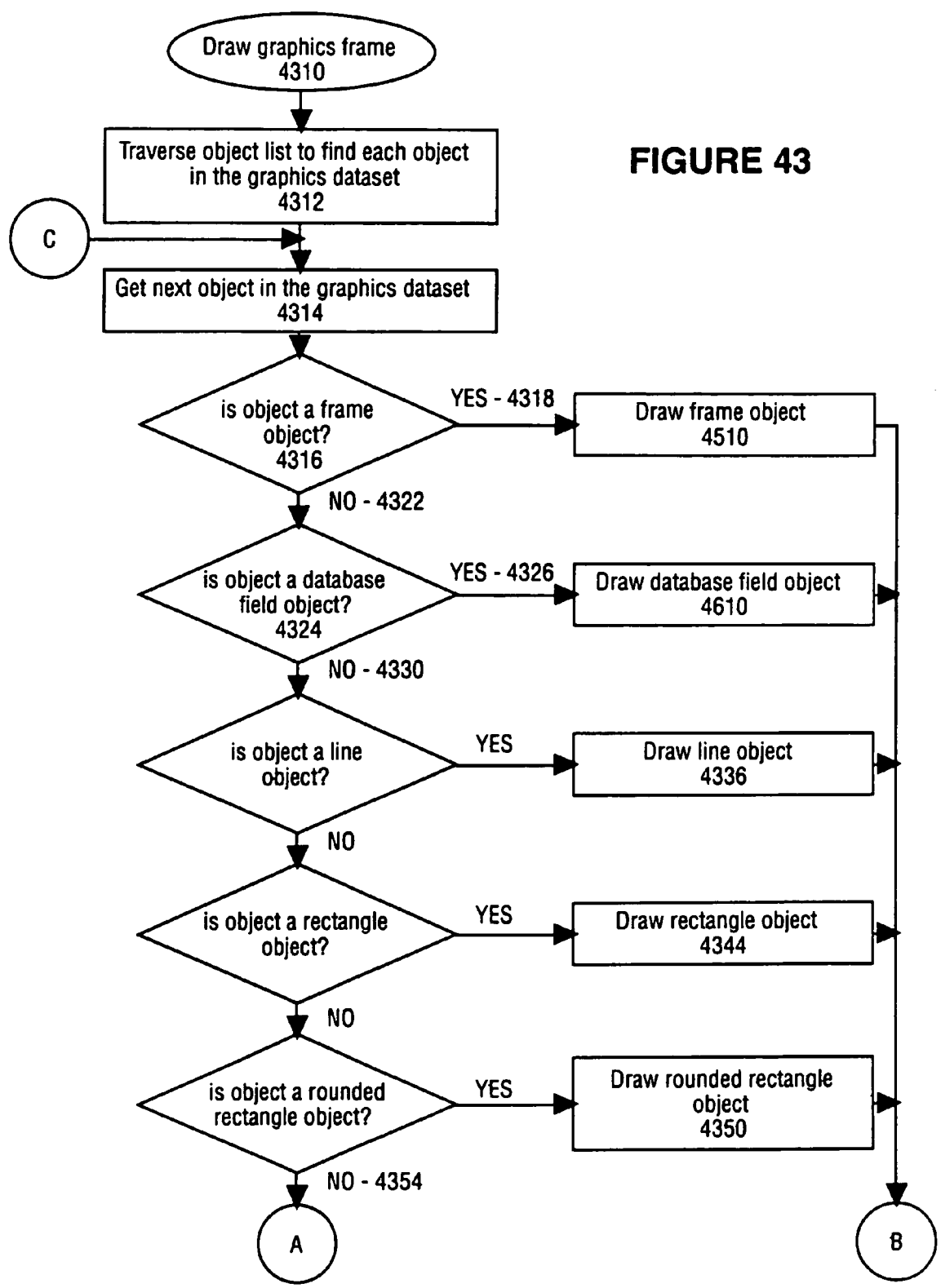

Referring now to FIG. 43, the processing logic for a draw graphics frame operation 4310 is illustrated. There are two distinct situations under which drawing may occur. The first situation is an update event. Update events typically lead to the full traversal of the data structures used for the display of windows. For example, an update event occurs when part of a window becomes uncovered and needs to be redrawn. The second situation under which drawing may occur is the result of a user action that may be handled through the context mechanism of the present invention. For example, typing lines of text causes the edited text lines to be redrawn using the context list. In most cases, the processing logic that performs the drawing does not distinguish between an update event and a context event. Drawing updates using the context list can be performed much more quickly than updates using a traversal through the data structures. In addition, drawing performed for an update event typically uses an off screen bitmap. Referring now to FIG. 43, the processing logic for drawing a graphics frame is illustrated. This processing logic is executed in order to draw a frame of a graphics dataset. Upon execution, the object list of the graphics data set is traversed to locate each of the graphic objects in the dataset (processing block 4312). Next, each object in the graphics dataset is processed starting with a loop at processing block 4314. As described above for graphics datasets, graphic objects may be of various types including frame objects and database field objects. Other well known graphic objects include line objects, rectangle objects, rounded rectangle objects, ovals, arcs, polygons, and other forms of graphic objects. If the object retrieved from the graphics dataset in processing block 4314 is a frame object, processing path 4318 is taken to processing block 4320 where the frame object is drawn. The processing logic of the present invention for drawing a frame object is illustrated in FIG. 45.

Figure 45:
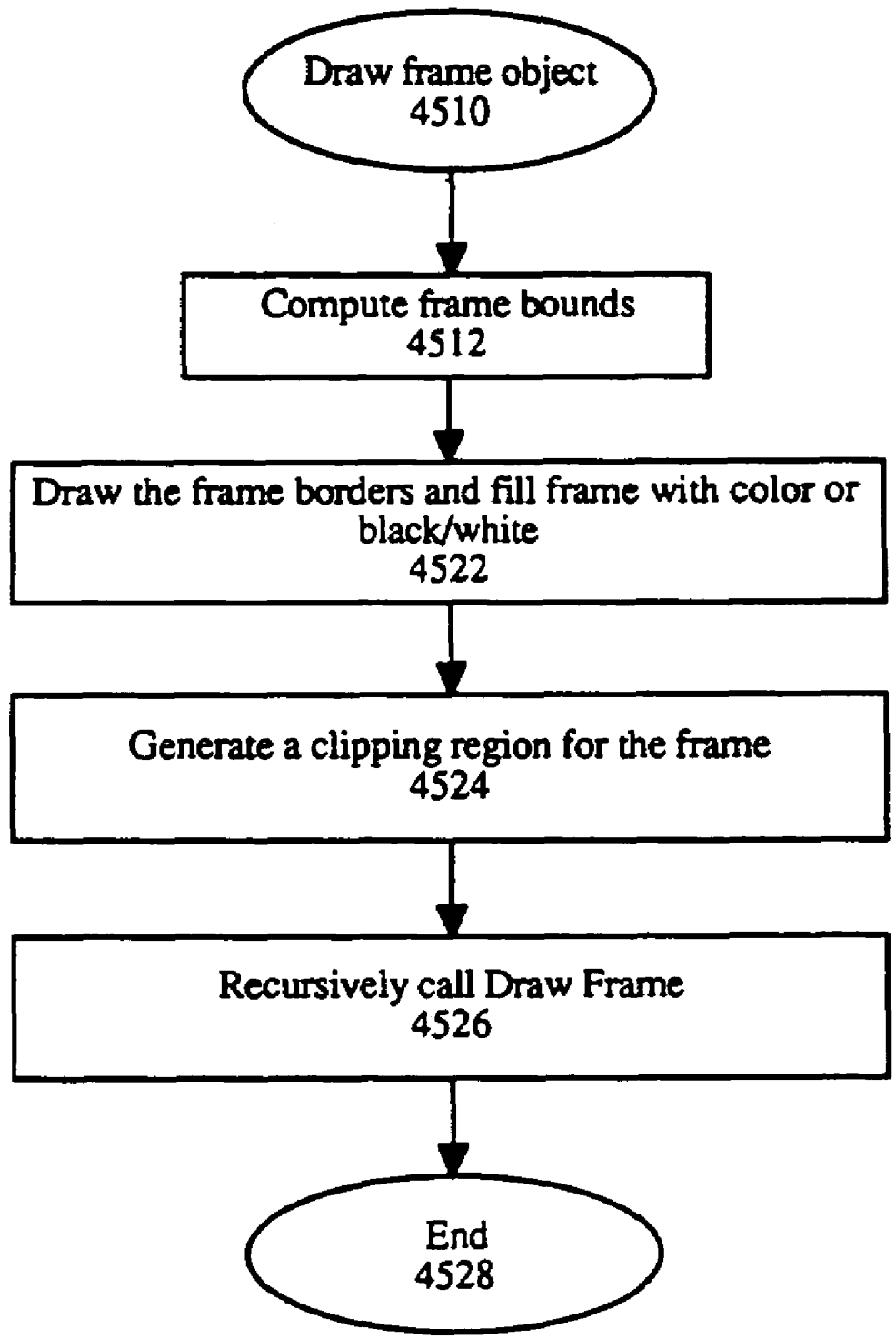

Referring to FIG. 45, the processing logic for drawing a frame object of a graphics dataset is illustrated. Upon activation, the draw frame object processing logic is initiated starting at bubble 4510 in FIG. 45. First, the frame bounds are computed in processing block 4512. The frame borders of the frame object are drawn in processing block 4522. In addition, the interior of the frame is filled with color or black and white. The clipping region for the frame is generated in processing block 4524 and the draw frame processing logic illustrated starting at FIG. 42 is recursively called in processing block 4526. The draw frame object processing logic terminates at end bubble 4528.

Using frame objects in a graphics dataset, a frame hierarchy may be established whereby datasets and their associated frames may be nested within other datasets to any arbitrary level supported by the implementation. Thus, using a frame object in a graphics dataset, for example, a frame is nested within the graphics dataset. Using the same processing logic structure, other datasets and frames may be nested within the nested frame thereby creating a hierarchical structure. These nested frames are drawn using the same draw frame processing logic in recursive execution.

Figure 46:
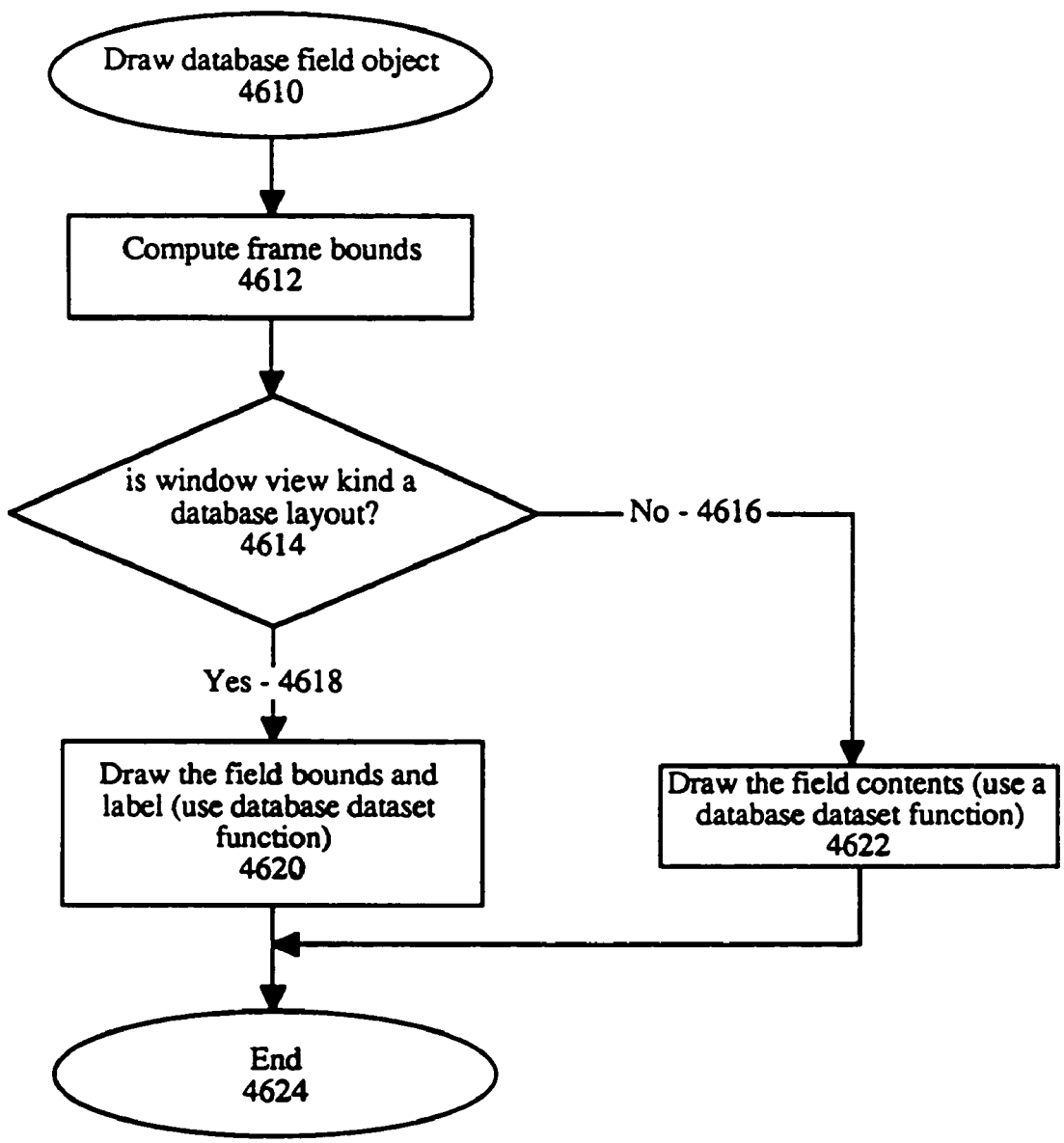

Referring again to FIG. 43, if the object is a database field object (decision block 4324), processing path 4326 is taken to processing block 4328 where the database field object is drawn. Referring now to FIG. 46, the processing logic for drawing a database field object is illustrated. Upon entry for a database field object, the bounds of a frame for viewing the database field are computed in processing block 4612. If the window in which the database field object is located is configured for a database layout view (decision block 4614), processing path 4618 is taken to processing block 4620 where the bounds and label of the field are drawn using a database dataset function. If, however, the window is not in a database layout, processing path 4616 is taken to processing block 4622 where the field contents are drawn using a database dataset function. Processing then terminates for the draw database field object processing logic at processing bubble 4624.

Figure 44:
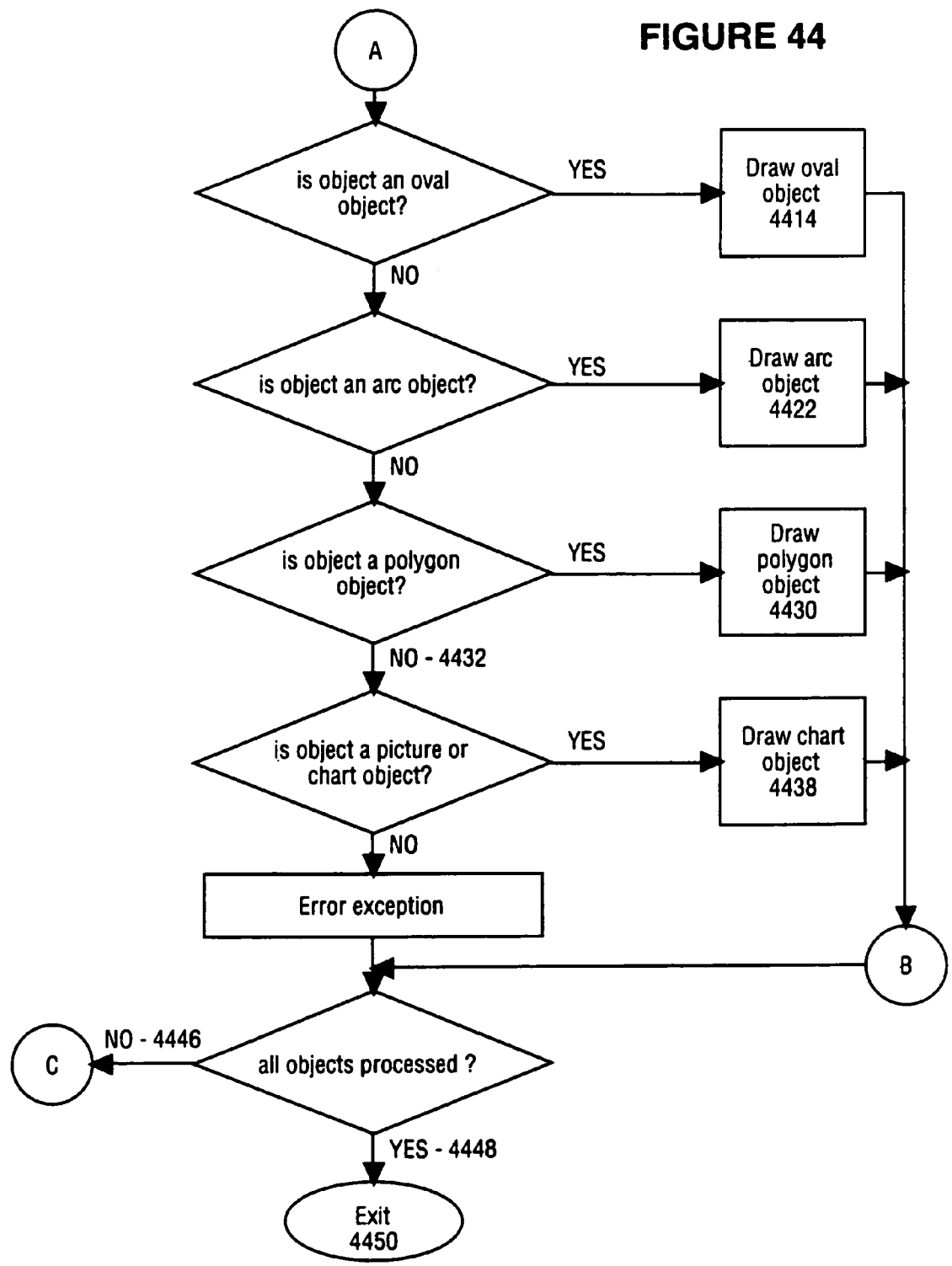

Referring again to FIG. 43, other graphics objects are drawn in processing blocks 4336, 4344, and 4350. As continued through the bubble labeled B illustrated in FIG. 44, additional objects are drawn using processing block 4414, 4422, 4430, and 4438. The objects drawn in these processing blocks are generally well known to those of ordinary skill in the art. Once all objects in the graphics dataset have been processed. Processing path 4448 is taken where processing for the draw graphics function terminates at the exit bubble 4450 as illustrated in FIG. 44. If processing for each of the objects in the graphics dataset is not complete, processing path 4446 is taken to the bubble labeled C as illustrated in FIG. 43 where the object processing loop is executed again for the next object.

Referring again to FIG. 42, the processing logic for the draw frame operation continues at decision block 4226. If the frame to be drawn is a text frame, processing path 4228 is taken to processing block 4230 where the text frame is drawn. The draw text frame processing logic is illustrated in detail in FIG. 47.

Figure 47:
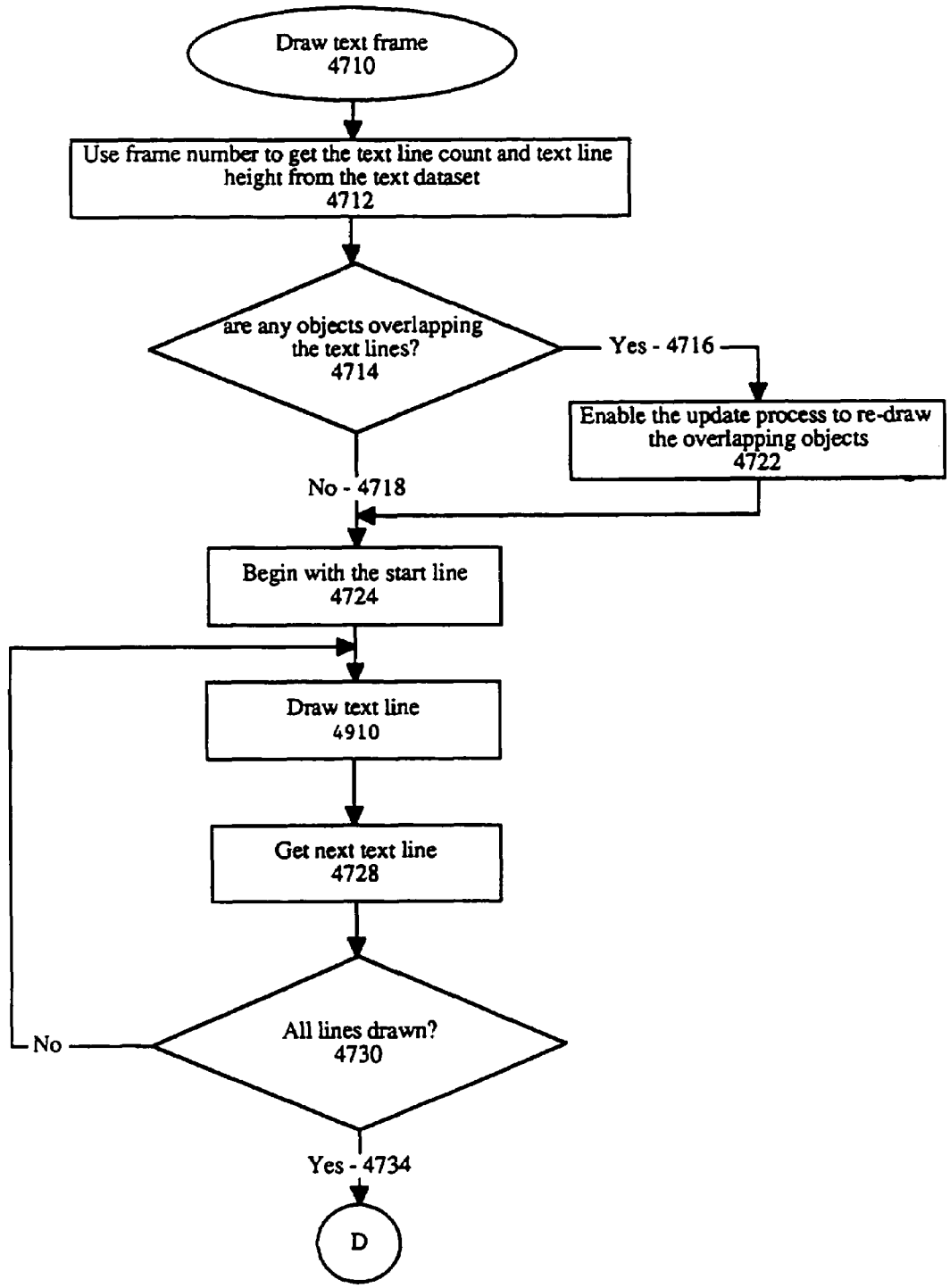

Referring now to FIG. 47, the processing logic for the draw text frame operation is illustrated. A frame number to draw is provided as input to the draw text frame processing logic. This frame number is used to access data in the text dataset in processing block 4712. Specifically, the text line count and text line height is retrieved from the text dataset. If any objects overlap the text lines in the text frame, processing path 4716, is taken to processing block 4722 where the draw frame update process is enabled to re-draw the overlapping objects. If no objects overlap any text lines in the text frame, processing path 4718 is taken to processing block 4724. Beginning with the starting line number of the frame, each text line in the text frame is drawn in processing block 4726. In the preferred embodiment, lines are drawn during the update of a screen display when objects overlap. When all lines have been drawn, processing path 4734 is taken to the bubble labeled D illustrated in FIG. 48.

Figure 48:
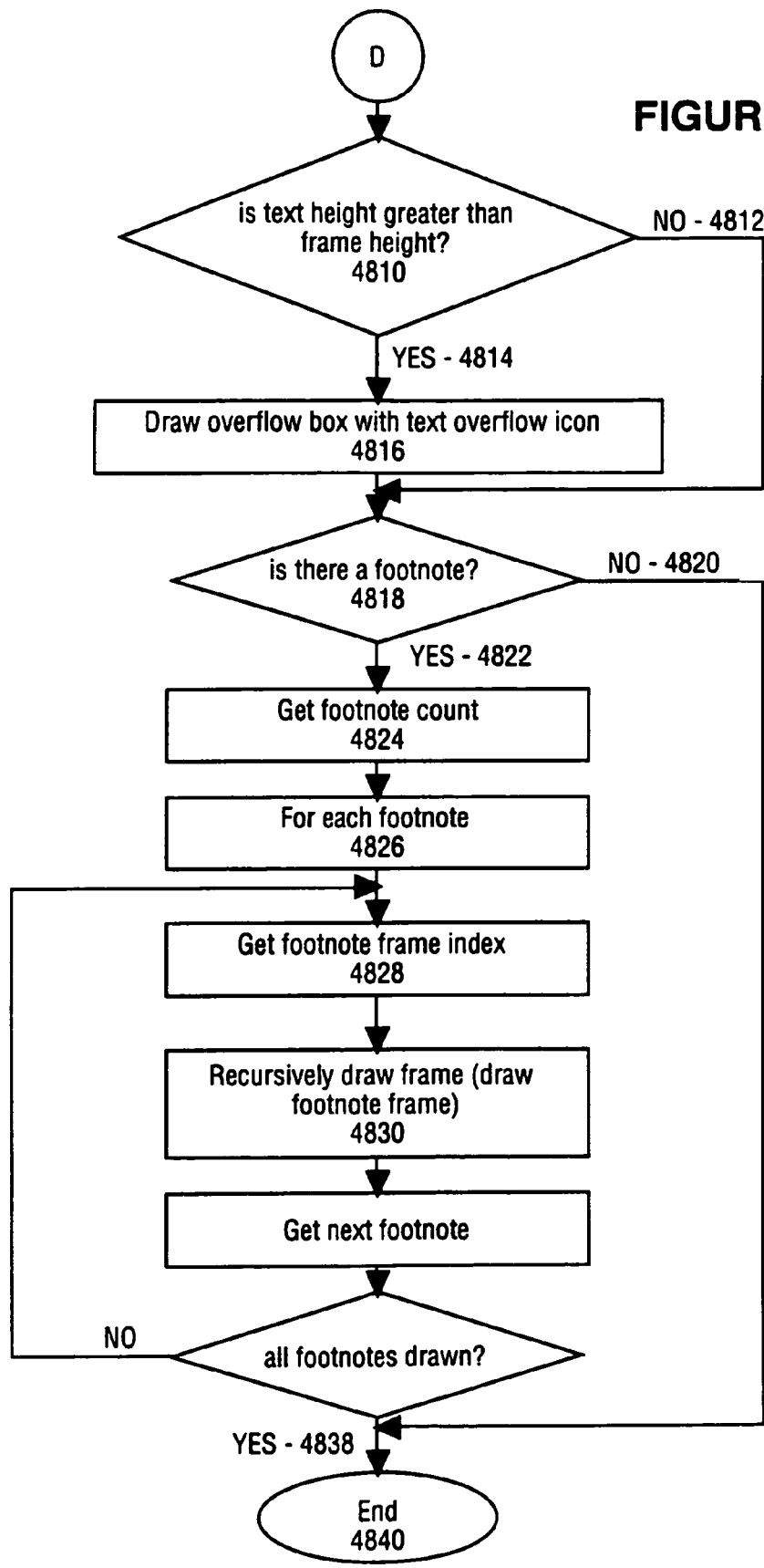

Referring now to FIG. 48, processing for the draw text frame operation continues at the bubble labeled D. If the text height for the text frame is greater than the frame height, processing path 4814 is taken to processing block 4816 where an overflow box with a text overflow icon is drawn. If the text can be contained within the frame, processing path 4812 is taken such that an overflow box is not drawn. If there is at least one footnote in the text frame, processing path 4822 is taken to processing block 4824 where a count of the number of footnotes is retrieved. Each footnote of the text frame to be drawn is represented as a nested text frame. Nested frames in a text dataset are implemented using text item information of a text dataset as described earlier. For each footnote in the text frame, the frame index of the footnote is retrieved in processing block 4828 and the draw frame function is recursively called to draw the nested footnote text frame in processing block 4830. The recursive call to the draw frame function is described above in connection with FIG. 42. The process of drawing text frames for each footnote continues until all footnotes of the text frame are drawn. When all footnotes are drawn, processing path 4838 is taken to the termination bubble 4840 where processing for the draw text frame operation terminates.

Figure 49:
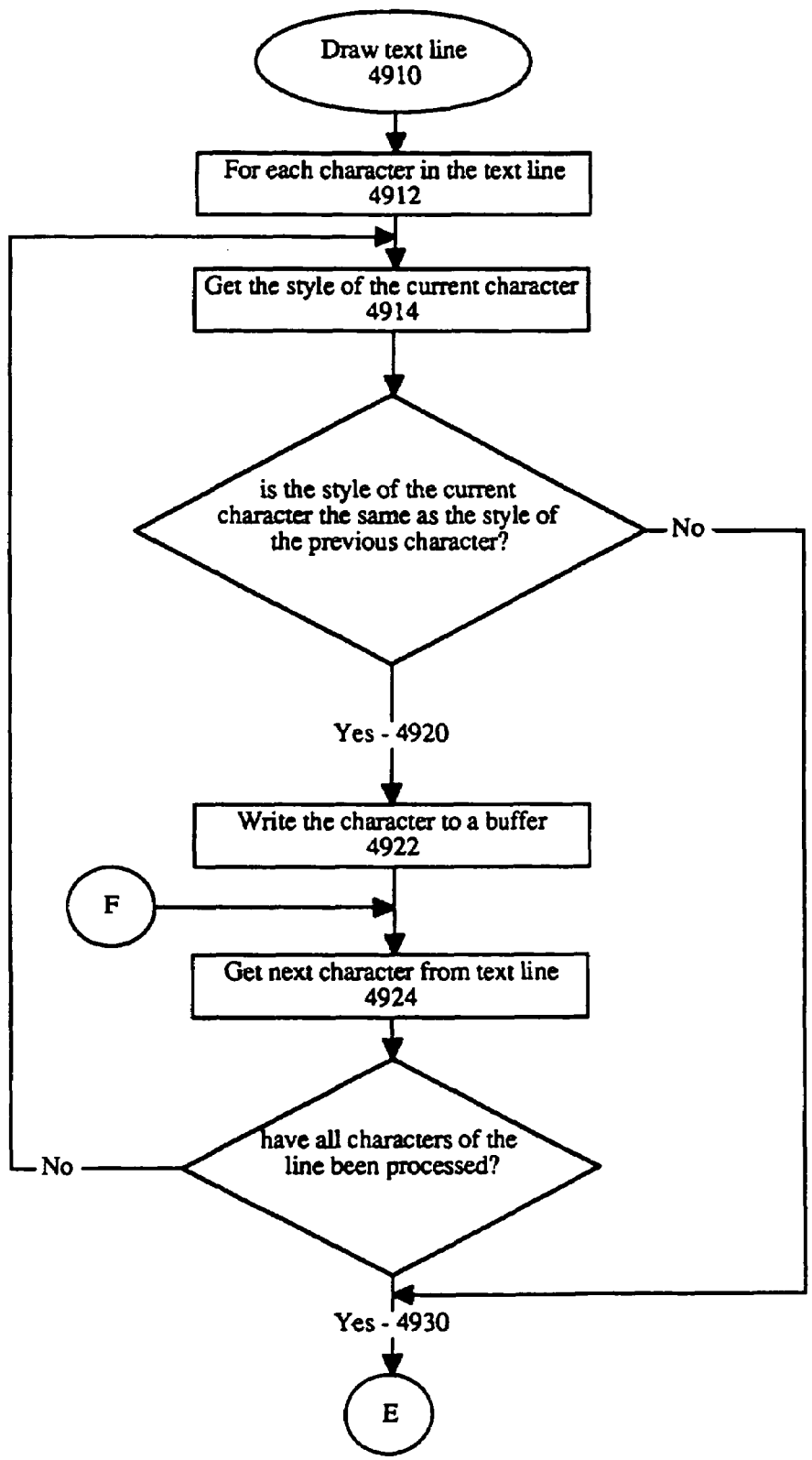
Figure 50:
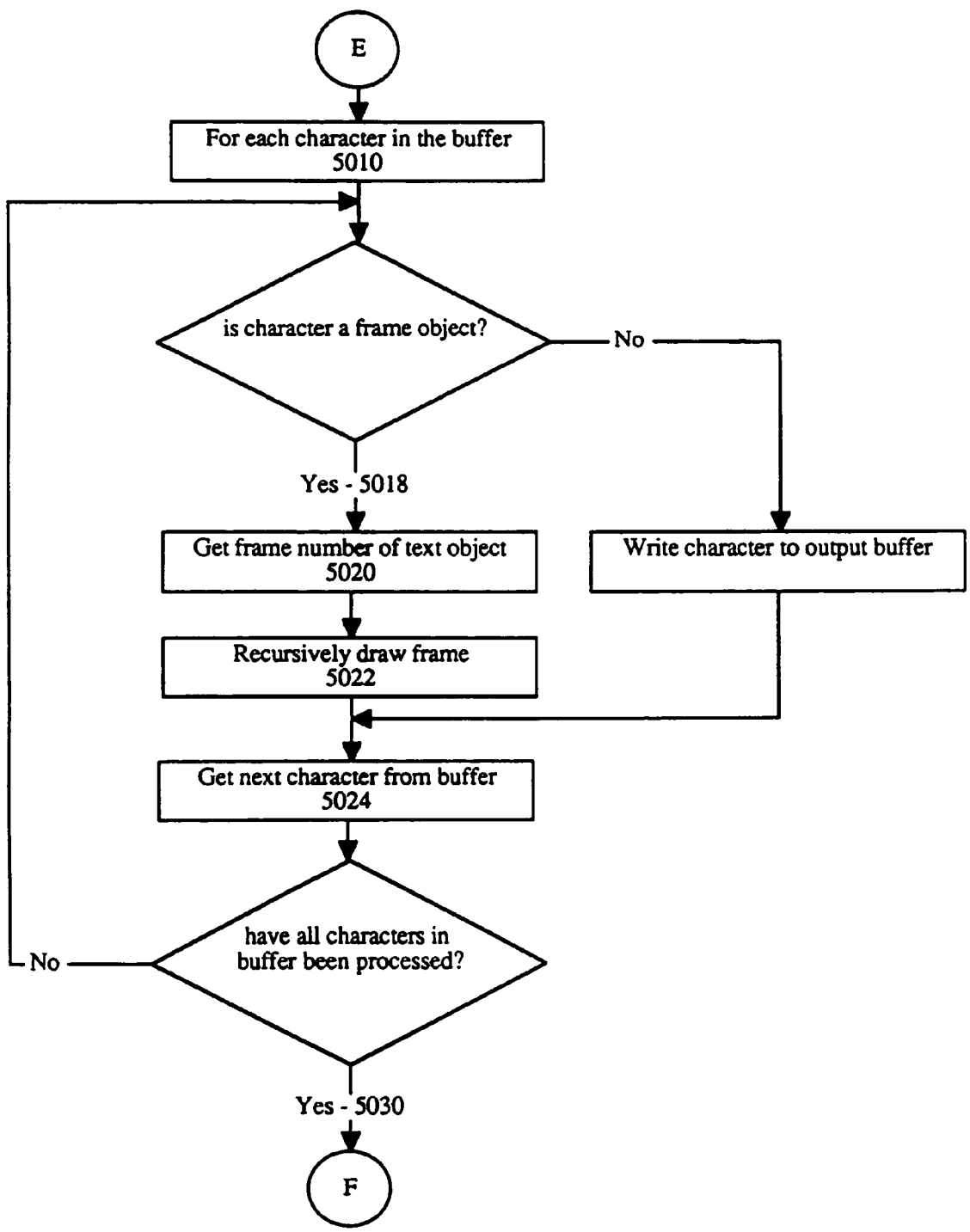

Referring again to FIG. 47, the processing logic used for drawing a text line in processing block 4726 is illustrated in detail in FIGS. 49 and 50.

Referring now to FIG. 49, the processing logic for drawing a text line in a text frame is illustrated. Processing block 4912 is executed to initialize a loop to the starting position of the text line to be drawn. For each character in the text line, the style of the character is retrieved in processing block 4914. If the style of the current character is the same as the previous character, processing block 4920 is taken to processing block 4922 where the current character is added to a buffer. The next character is retrieved from the text line in processing block 4924 and the loop for processing characters of the text line with the same style continues until all characters of the text line have been processed (processing path 4930). Processing for the draw text line operation continues at the bubble labeled E illustrated in FIG. 50.

Referring now to FIG. 50, the buffer of characters collected by the processing logic in FIG. 49 is manipulated starting at processing block 5010. If the character in the buffer is a frame object, processing path 5018 is taken to processing block 5020 where a frame number is retrieved for the frame object. The frame associated with the frame object is recursively drawn in processing block 5022. The recursive draw frame operation is illustrated starting in FIG. 42. The frame referenced by a frame object can be any frame type; however, the frame type is typically a graphics frame. Once the frame associated with the frame object is drawn in processing block 5022, the next character is retrieved from the buffer in processing block 5024 and the loop continues along processing path 5028 until all characters of the same style in the buffer have been processed (processing path 5030). Once all characters in the buffer have been processed, processing continues at the bubble labeled F as illustrated in FIG. 49.

Referring now to FIG. 49, processing continues at the bubble labeled F where the next character is retrieved from the text line. The text buffer is again filled with characters of the same style until all characters of the line have been processed. In this manner, characters of the text line are drawn and embedded frame objects representing frames of an arbitrary type are also recursively drawn. In this manner, frames may be embedded within a text frame in a nested or hierarchical fashion.

Referring now to FIG. 42, processing for the draw frame operation continues at decision block 4234. If the frame to be drawn is a spreadsheet frame, processing path 4236 is taken to processing block 4238 where the spreadsheet is drawn. Processing logic for the draw spreadsheet operation is illustrated in detail in FIG. 51.

Figure 51:
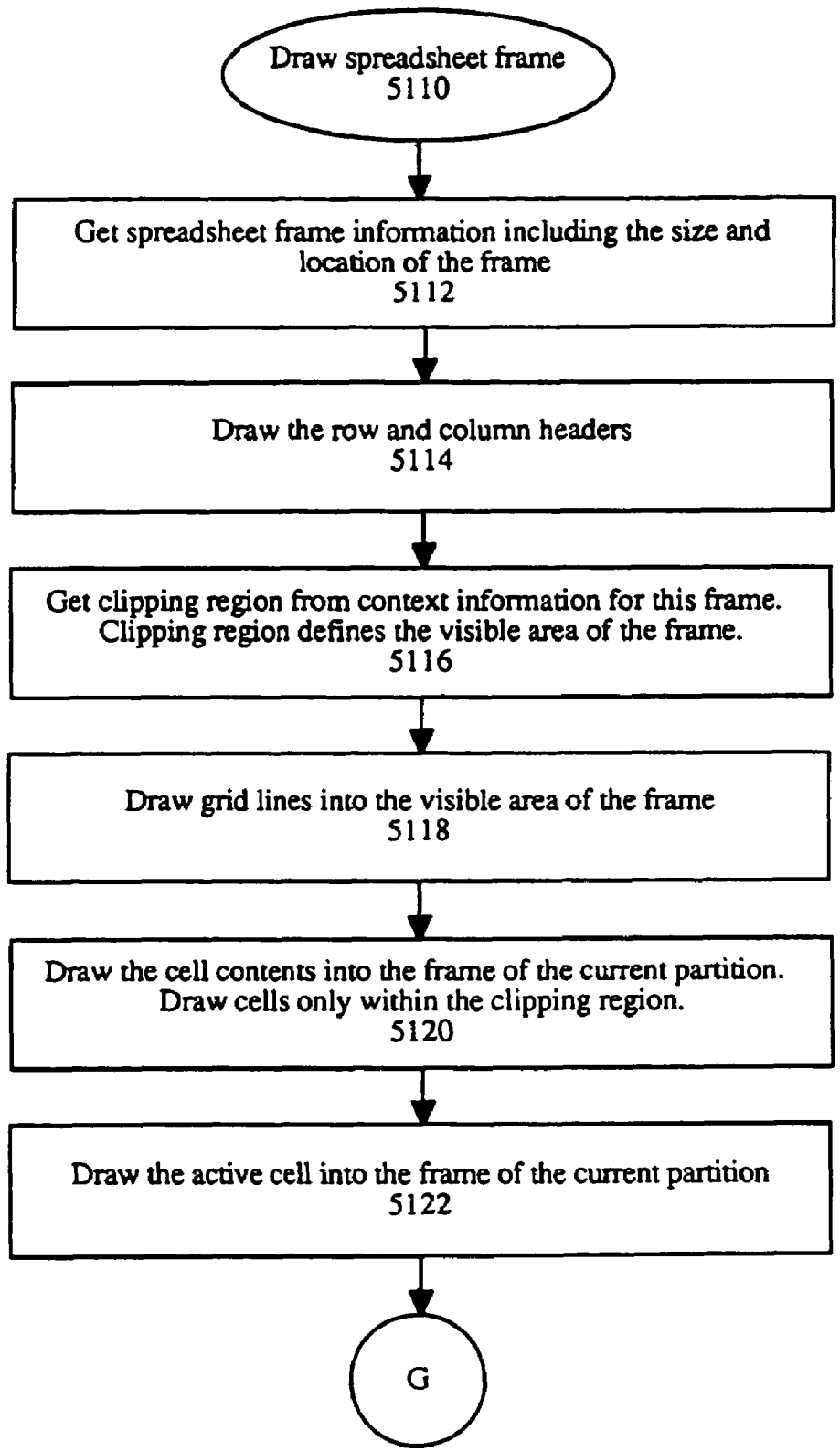

Referring now to FIG. 51, the processing logic for the draw spreadsheet frame operation is illustrated. Upon activation, spreadsheet frame information including the size and location of the frame is retrieved from the spreadsheet dataset in processing block 5112. The row and column headers are drawn in processing block 5114. A clipping region for the spreadsheet frame is retrieved from context information in processing block 5116. The clipping region defines the visible area of the spreadsheet frame. Gridlines are drawn into the visible area of the frame in processing block 5118. Cell contents of the spreadsheet are drawn into the frame in processing block 5120. Cells only within the clipping region are drawn. The active cell is drawn into the frame of the current partition in processing block 5122. The active cell is a cell in which a user last activated an input device such as the function button on a mouse device. Processing logic for the draw spreadsheet frame operation continues at the bubble labeled G illustrated in FIG. 52.

Figure 52:
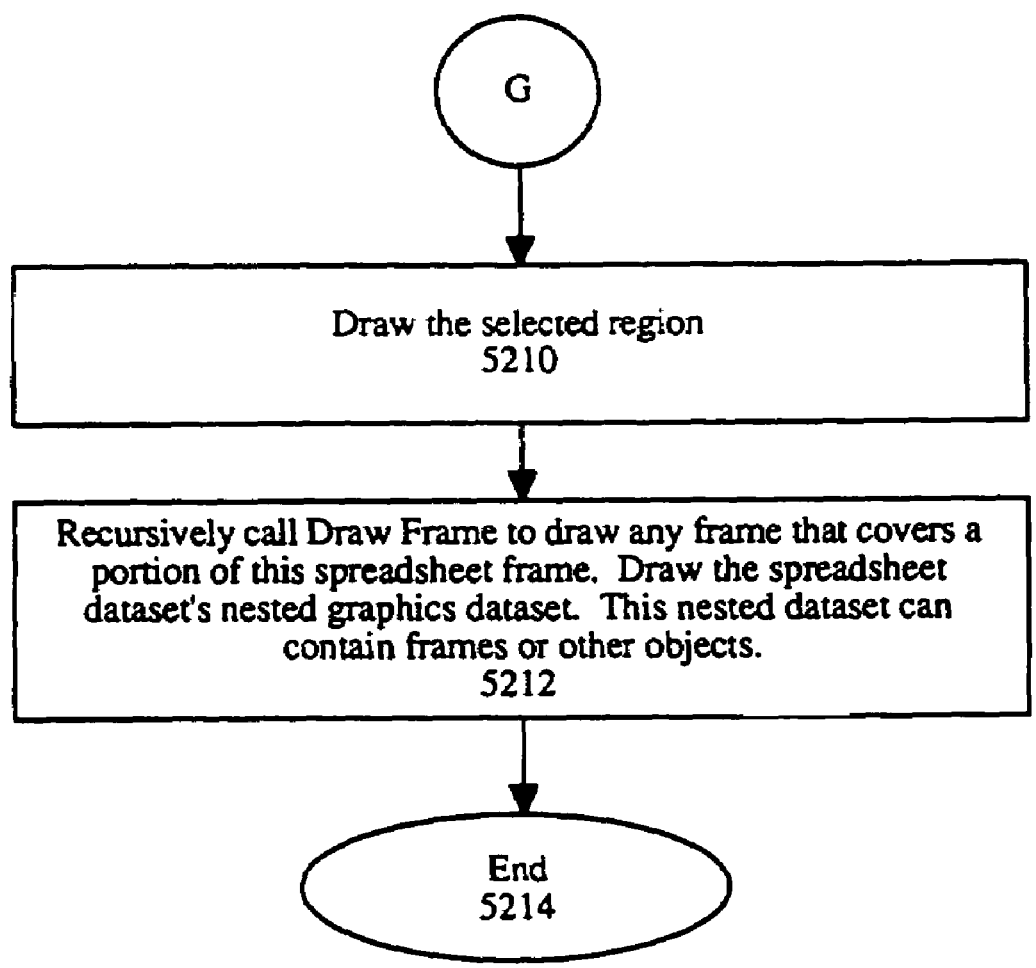

Referring now to FIG. 52, the processing logic for the draw spreadsheet frame operation continues at the bubble labeled G. The selected region is drawn in processing, block 5210. The draw frame function is recursively called in processing block 5212 to draw any frame that covers a portion of the spreadsheet frame. The draw frame function is illustrated starting in FIG. 42. In this manner, a nested graphics dataset of a spreadsheet dataset can be drawn. This nested dataset can contain frames or other objects in any arbitrary hierarchy. Only one frame is drawn during this processing cycle. The frame drawn is a frame of the dataset having the covering object. This frame can, in turn, contain other frames. Processing for the draw spreadsheet frame operation terminates at the bubble 5214 illustrated in FIG. 52.

Referring again to FIG. 42, processing logic for the draw frame operation continues at decision block 4242. If the frame to be drawn is a database dataset frame, processing path 4244 is taken to processing block 4246 where the database frame is drawn. The processing logic for the draw database frame operation is illustrated in FIGS. 53-55.

Figure 53:
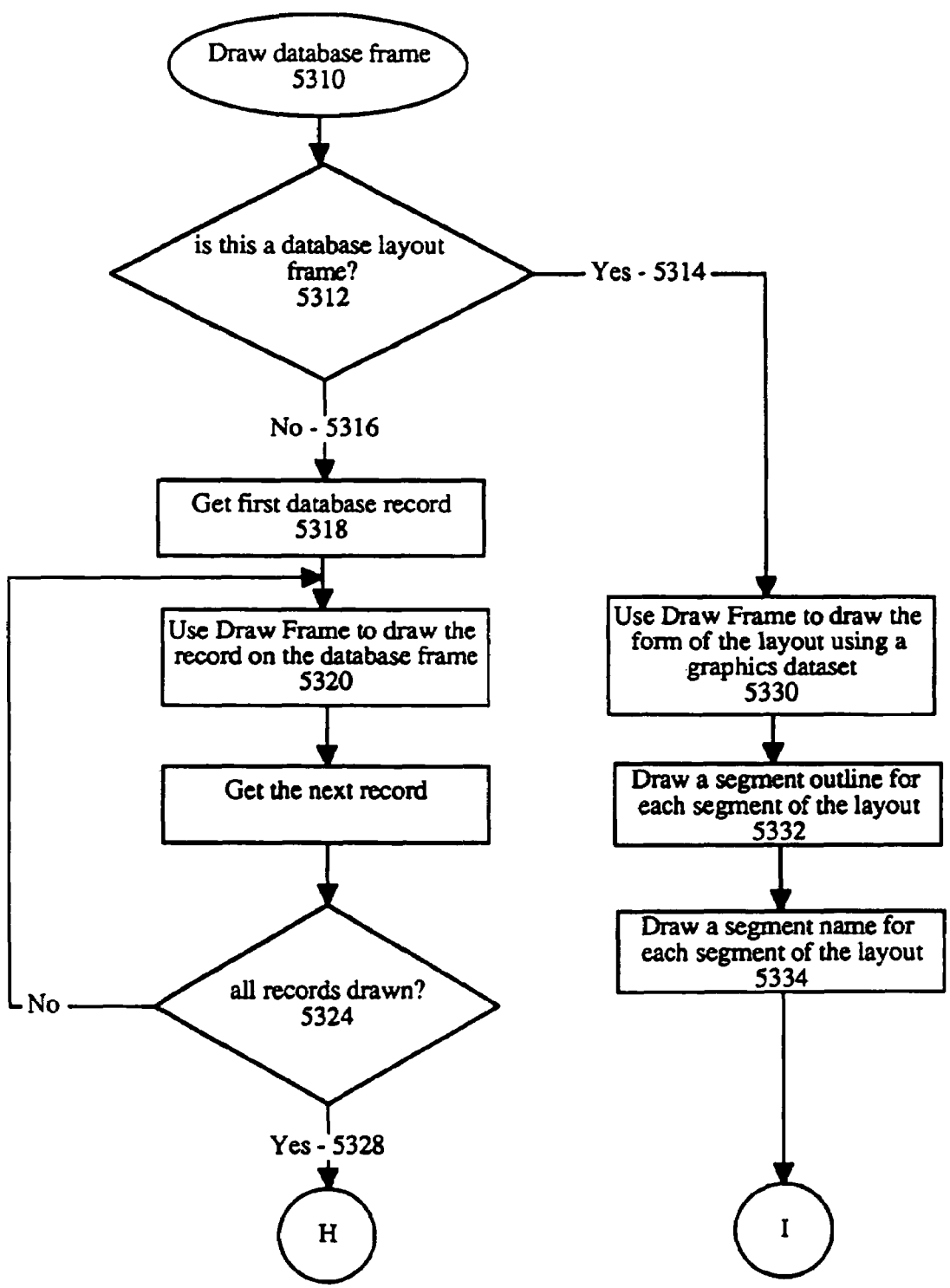

Referring now to FIG. 53, the processing logic for the draw database frame operation is illustrated. There are several types of database frames. Once such frame is a database layout frame. If the database frame to be drawn is a database layout frame, processing path 5314 is taken to processing block 5330 where the draw frame operation is recursively used to draw the form of the layout using a graphics dataset. The form of the database layout comprises the configuration of database fields within a record. The processing logic for the draw frame operation recursively called is illustrated starting in FIG. 42. Once the form of the layout is drawn, a segment outline and a segment name for each segment of the layout is drawn in processing blocks 5332 and 5334. Processing continues at the bubble labeled I as illustrated in FIG. 55 where processing for the draw database frame (database layout frame) terminates at bubble 5534.

Referring again to decision block 5312, processing path 5316 is taken if the database frame to be drawn is not a database layout frame. In this case, the first database record of the database dataset is retrieved in processing block 5318. The draw frame operation is recursively used to draw the retrieved record in the database frame in processing block 5320. Each record of the database dataset is drawn in an individual frame in the loop between processing block 5320 and decision block 5324. Once all records are drawn, processing path 5328 is taken to the bubble labeled H as illustrated in FIG. 54.

Figure 54:
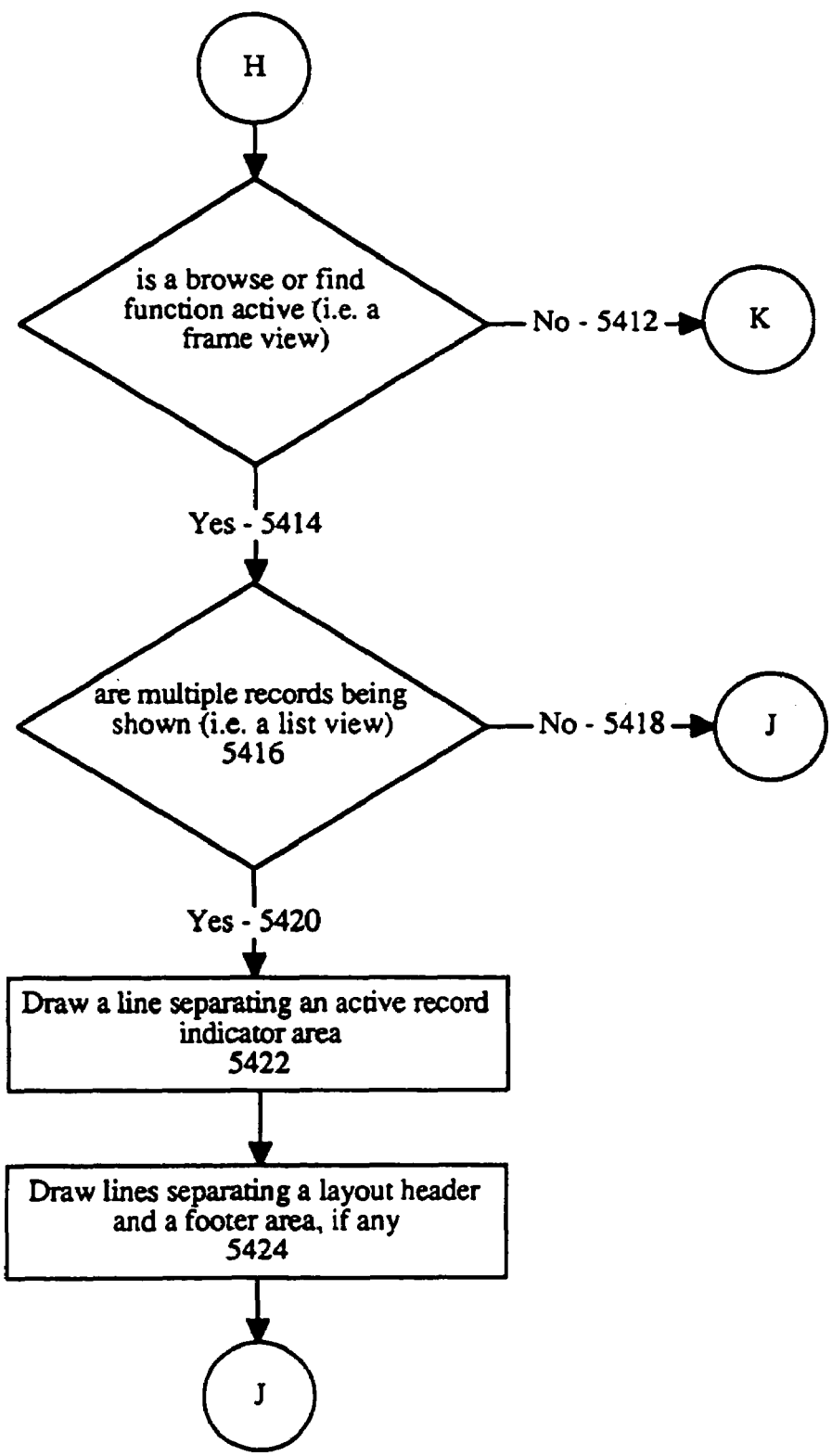
Figure 55:
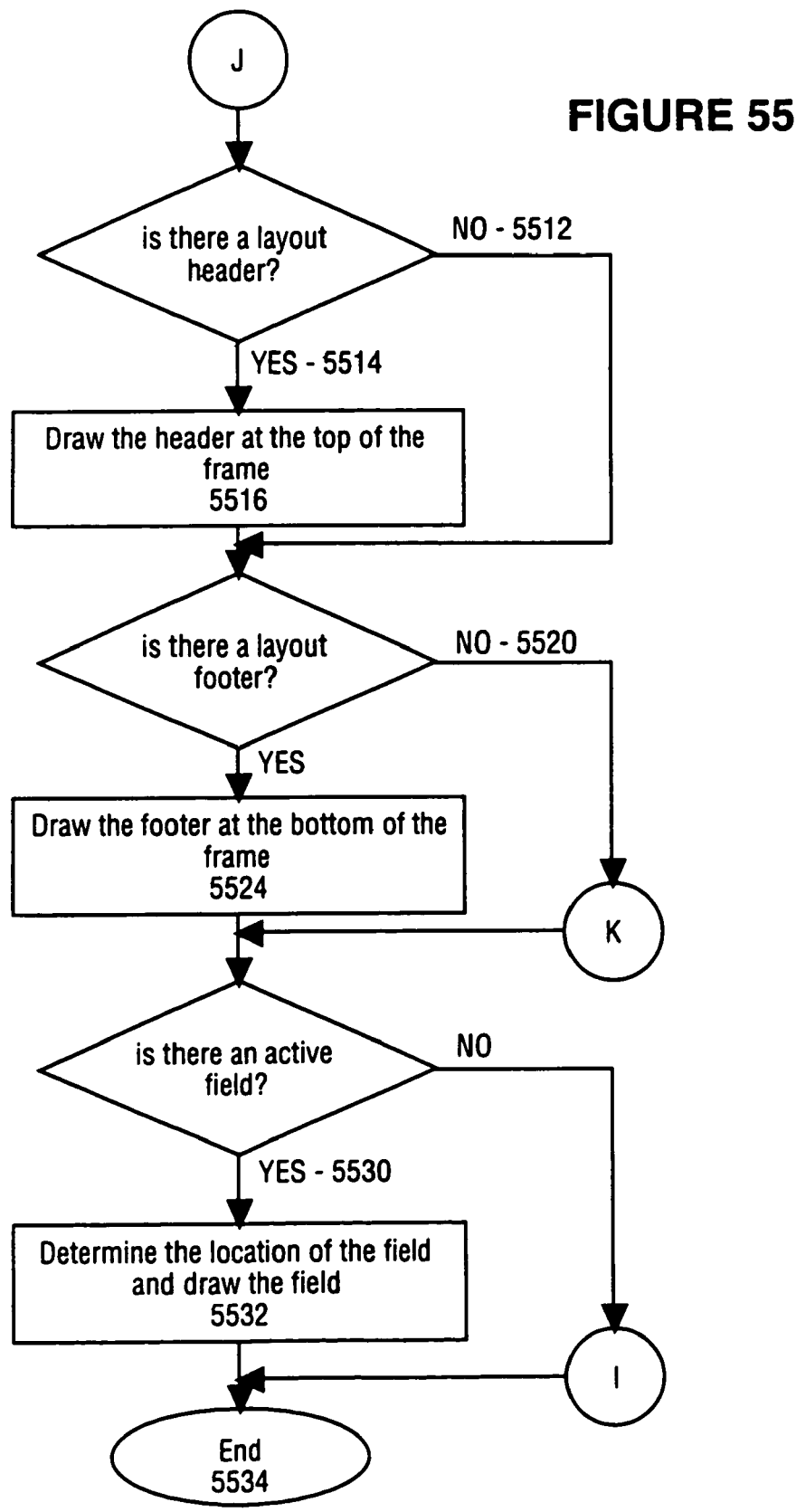

Referring now to FIG. 54, processing for the draw database frame operation continues at the bubble labeled H illustrated in FIG. 54. If a browse or find function is active (i.e. a frame view is active), processing path 5414 is taken to decision block 5416. If multiple records are being displayed in the browse or find mode, processing path 5420 is taken to processing block 5422 where a line separating an active record indicator area is drawn. Lines separating a layout header and footer area are drawn in processing block 5424. Processing continues at the bubble labeled J as illustrated in FIG. 55. Referring again to decision block 5416, if multiple records are not being shown for the browse or find mode, processing path 5418 is taken to the bubble labeled J as illustrated in FIG. 55.

Referring now to FIG. 55, if there is a layout header, processing path 5514 is taken to processing block 5516 where the header is drawn at the top of the frame. If no layout header is present, processing path 5512 is taken and the header is not drawn into the frame. If there is a layout footer, the footer is drawn at the bottom of the frame in processing block 5524. If no layout footer is present, processing path 5520 is taken and the footer is not drawn at the bottom of the frame. If there is an active field as selected by the user of the database, processing path 5530 is taken to processing block 5532 where the active field is drawn into the frame. Processing for the draw database frame operation then terminates at processing bubble 5534.

Referring again to FIG. 54, if a browse or find function is not active (processing path 5412), processing continues at the bubble labeled K as illustrated in FIG. 55. At the bubble labeled K illustrated in FIG. 55, processing for drawing the header and footer into the frame is bypassed for the inactive browse or find function.

Figure 56:
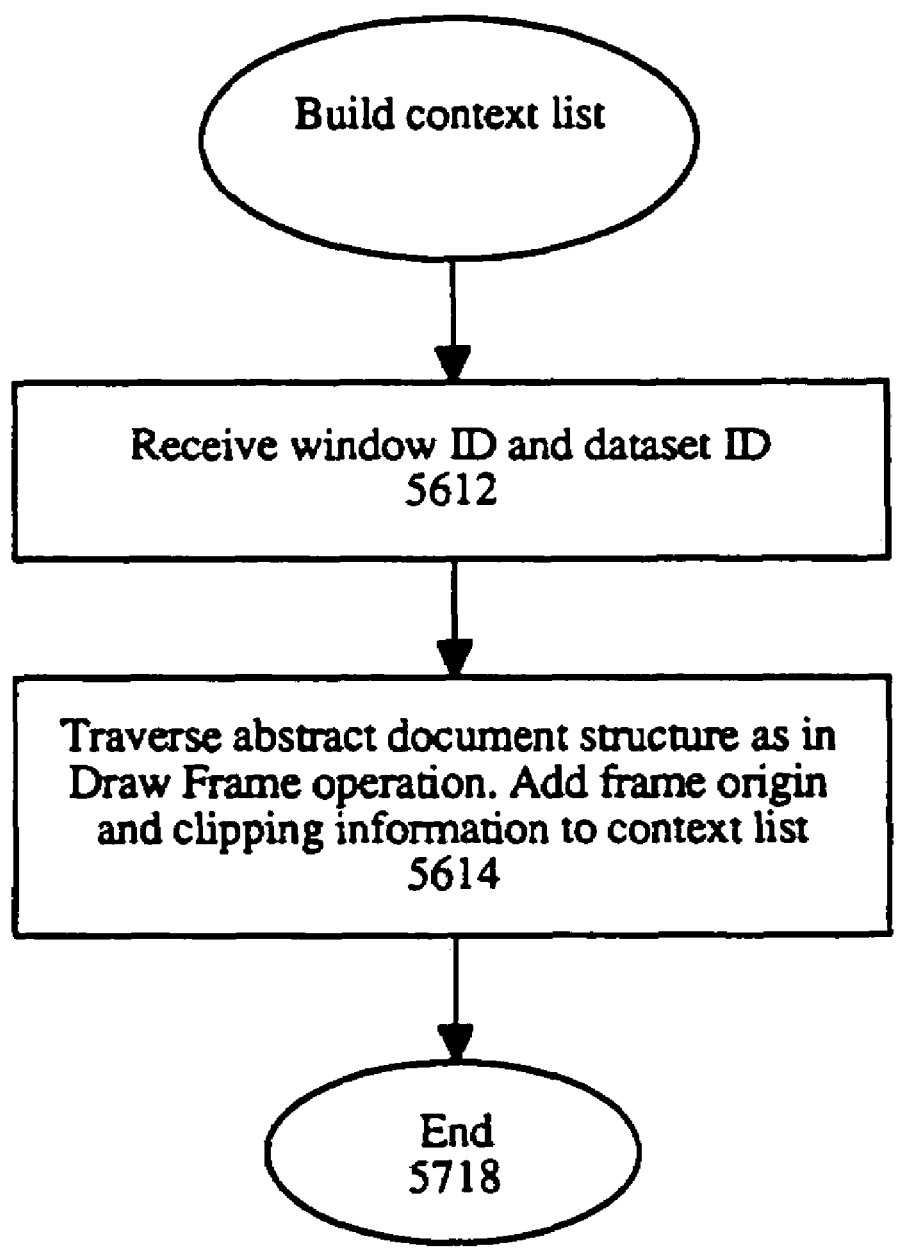
Figure 57:
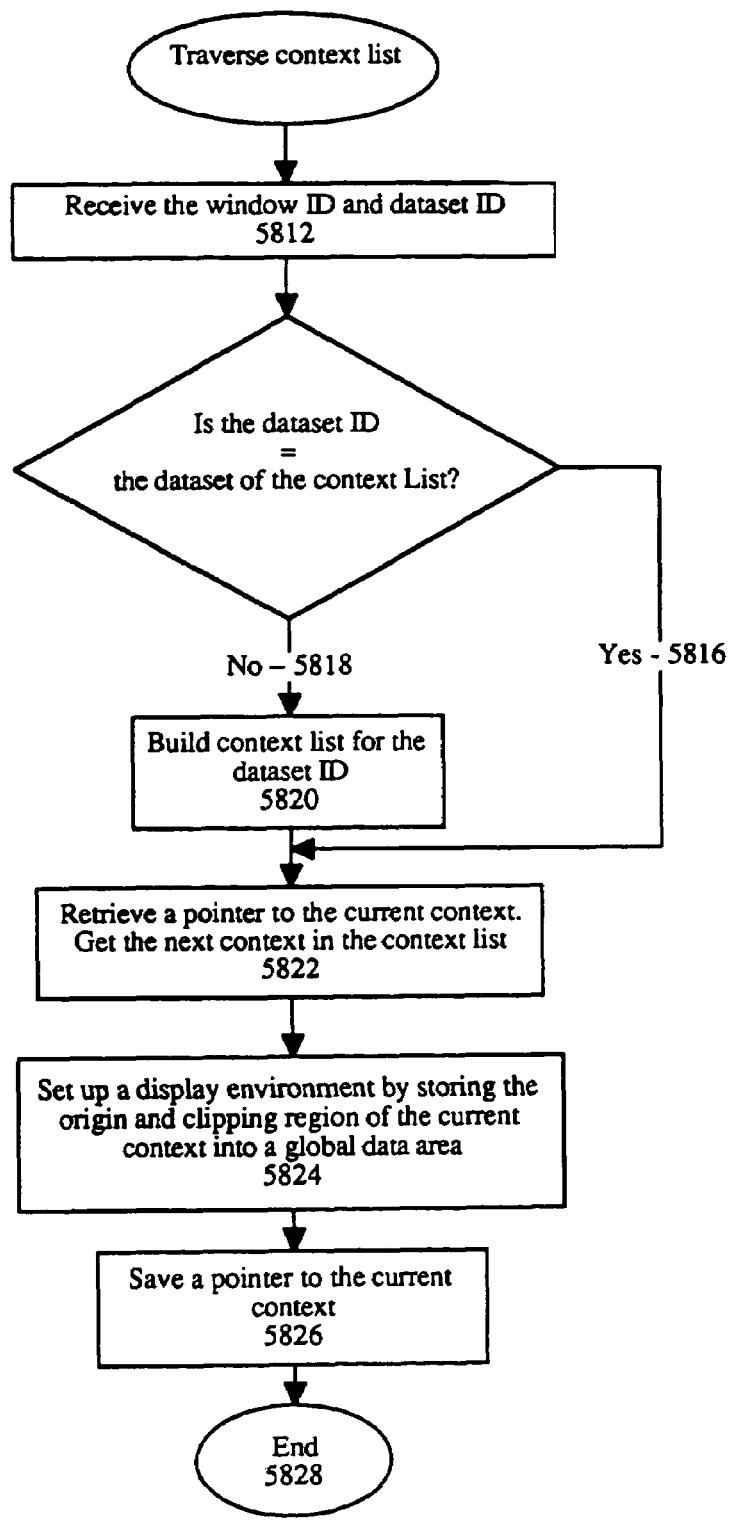
Figure 58:
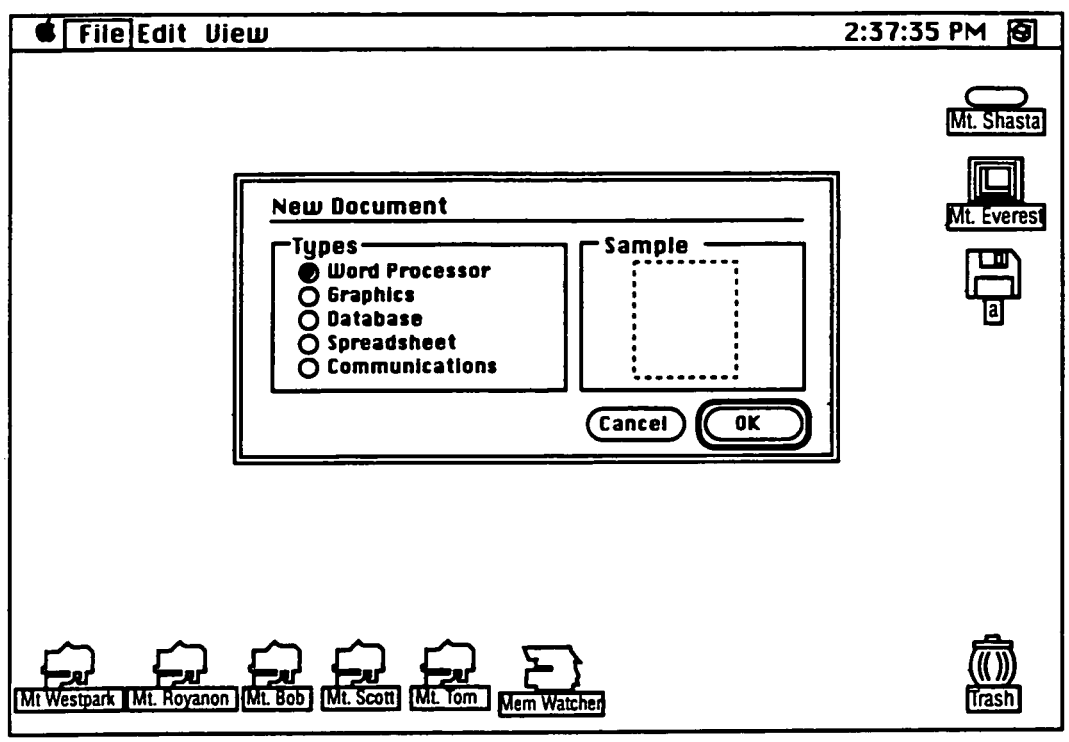
FIGS. 58-64 are examples of the present invention as used in a computer system.

Referring now to FIGS. 56 and 57, the processing logic for manipulating a context list in the present invention is illustrated. A context is a description of the location and scale in which a frame is represented on the display screen. For each window displayed for a particular document, a context list for that window is maintained. One context list is maintained for the currently active dataset of that window. The context list describes the origin and clipping information for each instance of each of the frames of a specified dataset which are viewed in a given window. The use of context for displaying frames provides an efficient way for locating frames on a display screen. In addition, the context list provides an efficient means for determining whether frames or portions of frames are hidden by other frames in the system. Thus, each context in the context list stores information about which parts of the context are obscured. For transparent frames, objects behind the frame can obscure the frame also. Thus, transparency information is also maintained in the context list. Context lists apply to a single dataset. However, documents may contain multiple datasets and a user can manipulate multiple datasets. Only one context list per window is maintained at a time. However, whenever a context list traversal is performed, the context list traversal processing logic verifies that the dataset for which the context list traversal is being performed is the same as the dataset for which the context list was originally built. If this is not the case, the context list is rebuilt for the new dataset.

Referring now to FIG. 56, the processing logic for the build context list operation is illustrated. A window identification (ID) and a dataset ID is received as input parameters to the build context list processing logic (processing block 5612). The abstract document structure is traversed in processing block 5614 in the same manner as the process used to draw a frame as described earlier starting with FIG. 42. In the context building process, however, the frame is not actually drawn. Instead, for frames the would be drawn, the current coordinate system (origin) and a clipping region are added to the context list. When each of the frames of the dataset have been processed in this manner, termination bubble 5718 is executed where processing for the build context list operation is terminated.

Referring now to FIG. 57, the processing logic for the traverse context list operation is illustrated. The traverse context list operation is performed to set up a display environment for each context of a context list. A window ID and dataset ID is received by the traversed context list processing logic in processing block 5812. If the input dataset ID is equal to the dataset ID for which the context list was originally built, processing path 5816 is taken to processing block 5822. If, however, the input dataset ID is different from the dataset ID corresponding to the context list, processing path 5818 is taken to processing block 5820 where the build context list processing logic is executed to build a context list for the input dataset ID. Once the context list for the input dataset ID is built, a pointer to the next context in the context list is retrieved in processing block 5822. This pointer is updated to point to the next context in the context list. This new context is designated as the current context. In processing block 5824, the display environment is set up for the current context by setting the QuickDraw origin and clipping region appropriately. These parameters are set to the values they would have if this instance of the frame were being drawn in an update operation. A pointer to the current context is saved in processing block 5826 and processing for the traverse context list operation terminates at bubble 5828 as illustrated in FIG. 57.

Operation of the Preferred Embodiment

Referring now to FIGS. 58 to 64, sample screen snapshots of the present invention in operation are provided. In FIG. 1, a selection box is presented to a user on selection of a command for creating a new document. Because the present invention supports multiple data types, multiple document types are also provided. The principal dataset type 4114 of the document is defined by the user selection in the selection box illustrated in FIG. 58.

Figure 59:

Referring to FIG. 59, a window 5910 is illustrated in a page view configuration. Two pages (5912 and 5914) of a word processing document are shown. A text dataset in window 5910 contains a block of text 5916 as viewed in page 5912. A graphics dataset in window 5910 containing a rectangle object 5918 is viewable in both pages 5912 and 5914. Note that the single rectangle object is shown spanning two pages. Because the rectangle object of the graphics dataset is maintained independently from the view of the rectangle, the graphic object may be arbitrarily positioned either across a page boundary or overlapping another dataset without causing additional processing overhead or special case handling. The present invention provides views of these datasets (i.e. frames) that insulate dataset-specific behavior from the particular environments in which the datasets must operate. In particular, datasets are not responsible for managing functions such as window scrolling, window sub-regions (panes), paging or other environment-specific functions. These functions are handled uniformly, independent of document or dataset type, at a higher functional level. A frame object may be inserted as a character in text block 5916. In this case, a frame such as a graphics frame for viewing rectangle 5918 is nested within a text dataset for viewing text block 5916.

Figure 60:
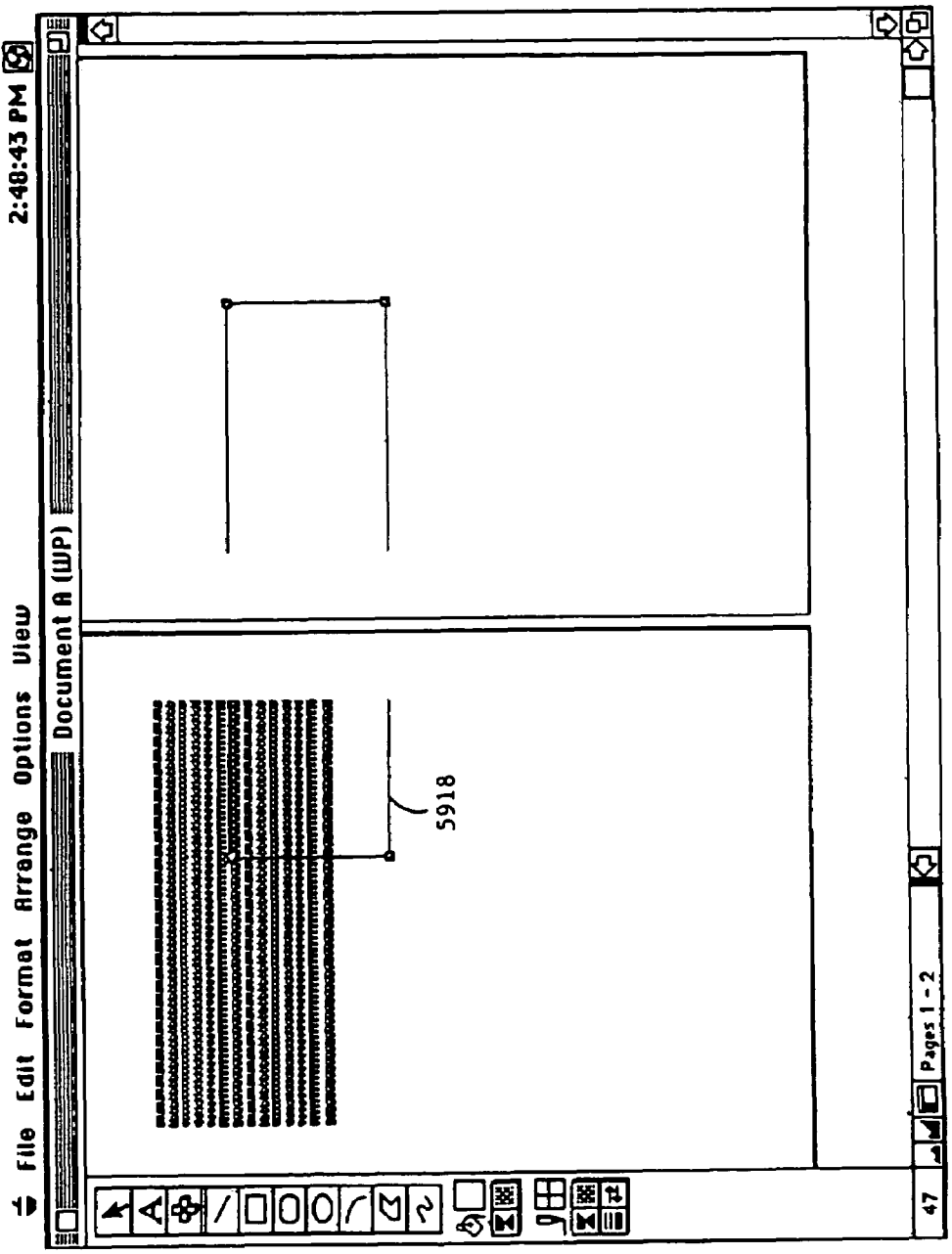

In FIG. 60, a similar sample is shown except that the rectangle object 5918 is shown as a transparent object. Note the text dataset is visible through the rectangle object.

Figure 61:
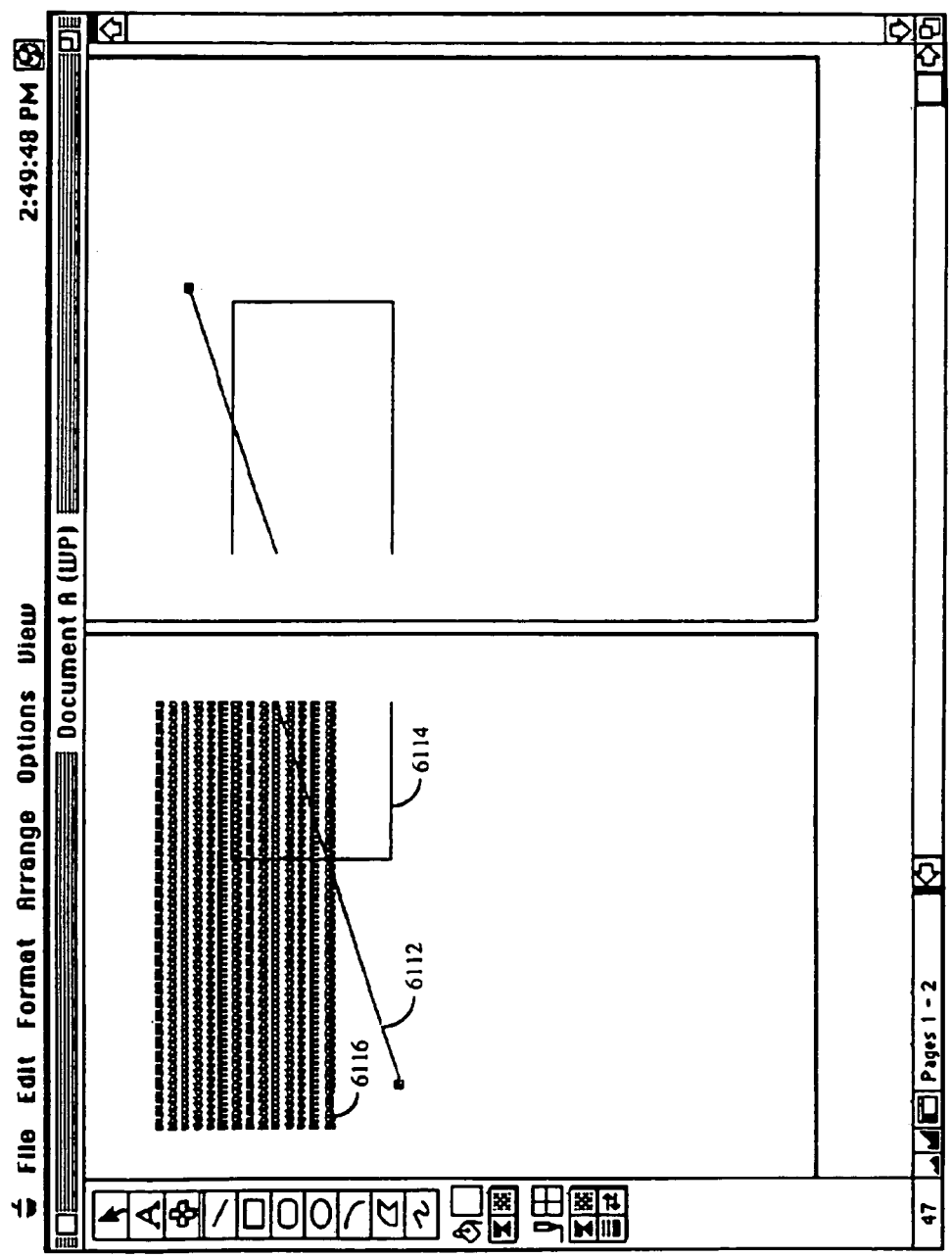

Referring to FIG. 61, two graphic objects are shown (a line segment 6112 and a rectangle 6114) in a page of a window. A text block 6116 is also shown. These objects may be manipulated and viewed as independent objects regardless of the manner in which the objects are actually displayed. Both the line object 6112 and the rectangle 6114 may be members of the same graphic dataset.

Figure 62:
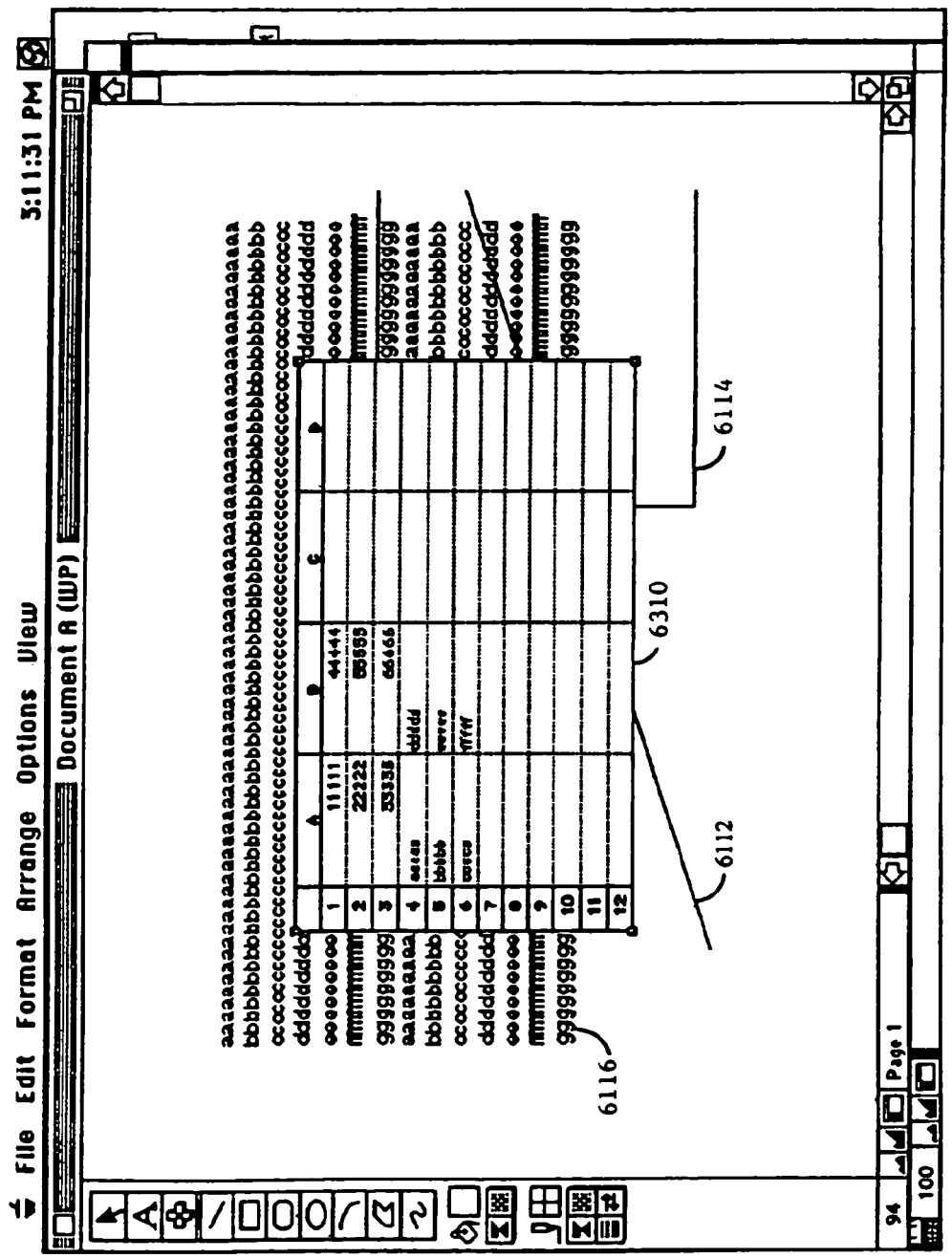

FIG. 62 shows a text block 6110, a line segment graphic object 6112, a rectangle graphic object 6116, and a spreadsheet 6114 of a spreadsheet dataset all viewable in a window in a frame view configuration. The spreadsheet 6114 comprises a set of cells arranged in a row and column format with row and column labelling. Each of these different data types (i.e. text, graphics, and spreadsheet) are contained within a single document (i.e. Document A, which is a word processor (WP) type). Document A may be saved in a file system as a self contained document of a specific type.

Figure 63:
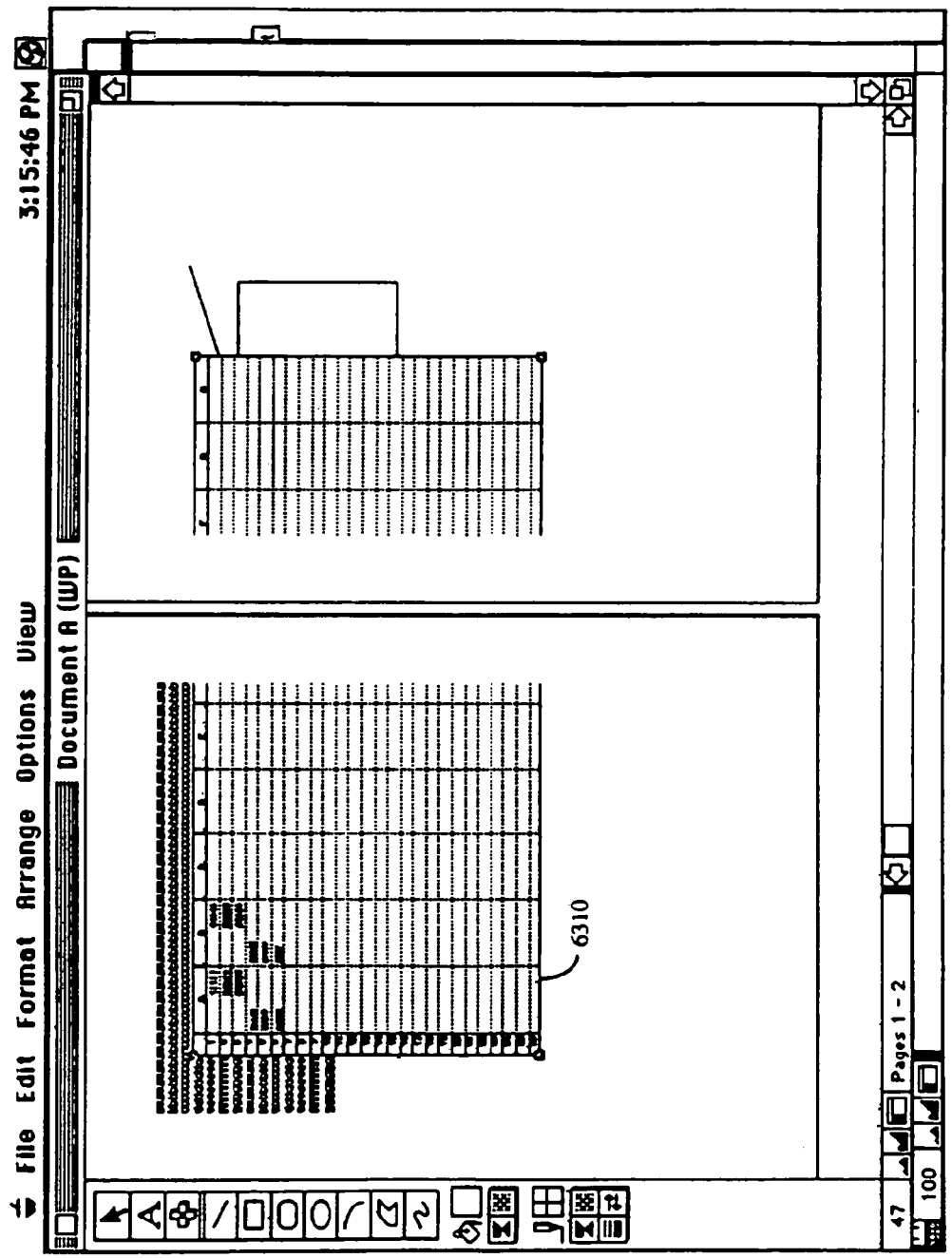

Referring to FIG. 63, a spreadsheet 6310 of a spreadsheet dataset is shown spanning two pages of a document viewable in a window. Again, because of the independence of the view of data from the data itself as provided in the present invention, the spreadsheet can span pages of a document without loss of information nor the need for special processing.

Figure 64:
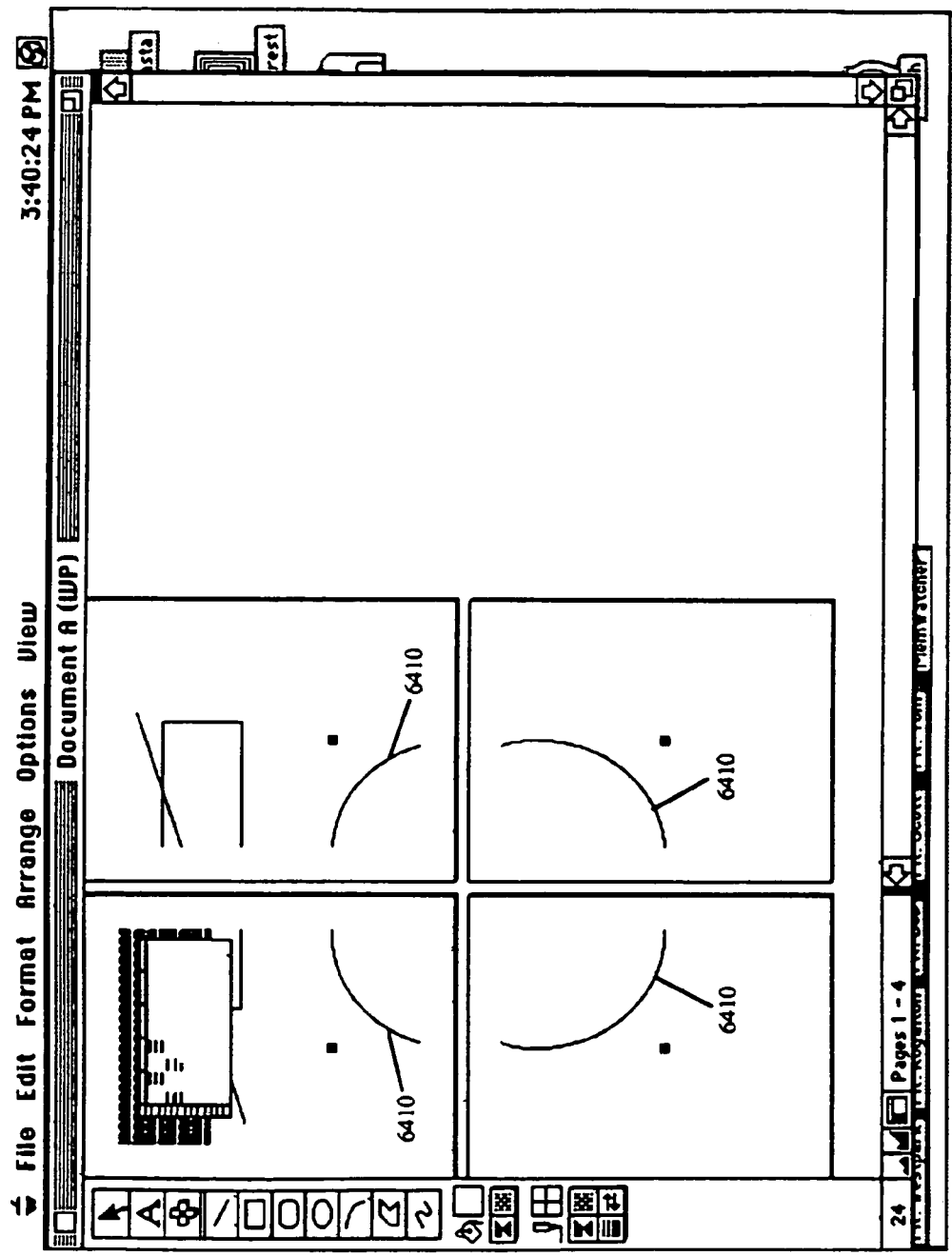

Referring to FIG. 64, four pages of a document in page view are shown. A single graphic object 6410 is shown spanning all four pages. Frames for viewing each page are provided in the structure of the present invention. Because each frame can view a dataset (a graphics dataset in this case) independently, multiple frames can view the same data (i.e. graphic object in this case) in a different scale or from a different viewpoint. Thus, multiple views of the same data can be visible at the same time with the present invention.

Thus, a means and method for viewing and manipulating different data types within a single computer system environment is illustrated.

Although the present invention is described herein with reference to a specific embodiment, many modifications and variations will readily occur to those skilled in the art. Accordingly, all such variations and modifications are included within the intended scope of the present invention as defined about the following claims.

The invention claimed is:

1. A machine-readable storage medium having an integrated document comprising:
    a plurality of data elements of different data types;
    a nested frame for each data type, each frame displayable within a common window to view a data element of the corresponding data type; and
    a function for each data type, each function enabling manipulation of the data element displayed within the frame for the corresponding data type, wherein the data elements, the frames and the functions are contained in the single integrated document and are retrieved through an action on the single integrated document in a file system.

2. The machine-readable medium of claim 1, wherein the corresponding data elements for a text data type are text blocks, the corresponding frame is a text frame, and the corresponding function is a word processing function.

3. The machine-readable medium of claim 1, wherein the corresponding data elements for a graphics data type are graphics objects, the corresponding frame is a graphics frame, and the corresponding function is a graphical function.

4. The machine-readable medium of claim 1, wherein the corresponding data element for a spreadsheet data type are cells and dependency information, the corresponding frame is a spreadsheet frame, and the corresponding function is a spreadsheet function.

5. The machine-readable medium of claim 1, wherein the corresponding data elements for a database data type are record information, field information, and layout information, the corresponding frame is a database frame, and the corresponding function is a database function.

6. The machine-readable medium of claim 1 further comprising:
    instructions to generate a page view of the integrated document, the page view being dependent upon the data type of data elements within the page view.

7. The machine-readable medium of claim 1 further comprising:
    instructions to generate a frame view of the integrated document, the frame view being independent of the data type of data elements within the frame view.

8. The machine-readable medium of claim 1 further comprising:
    instructions to display concurrently in the common window frames corresponding to at least two of the data types.

9. The machine-readable medium of claim 1 further comprising:
    instructions to display concurrently in the common window at least a portion of a data element for a data type in a first frame and a second frame, the data element manipulable through either of the first and second frame.

10. The machine-readable medium of claim 1 further comprising:
    instructions to display concurrently in the common window a first data element of a data type in a first frame and a second data element of the same dataset in a second frame without displaying the first data element in the second frame.

11. The machine-readable medium of claim 1 further comprising:
    a context list including an origin and clipping and location information associated with a frame for one of the data types.

12. The machine-readable medium of claim 1, wherein the function is at least one of viewing, manipulating, and editing functions.

13. The machine-readable medium of claim 1, wherein a frame for a first data type references data elements of a second data type to view and manipulate the data elements of the second data type within the frame of the first data type.

14. The machine-readable medium of claim 13, wherein the first and second data types are different data types.

15. The machine-readable medium of claim 1, wherein at least two frames are sequentially linked.

16. The machine-readable medium of claim 1 further comprising:
    a partition for a data type, the partition including a plurality of frames for the corresponding data type.

17. A computerized method of presenting a single interface to different data types comprising:
    obtaining a single document comprising:
        a plurality of data elements of the different data types;
        a nested frame for each data type, each frame displayable to view a data element of the corresponding data type; and
        a function for each data type, each function enabling manipulation of the data element displayed within the frame for the corresponding data type, wherein the data elements, the frames and the functions are contained in the single document and are retrieved through an action on the single document in a file system; and
    providing a common window to display the frames.

18. The computerized method of claim 17, wherein the different data types comprise at least two of text, graphics, spreadsheet, and database data types.

19. The computerized method of claim 18, wherein the function for text data elements includes at least one word processing function.

20. The computerized method of claim 18, wherein the function for graphics data elements includes at least one graphical function.

21. The computerized method of claim 18, wherein the function for spreadsheet data elements includes at least one spreadsheet function.

22. The computerized method of claim 18, wherein the function for database data elements includes at least one database function.

23. The computerized method of claim 17 further comprising:
 displaying a page view of the single document, the page view being dependent upon the data types of data elements within the page view.

24. The computerized method of claim 17 further comprising:
 displaying a frame view of the single document, the frame view being independent of the data types of data elements within the frame view.

25. The computerized method of claim 17, wherein the single document further comprises a context list, and further comprising:
 storing an origin and clipping and location information associated with the frame for a data type in the context list.

26. The computerized method of claim 17, wherein the function is at least one of viewing, manipulating, and editing functions.

27. The computerized method of claim 17, wherein a frame for a first data type references data elements of a second data type, and further comprising:
 viewing and manipulating data elements of the second data type within the frame for the first data type.

28. The computerized method of claim 27, wherein the first and second data types are different data types.

29. The computerized method of claim 17, wherein at least two frames in the single document are linked.

30. The computerized method of claim 17, wherein the single document further comprises:
 a partition for a data type, the partition including a plurality of frames for the corresponding data type.

31. A machine-readable storage medium having executable instructions to cause a machine to present a single interface to different data types, the instructions when executed by a data processing system cause the data processing system to perform a method comprising:
 obtaining a single document comprising:
  a plurality of data elements of the different data types;
  a nested frame for each data type, each frame displayable to view a data element of the corresponding data type; and
  a function for each data type, each function enabling manipulation of the data element displayed within the frame for the corresponding data type wherein the data elements, the frames and the functions are contained in the single document and are retrieved through an action on the single document in a file system; and
 providing a common window to display the frames.

32. The machine-readable medium of claim 31, wherein the different data types comprise at least two of text, graphics, spreadsheet, and database data types.

33. The machine-readable medium of claim 32, wherein the function for text data elements includes at least one word processing function.

34. The machine-readable medium of claim 32, wherein the function for graphics data elements includes at least one graphical function.

35. The machine-readable medium of claim 32, wherein the function for spreadsheet data elements includes at least one spreadsheet function.

36. The machine-readable medium of claim 32, wherein the function for database data elements includes at least one database function.

37. The machine-readable medium of claim 31, wherein the instructions further comprise:
 displaying a page view of the single document, the page view being dependent upon the data types of data elements within the page view.

38. The machine-readable medium of claim 31, wherein the instructions further comprise:
 displaying a frame view of the single document, the frame view being independent of the data types of data elements within the frame view.

39. The machine-readable medium of claim 31, wherein the single document further comprises a context list, and the instructions further comprise:
 storing an origin and clipping and location information associated with the frame for a data type in the context list.

40. The machine-readable medium of claim 31, wherein the function is at least one of viewing, manipulating, and editing functions.

41. The machine-readable medium of claim 31, wherein a frame for a first data type references data elements of a second data type, and the instructions further comprise:
 viewing and manipulating data elements of the second data type within the frame for the first data type.

42. The machine-readable medium of claim 41, wherein the first and second data types are different data types.

43. The machine-readable medium of claim 31, wherein at least two frames in the single document are linked.

44. The machine-readable medium of claim 31, wherein the single document further comprises:
 a partition for a data type, the partition including a plurality of frames for the corresponding data type.

45. A system comprising:
 a processor;
 a memory coupled to the processor through a bus;
 a single document accessible by the processor from the memory, the single document comprising a plurality of data elements of different data types, a nested frame for each data type, each frame displayable to view a data element of the corresponding data type, and a function for each data type, each function enabling manipulation of the data element displayed within the frame for the corresponding data type, wherein the data elements, the frames and the functions are contained in the single document and are retrieved through an action on the single document in a file system; and
 an interface process executed from the memory by the processor to cause the processor to provide a common window to display the frames.

46. The system of claim 45, wherein the different data types comprise at least two of text, graphics, spreadsheet, and database data types.

47. The system of claim 46, wherein the function for text data elements includes at least one word processing function.

48. The system of claim 46, wherein the function for graphics data elements includes at least one graphical function.

49. The system of claim 46, wherein the function for spreadsheet data elements includes at least one spreadsheet function.

50. The system of claim 46, wherein the function for database data elements includes at least one database function.

51. The system of claim 45, wherein the interface process further causes the processor to display a page view of the single document, the page view being dependent upon the data types of data elements within the page view.

52. The system of claim 45, wherein the interface process further causes the processor to display a frame view of the single document, the frame view being independent of the data types of data elements within the frame view.

53. The system of claim 45, wherein the single document further comprises a context list, and the interface process further causes the processor to store an origin and clipping and location information associated with the frame for a data type in the context list.

54. The system of claim 45, wherein the function is at least one of viewing, manipulating, and editing functions.

55. The system of claim 45, wherein a frame for a first data type references data elements of a second data type, and the interface process further causes the processor to view and manipulate data elements of the second data type within the frame for the first data type.

56. The system of claim 45, wherein the first and second data types are different data types.

57. The system of claim 45, wherein at least two frames in the single document are linked.

58. The system of claim 45, wherein the single document further comprises:
a partition for a data type, the partition including a plurality of frames for the corresponding data type.

59. An apparatus comprising:
means for obtaining a single document, the single document comprising:
a plurality of data elements of the different data types;
a nested frame for each data type, each frame displayable to view a data element of the corresponding data type; and
a function for each data type, each function enabling manipulation of the data element displayed within the frame for the corresponding data type, wherein the data elements, the frames and the functions are contained in the single document and are retrieved through a single action on the single document in a file system; and
means for providing a common window to display the frames.

60. The apparatus of claim 59 further comprising:
means for displaying a page view of the single document the page view being dependent upon the data types of data elements within the page view.

61. The apparatus of claim 59 further comprising:
means for displaying a frame view of the single document, the frame view being independent of the data types of data elements within the frame view.

62. The apparatus of claim 59, wherein the single document further comprises a context list, and further comprising:
means for storing an origin and clipping and location information associated with the frame for a data type in the context list.

63. The apparatus of claim 59, wherein a frame for a first data type references data elements of a second data type, and further comprising:
viewing and manipulating data elements of the second data type within the frame for the first data type.

64. The apparatus of claim 63, wherein the first and second data types are different data types.

65. The apparatus of claim 59, wherein at least two frames in the single document are linked.

66. The apparatus of claim 59, wherein the single document further comprises:
a partition for a data type, the partition including a plurality of frames for the corresponding data type.

* * * * *

UNITED STATES PATENT AND TRADEMARK OFFICE
CERTIFICATE OF CORRECTION

| | |
|---|---|
| PATENT NO. | : 7,735,003 B1 |
| APPLICATION NO. | : 10/423396 |
| DATED | : June 8, 2010 |
| INVENTOR(S) | : Robert Aubrey Hearn |

It is certified that error appears in the above-identified patent and that said Letters Patent is hereby corrected as shown below:

On the face page, in field (54), in "Title", in column 1, line 2, delete "INTO SINGLE" and insert -- INTO A SINGLE --, therefor.

In column 1, line 2, delete "INTO SINGLE" and insert -- INTO A SINGLE --, therefor.

In column 6, line 17, delete "word," and insert -- word --, therefor.

In column 13, line 64, delete "dataset," and insert -- dataset. --, therefor.

In column 18, line 59, delete "If;" and insert -- If, --, therefor.

In column 22, line 3, delete "processing," and insert -- processing --, therefor.

In column 27, line 45, in Claim 31, delete "data type" and insert -- data type, --, therefor.

In column 30, line 7, in Claim 60, delete "document" and insert -- document, --, therefor.

Signed and Sealed this
Twenty-fifth Day of October, 2011

David J. Kappos
*Director of the United States Patent and Trademark Office*